United States Patent
Koga

(10) Patent No.: US 10,310,241 B2
(45) Date of Patent: Jun. 4, 2019

(54) ZOOM LENS SYSTEM

(71) Applicant: RICOH IMAGING COMPANY, LTD., Tokyo (JP)

(72) Inventor: Tomoya Koga, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 135 days.

(21) Appl. No.: 15/422,777

(22) Filed: Feb. 2, 2017

(65) Prior Publication Data
US 2017/0248777 A1    Aug. 31, 2017

(30) Foreign Application Priority Data

Feb. 29, 2016  (JP) ................. 2016-037412
Dec. 20, 2016  (JP) ................. 2016-246429

(51) Int. Cl.
*G02B 15/17* (2006.01)
*G02B 15/173* (2006.01)
*G02B 15/163* (2006.01)

(52) U.S. Cl.
CPC ......... *G02B 15/173* (2013.01); *G02B 15/163* (2013.01)

(58) Field of Classification Search
CPC .................... G02B 15/173; G02B 15/163
USPC ....................................... 359/691
See application file for complete search history.

(56) References Cited

U.S. PATENT DOCUMENTS

| | | | |
|---|---|---|---|
| 6,775,071 B1 | 8/2004 | Suzuki et al. | |
| 2004/0174612 A1 | 9/2004 | Suzuki et al. | |
| 2008/0112063 A1 | 5/2008 | Hatada | |
| 2011/0102905 A1 | 5/2011 | Harada | |
| 2011/0242675 A1 | 10/2011 | Sugita | |
| 2012/0019931 A1 | 1/2012 | Ogata et al. | |
| 2013/0094097 A1 | 4/2013 | Sugita | |
| 2014/0022647 A1 | 1/2014 | Ogata et al. | |
| 2014/0211029 A1 | 7/2014 | Okumura | |
| 2014/0333821 A1 | 11/2014 | Hagiwara | |

FOREIGN PATENT DOCUMENTS

| | | |
|---|---|---|
| JP | 11-352401 | 12/1999 |
| JP | 2004-264714 | 9/2004 |
| JP | 2008-122775 | 5/2008 |

(Continued)

OTHER PUBLICATIONS

U.S. Appl. No. 15/432,108 to Tomoya Koga, filed Feb. 14, 2017.

*Primary Examiner* — Wen Huang
(74) *Attorney, Agent, or Firm* — Greenblum & Bernstein, P.L.C.

(57) ABSTRACT

A zoom lens system includes a positive first lens group, and a rear lens group behind the first lens group, in that order from the object side. The first lens group includes at least one positive single lens element, a negative meniscus lens element having a convex surface on the object side, and at least one positive lens element, in that order from the object side. A distance between the first lens group and the rear lens group increases upon zooming from the short to long focal length extremities. The following conditions (1) and (2) are satisfied:

$$fG1/fn < -1.50 \quad (1), \text{ and}$$

$$65 < \nu p_{ave} \quad (2),$$

wherein fG1 designates the focal length of the first lens group, fn designates the focal length of the negative meniscus lens element, and $\nu p_{ave}$ designates the average value of the Abbe numbers with respect to the d-line of the positive lens elements.

20 Claims, 55 Drawing Sheets

(56) References Cited

FOREIGN PATENT DOCUMENTS

| | | |
|---|---|---|
| JP | 2011-99924 | 5/2011 |
| JP | 2011-180218 | 9/2011 |
| JP | 2011-209347 | 10/2011 |
| JP | 2011-215218 | 10/2011 |
| JP | 2012-27261 | 2/2012 |
| JP | 2014-89385 | 5/2014 |
| JP | 2014-145960 | 8/2014 |
| JP | 2014-219616 | 11/2014 |
| JP | 2014-228734 | 12/2014 |
| JP | 2015-102619 | 6/2015 |

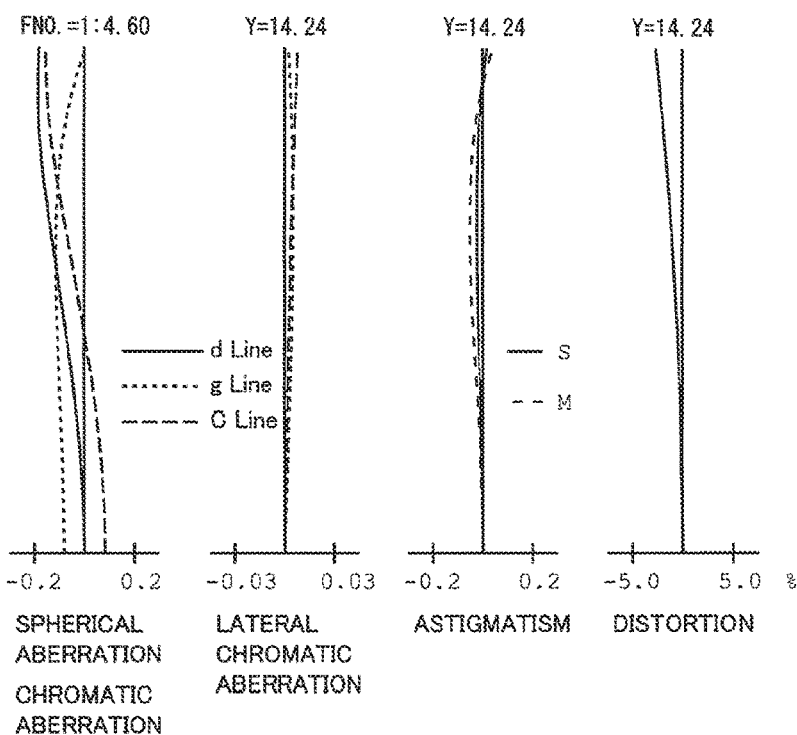
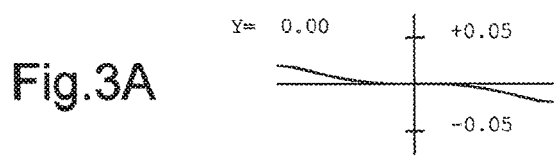
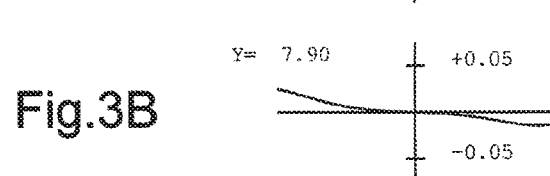
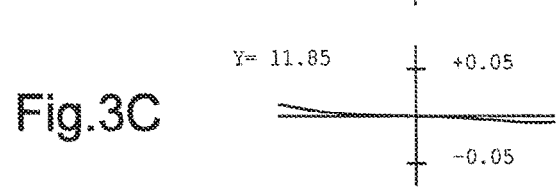
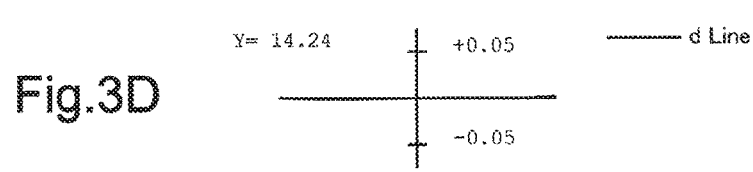

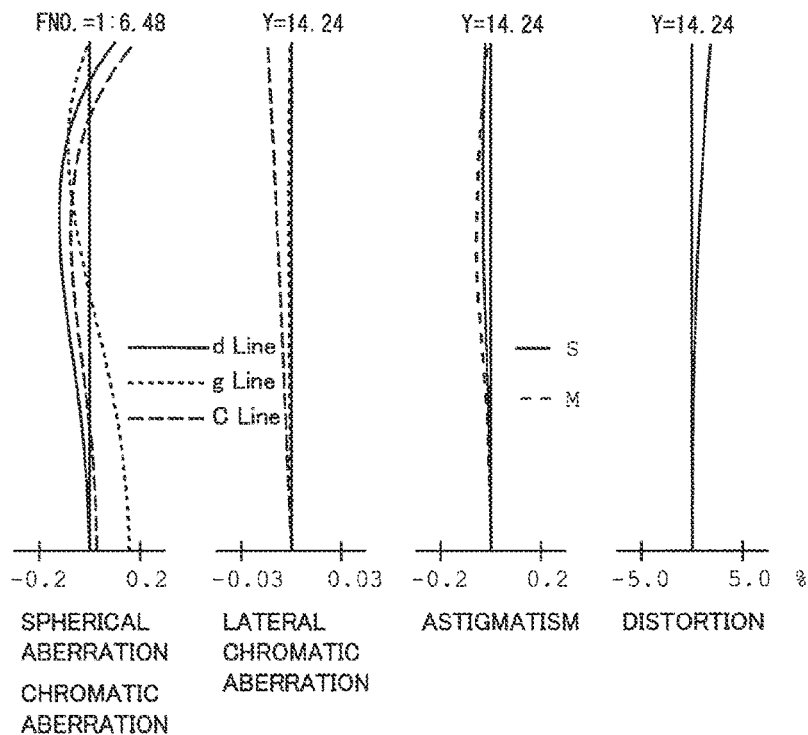
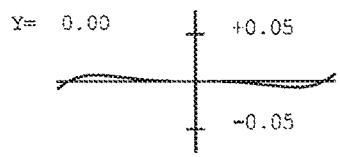
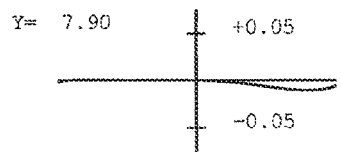
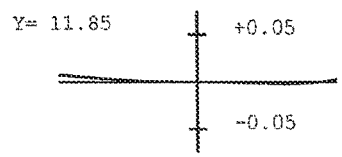
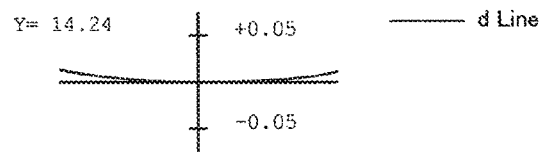

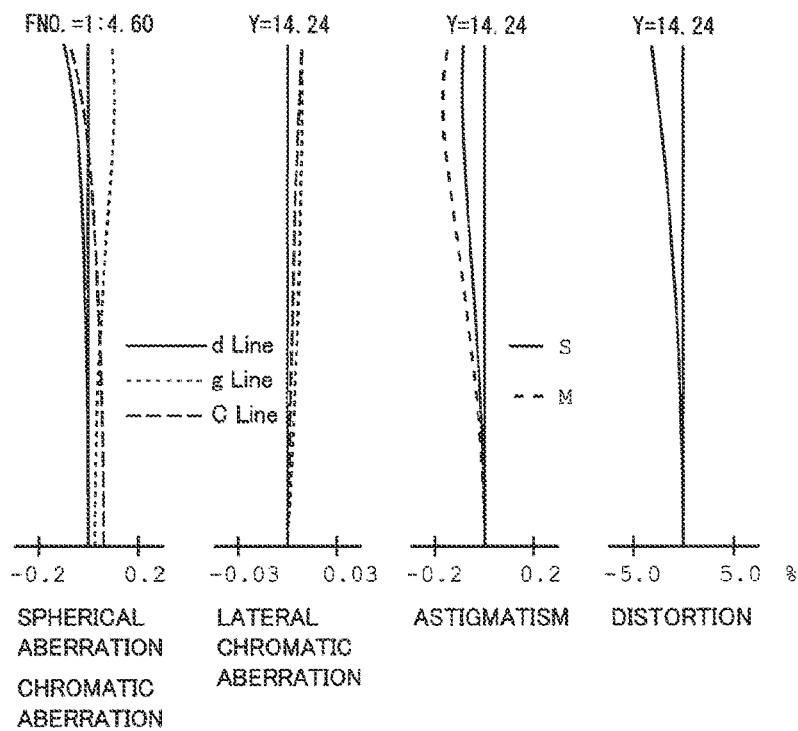
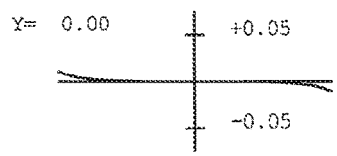
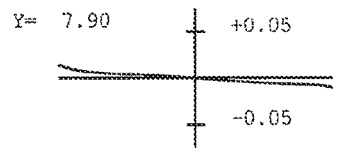
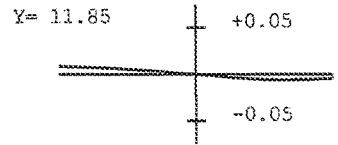
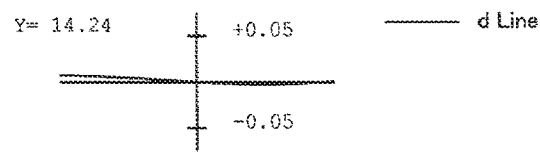

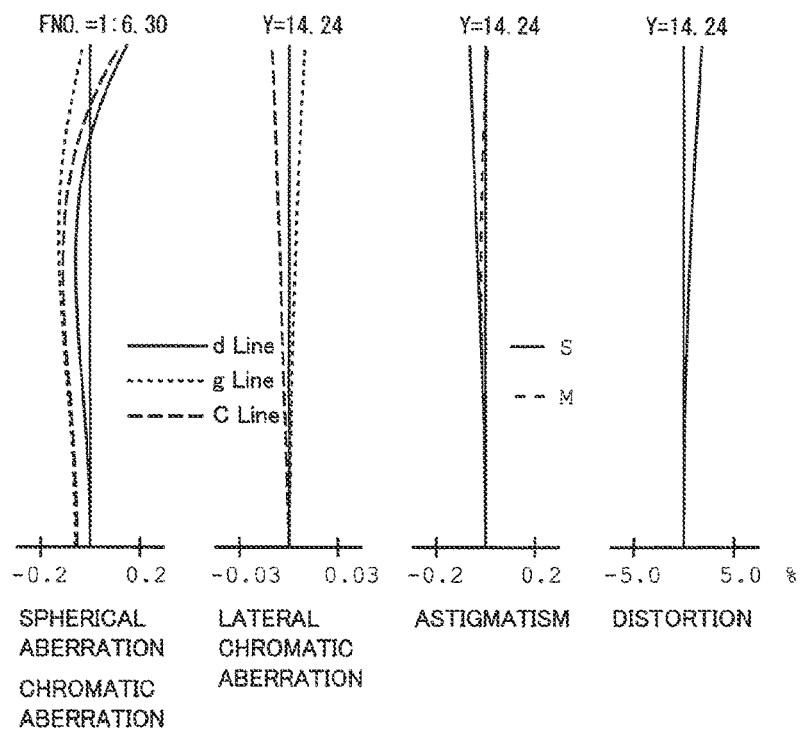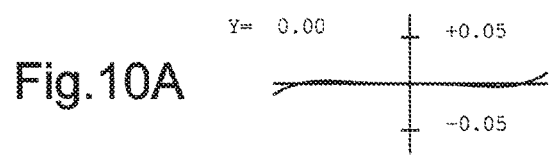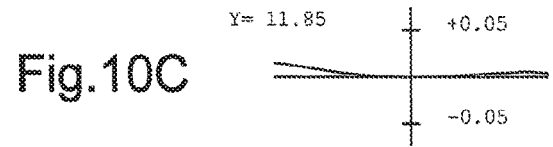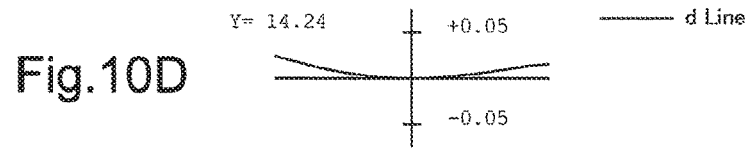

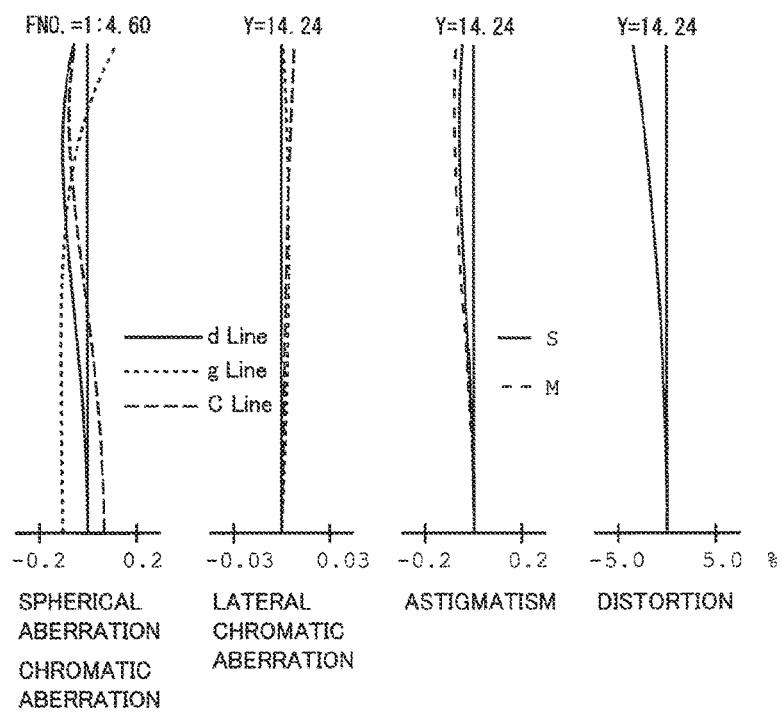
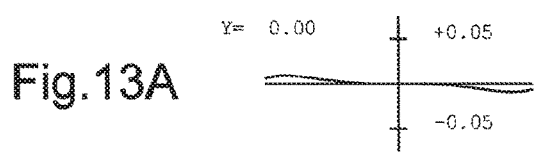
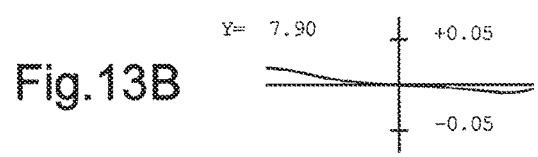
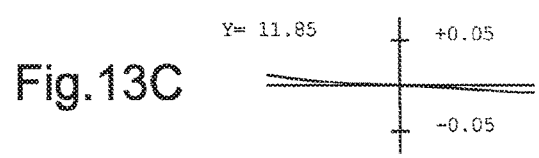
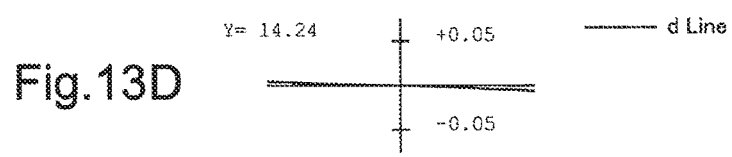

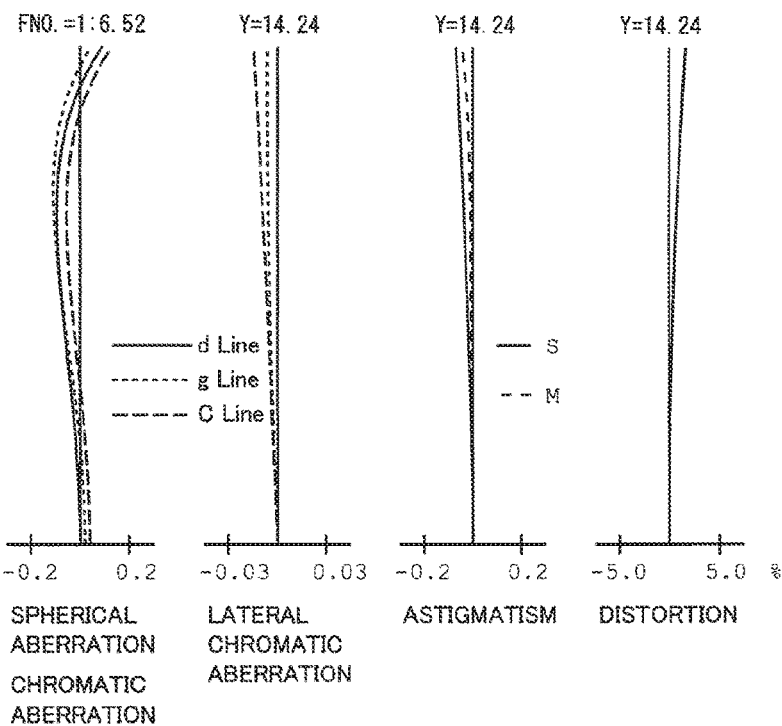

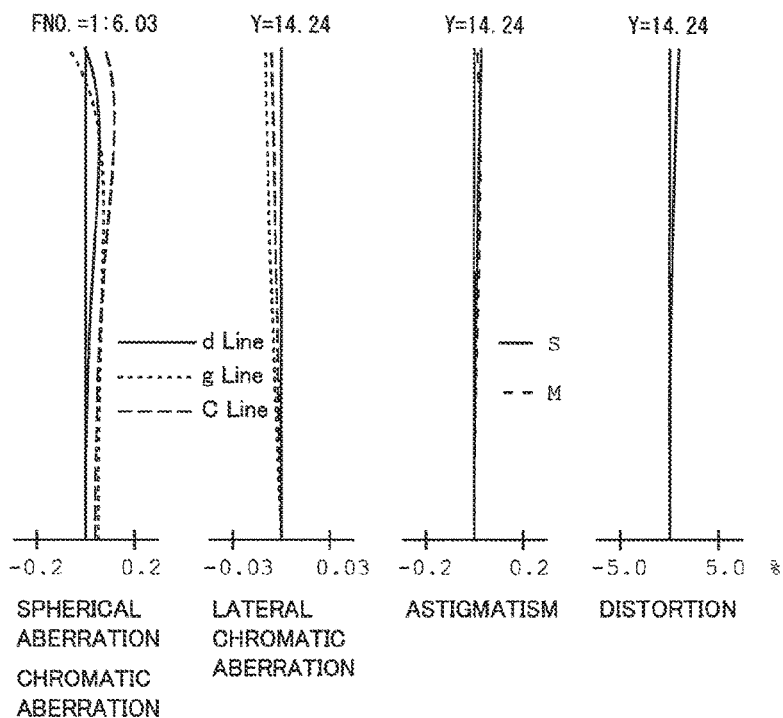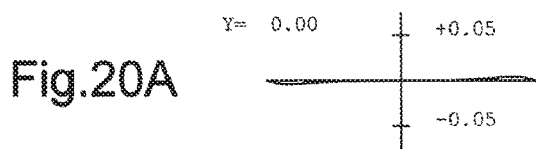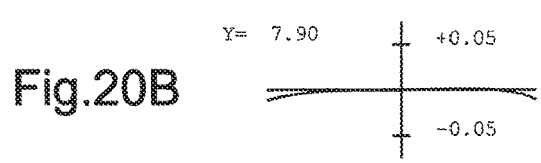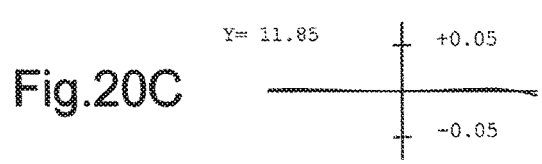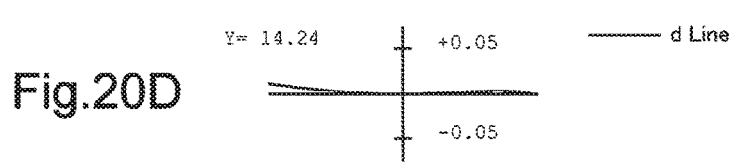

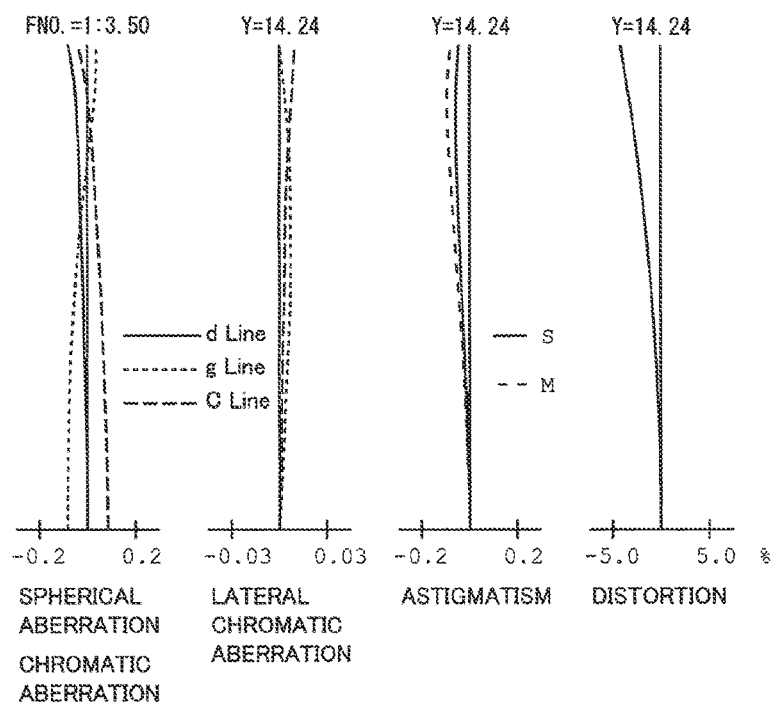
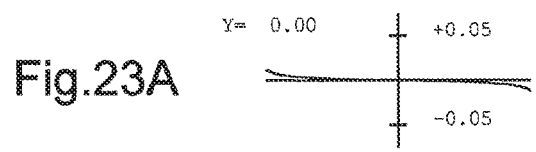
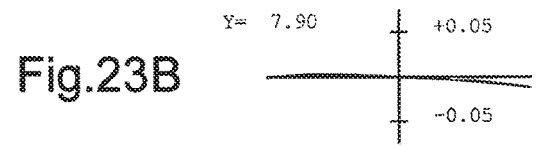
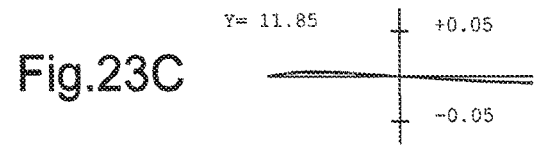
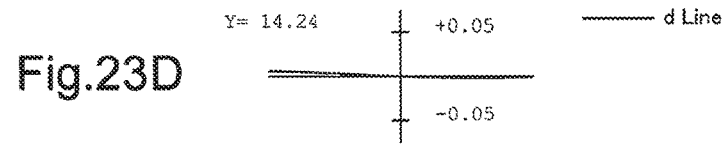

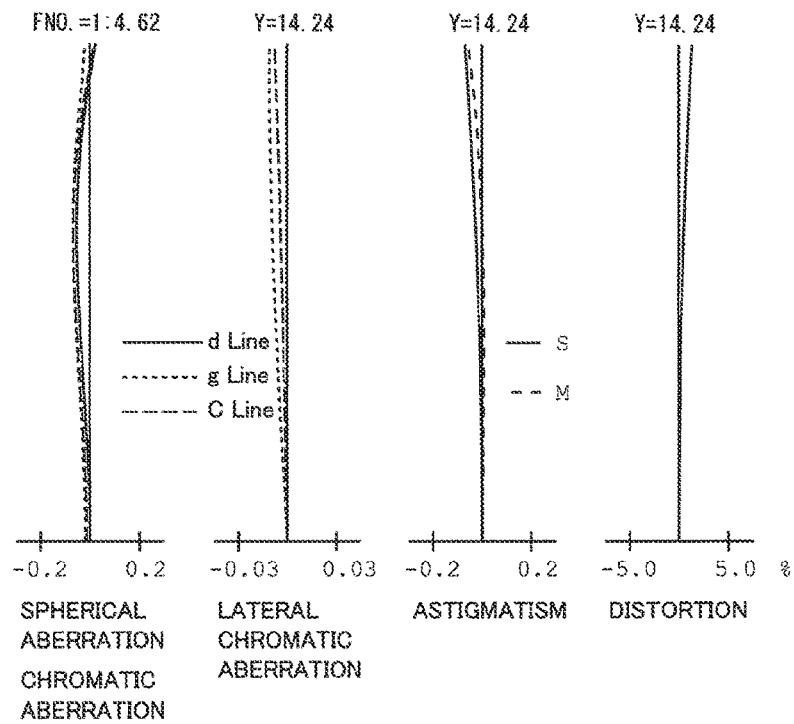
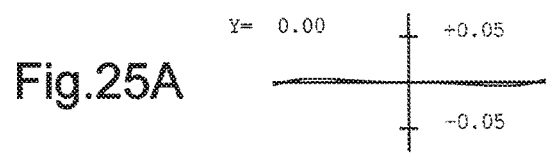
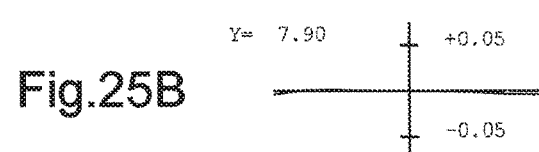
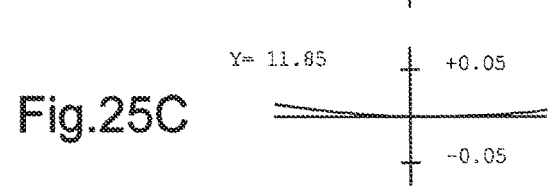
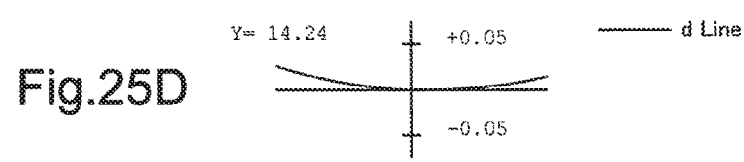

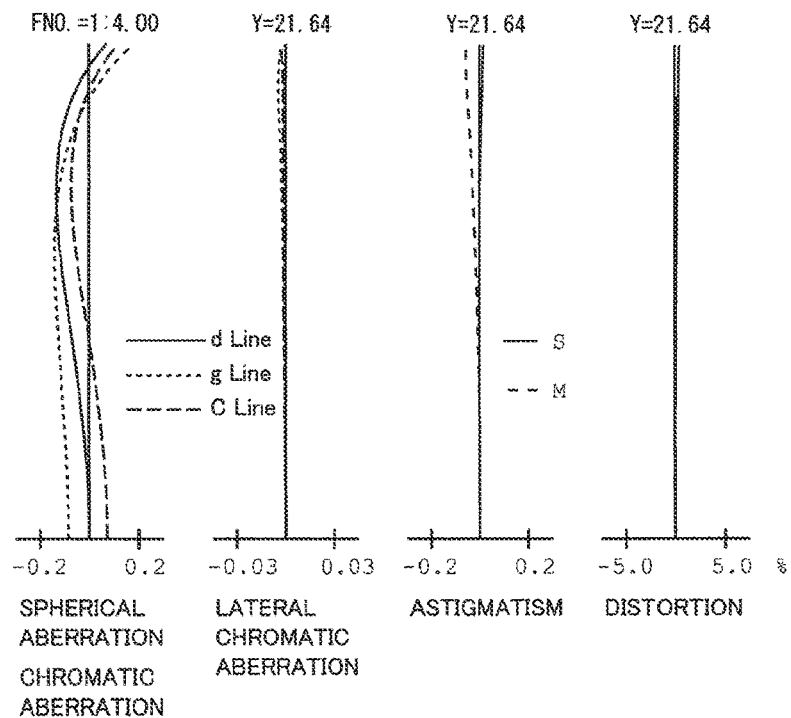
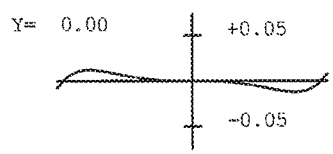
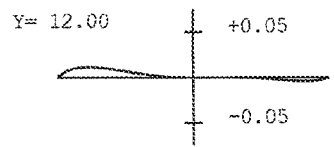
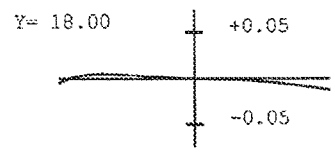
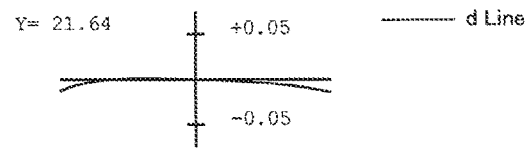

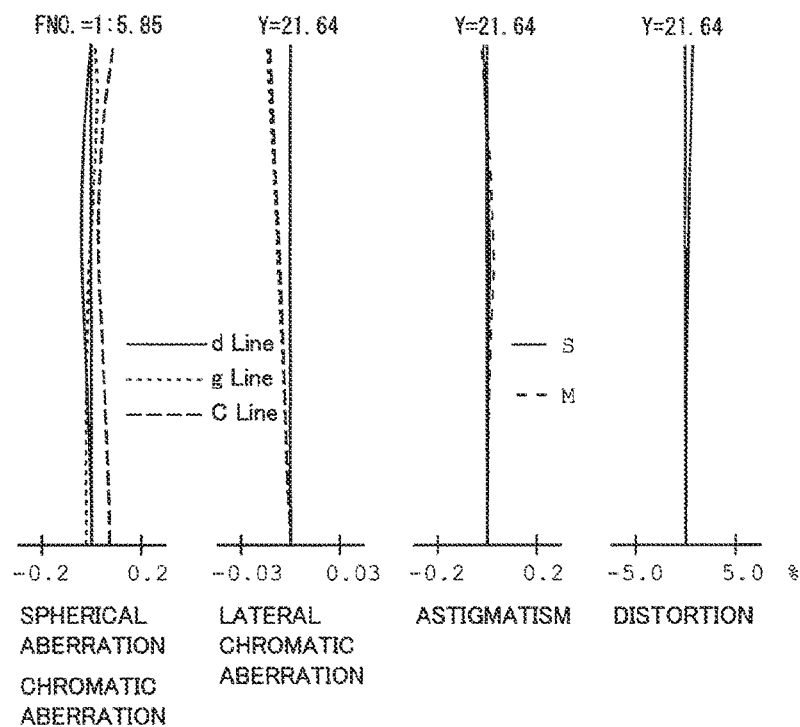
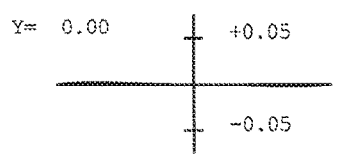
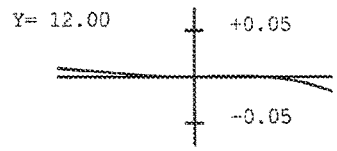
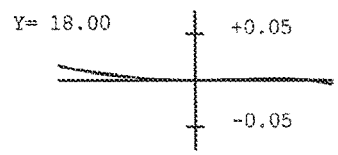
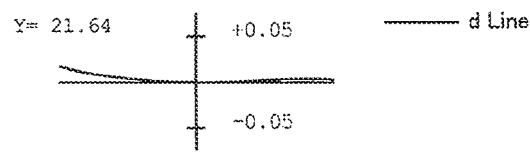

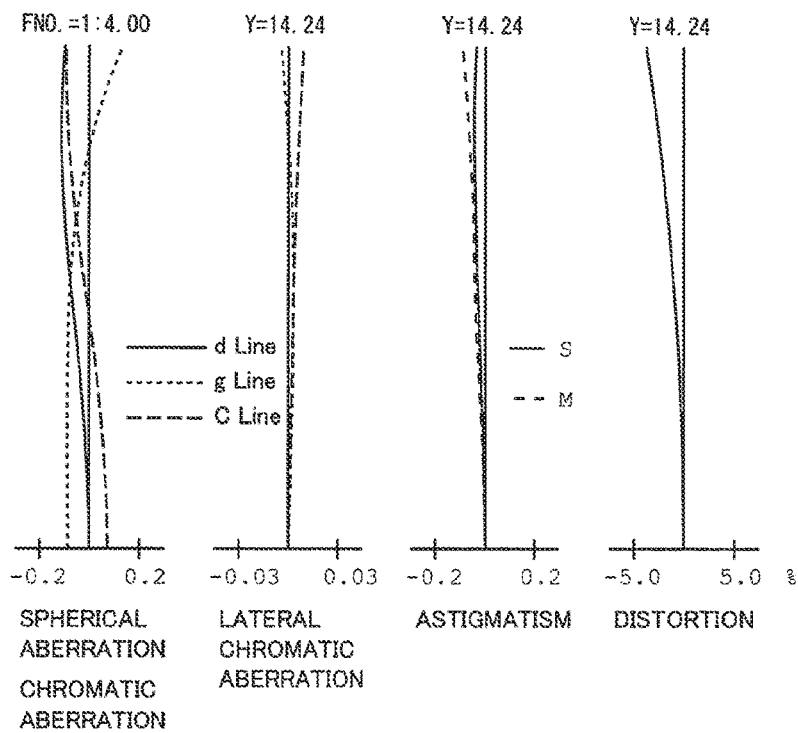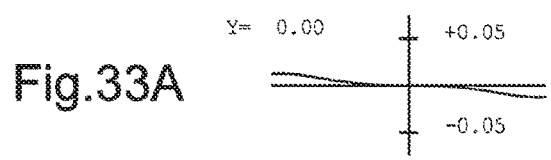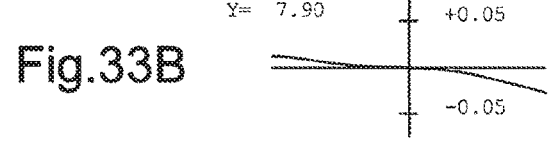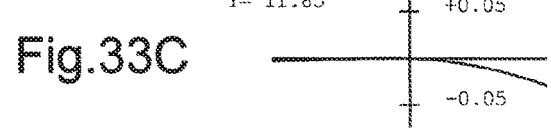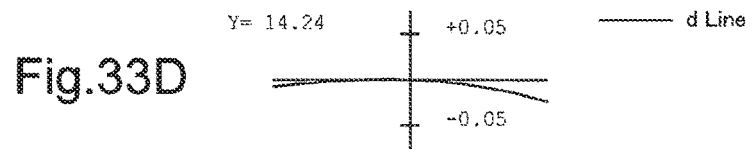

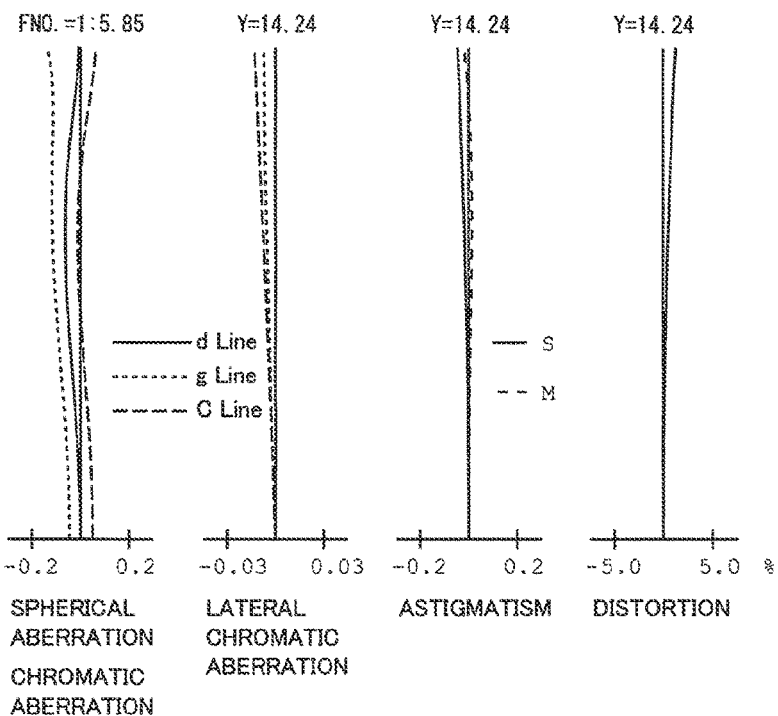
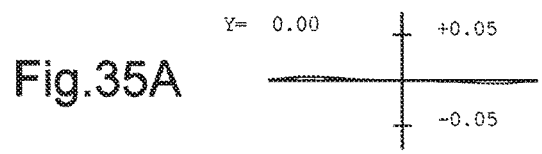
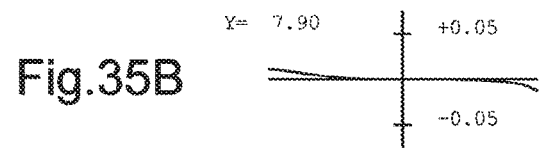
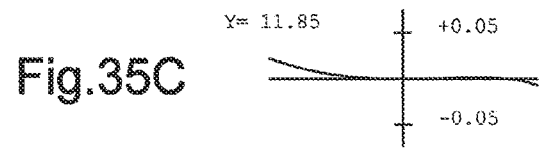
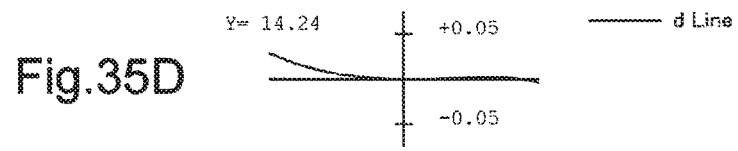

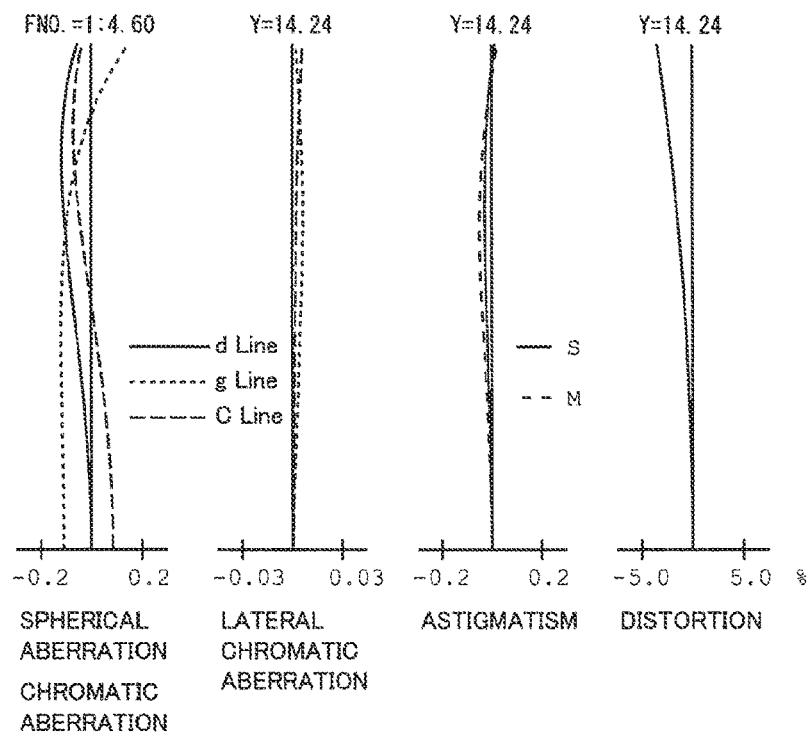
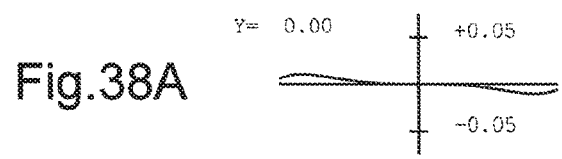
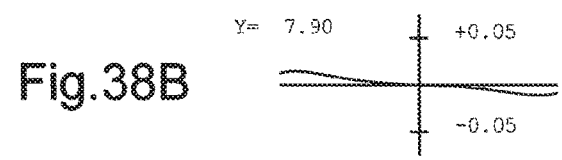
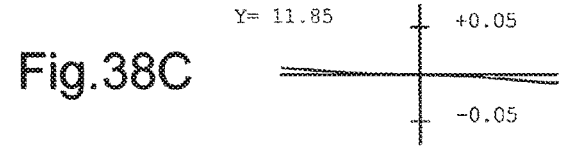
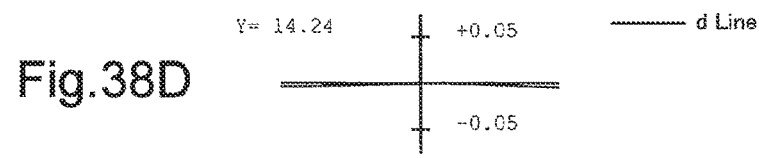

SPHERICAL ABERRATION CHROMATIC ABERRATION    LATERAL CHROMATIC ABERRATION    ASTIGMATISM    DISTORTION

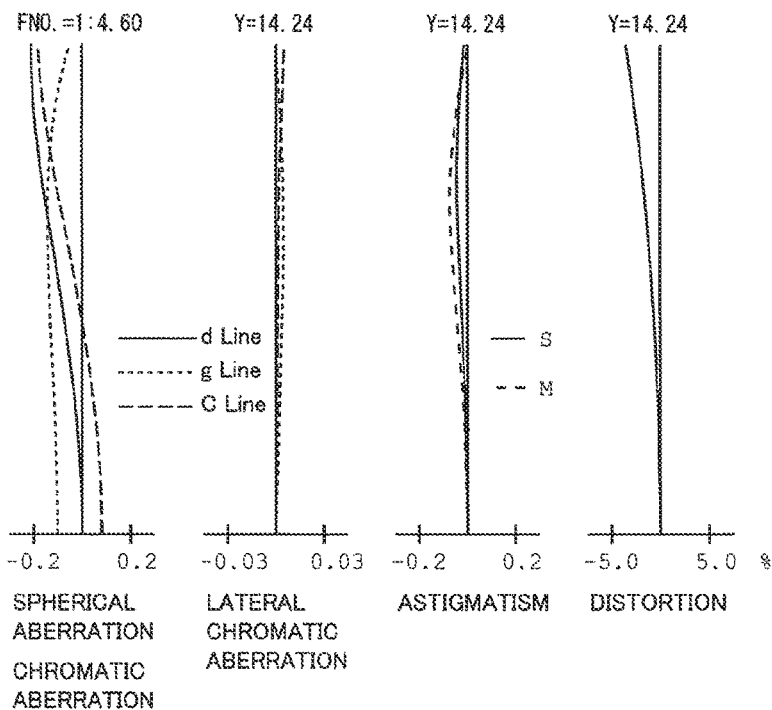
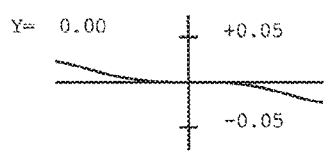
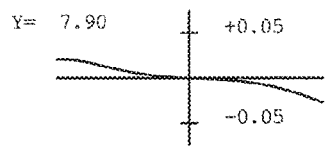
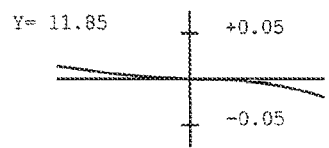
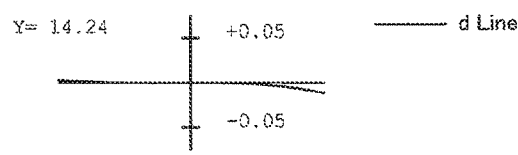

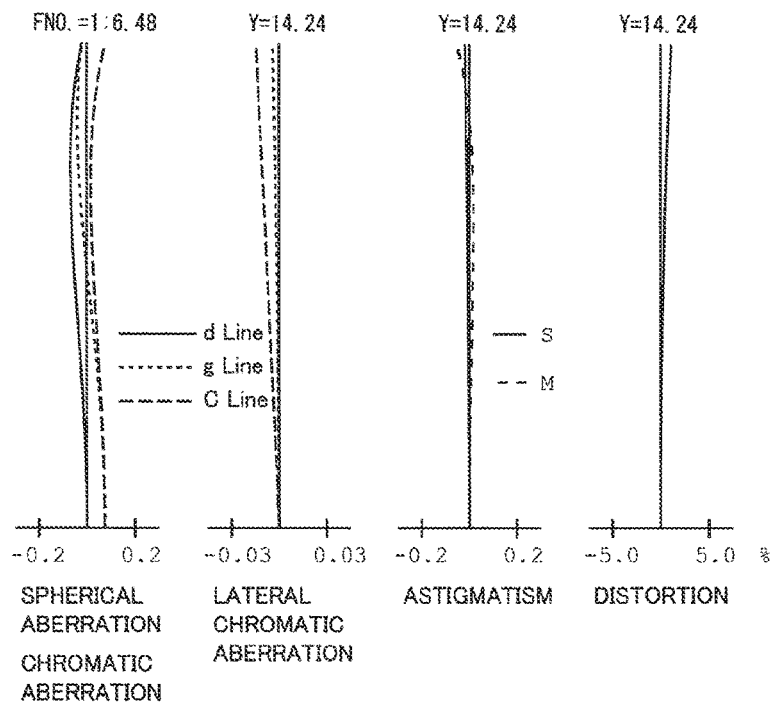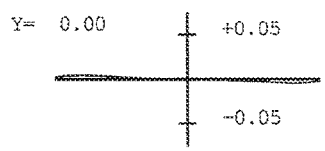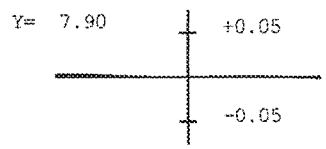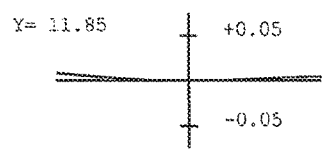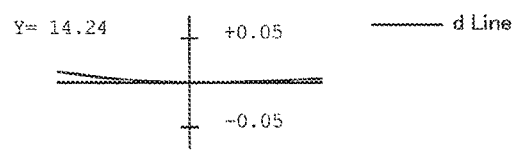

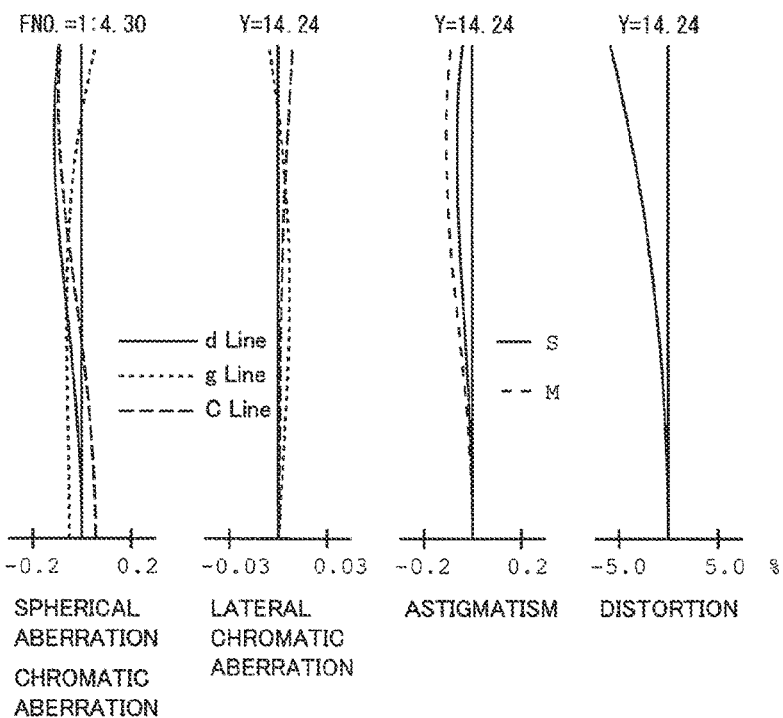
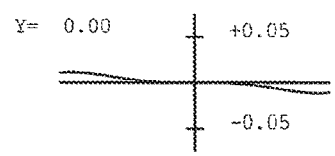
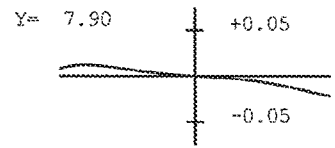
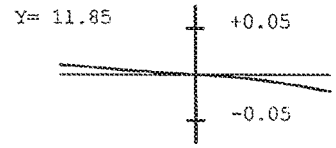
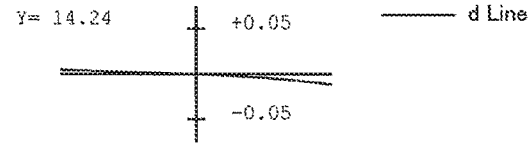

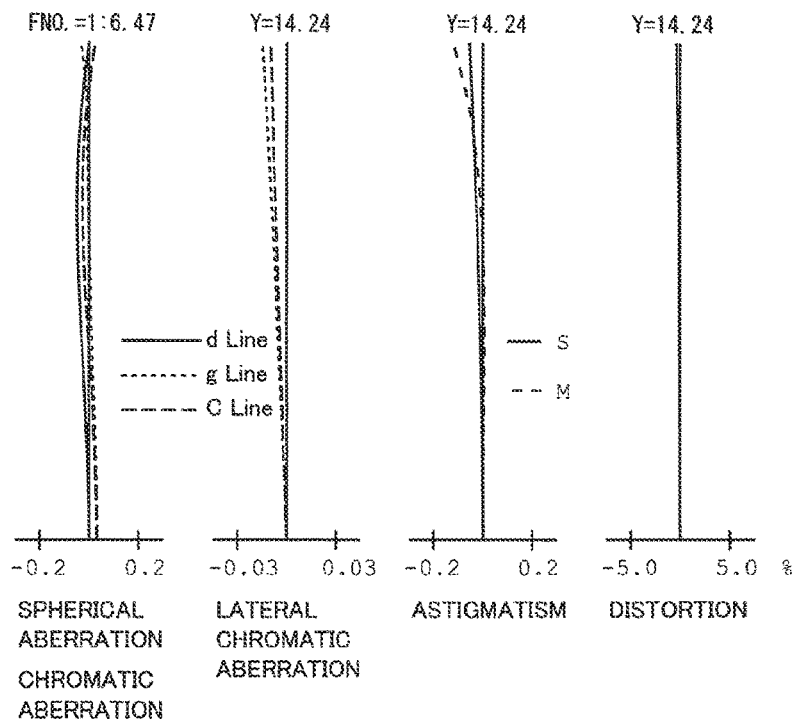
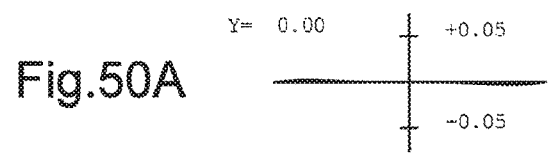
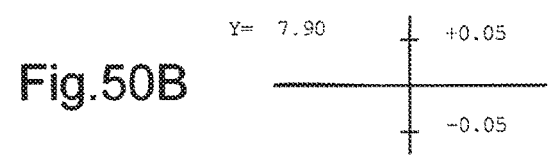
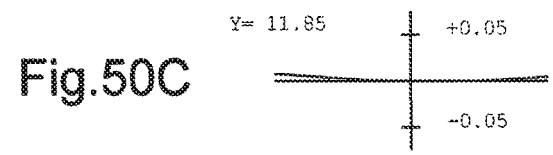
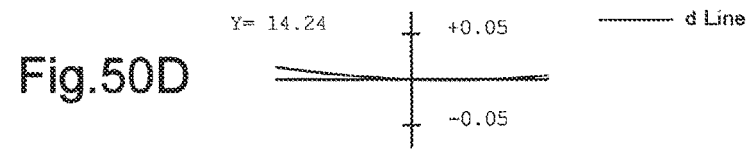

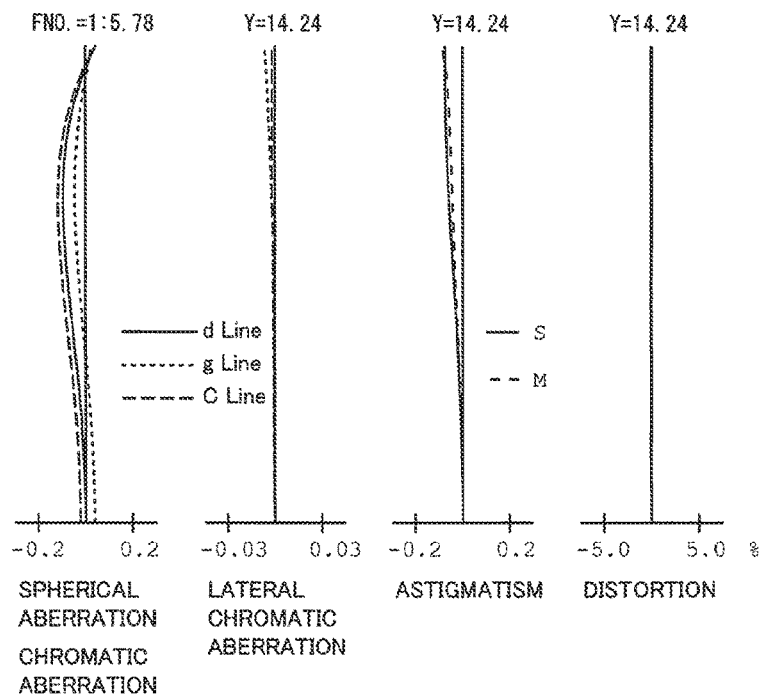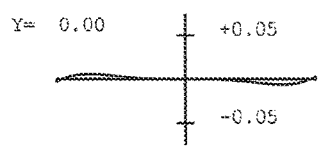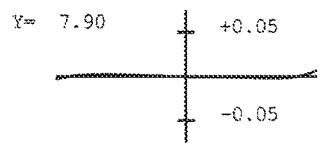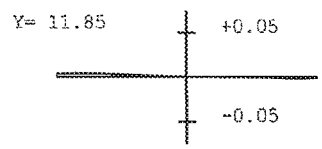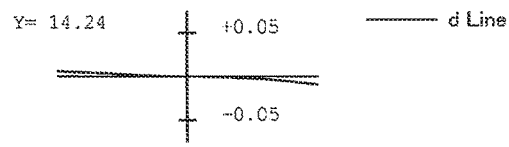

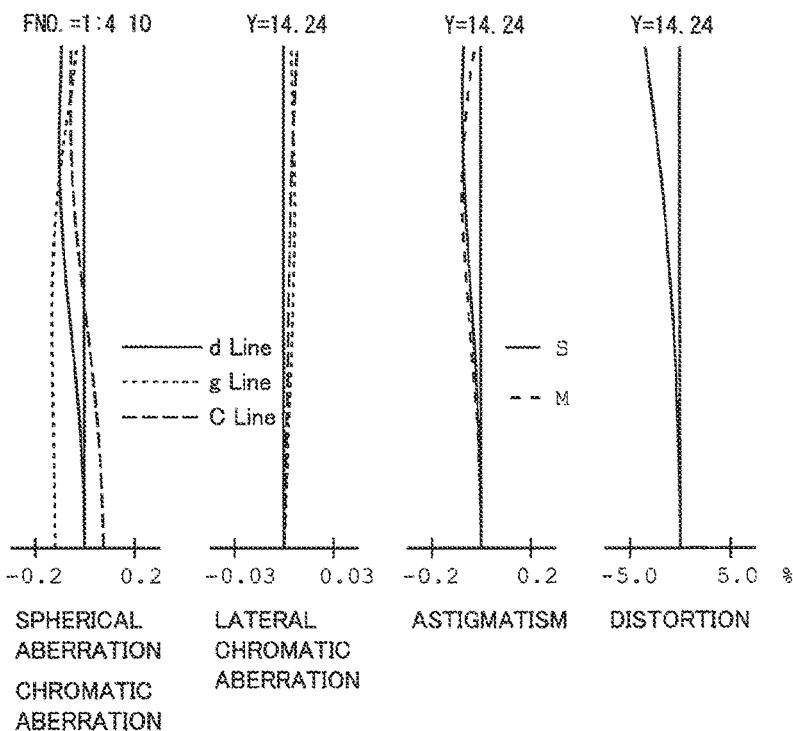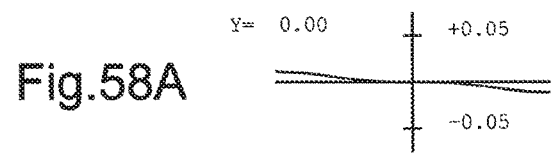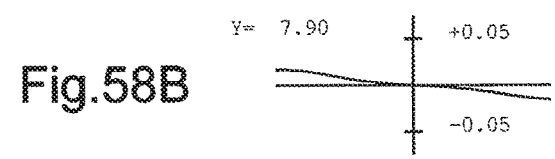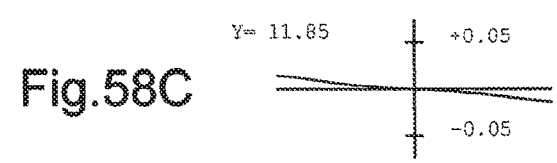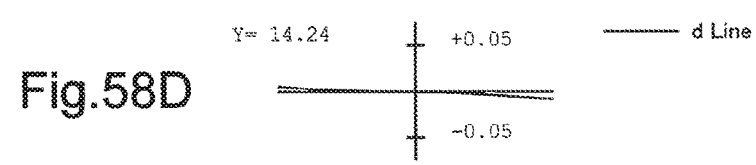

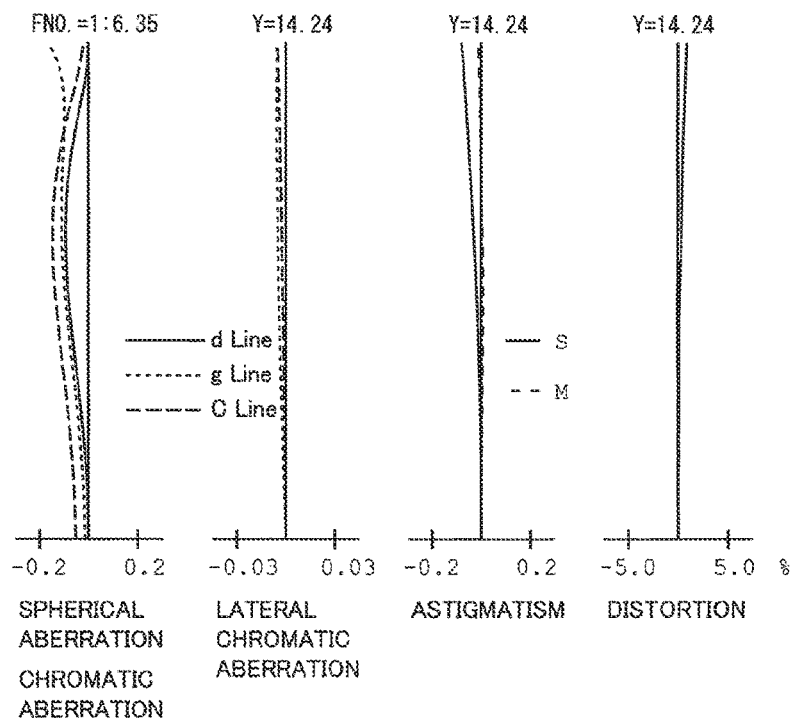
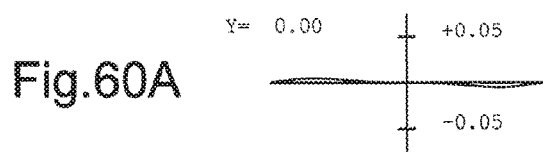
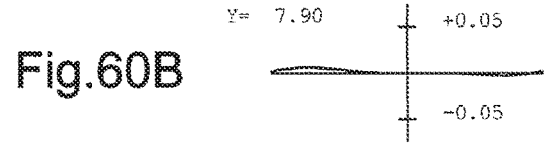
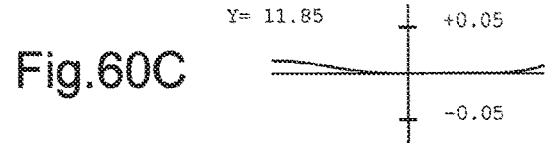
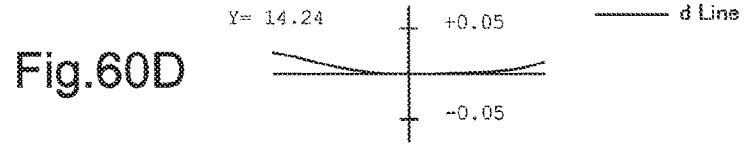

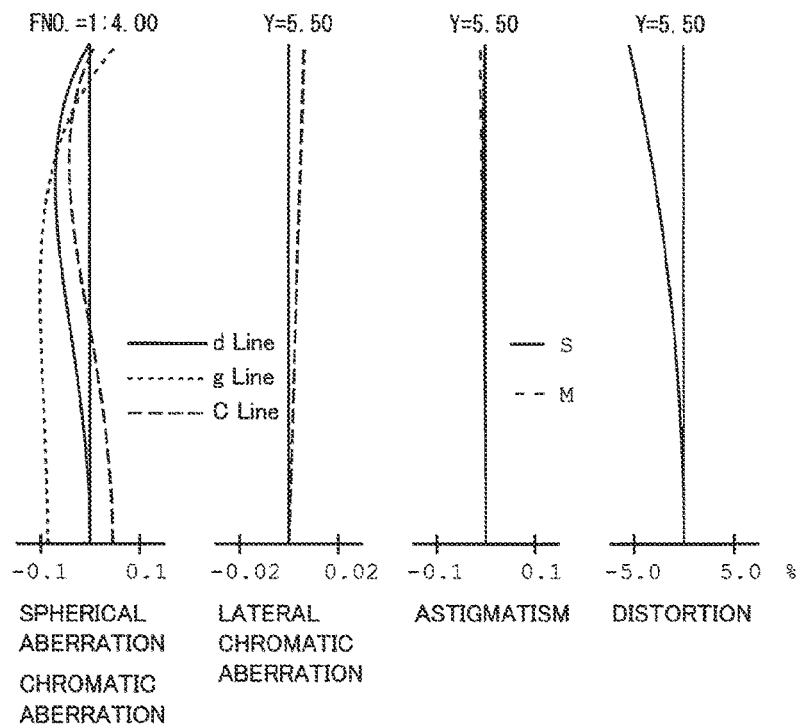
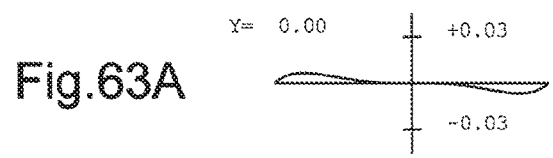
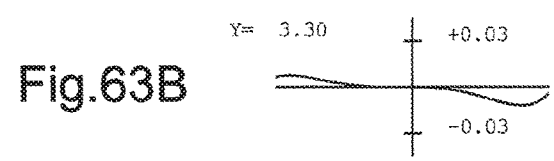
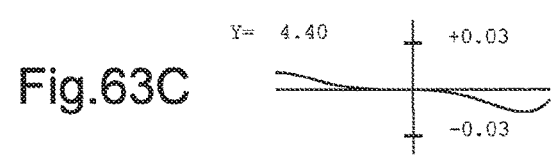
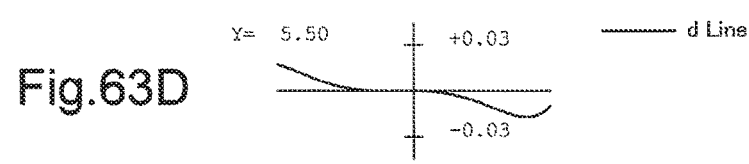

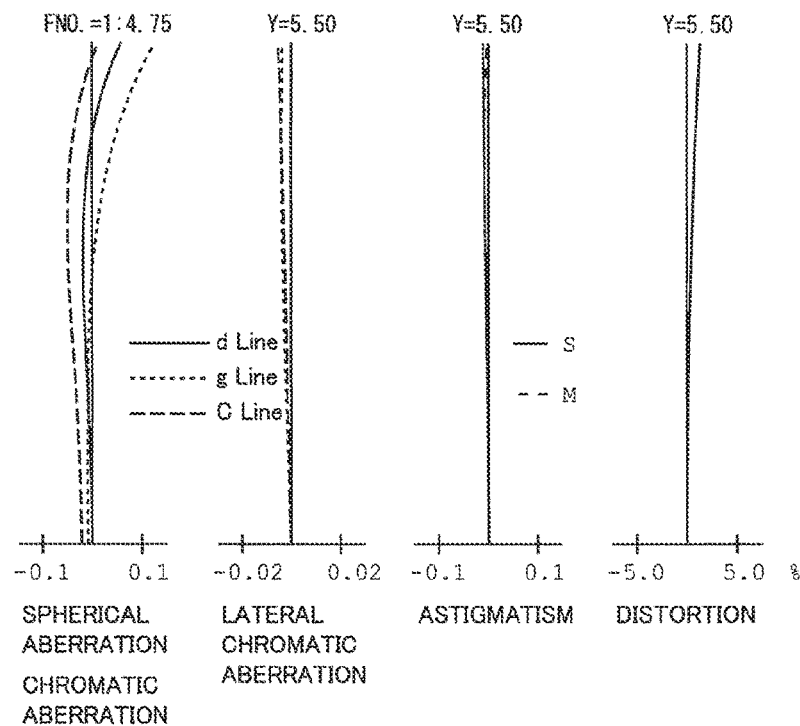
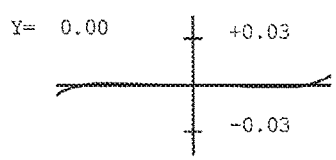
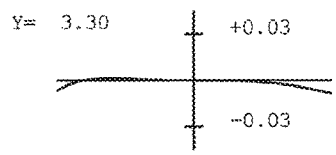
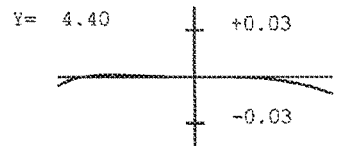
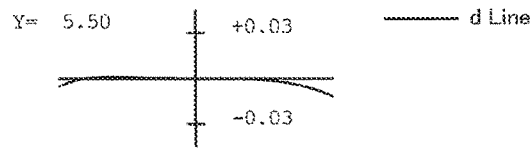

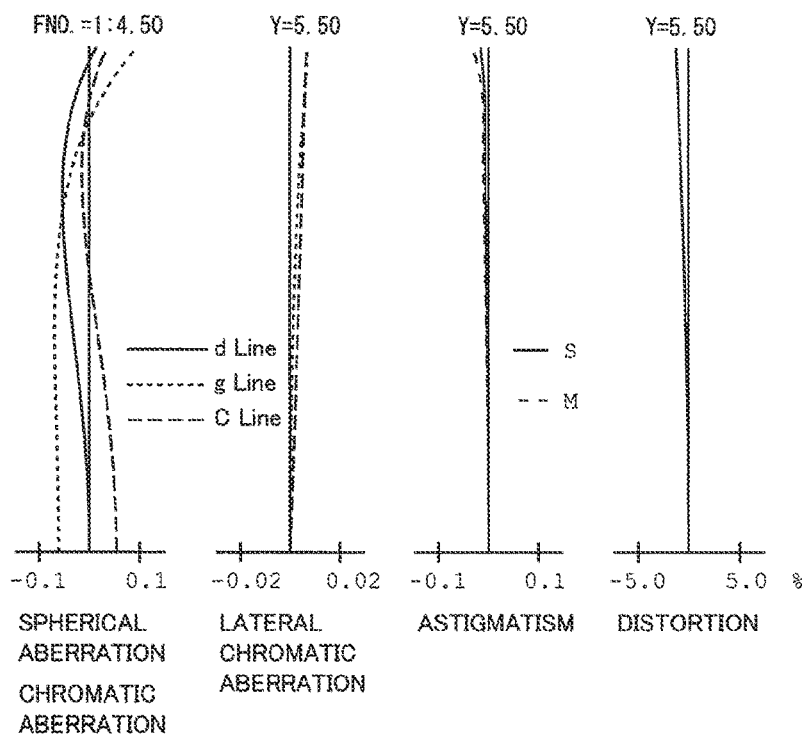
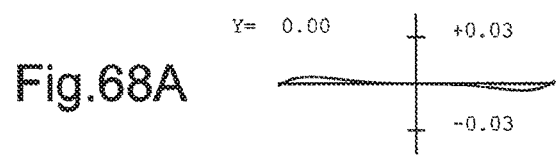

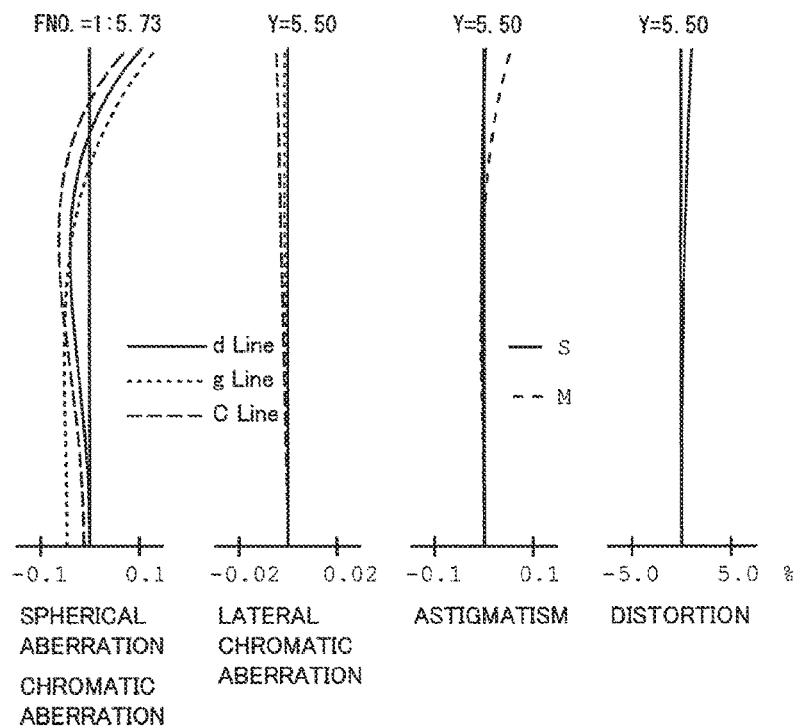
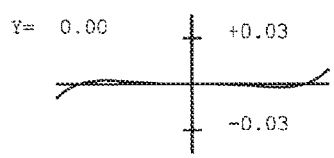
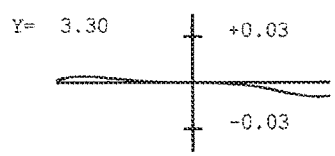
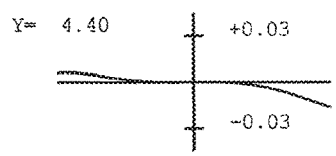
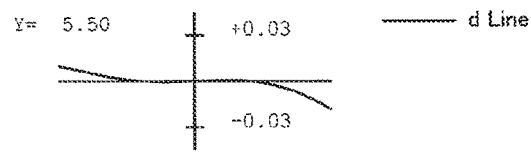

ZOOM LENS SYSTEM

BACKGROUND OF THE INVENTION

1. Field of the Invention

The present invention relates to a zoom lens system applied to a surveillance camera, a digital camera, and an interchangeable lens.

2. Description of Related Art

In recent years, there has been a demand for a zoom lens system that is miniaturized, has a higher zoom ratio, and has an extended (long) focal length at the telephoto side, especially for telephoto photography. Generally, a zoom lens system that has a focal length including a telephoto range has a problem with aberrations increasing as the focal length at the telephoto side increases, especially axial chromatic aberration and lateral chromatic aberration. Furthermore, the greater the focal length at the telephoto side, the greater the entrance pupil diameter on the lens, whereby spherical aberration and coma, which are very dependent on the pupil diameter, increase. Furthermore, the greater the zoom ratio, the greater the fluctuations in field curvature and astigmatism during zooming. Cameras in recent years have been heading towards higher pixelization, and therefore, there is a growing demand for the above-mentioned aberrations to be removed in a well-balanced manner.

Typically, a positive-lead zoom lens system is often used as a zoom lens system that includes a telephoto range. For example, in Japanese Unexamined Patent Publication No. 2011-209347 (Patent Literature 1), a zoom lens system configured of a positive lens group, a negative lens group, a positive lens group, a negative lens group, and a positive lens group, in that order from the object side (i.e., five lens groups), and a zoom lens system configured of a positive lens group, a negative lens group, a positive lens group, a positive lens group, a negative lens group and a positive lens group, in that order from the object side (i.e., six lens groups), are disclosed. Furthermore, in Japanese Unexamined Patent Publication No. 2011-099924 (Patent Literature 2), a zoom lens system configured of a positive lens group, a negative lens group, and a positive lens group, in that order from the object side (i.e., three lens groups), and a zoom lens system configured of a positive lens group, a negative lens group, a positive lens group, a negative lens group, and a positive lens group, in that order from the object side (i.e., five lens groups), are disclosed. Furthermore, in Japanese Unexamined Patent Publication No. 2008-122775 (Patent Literature 3), a zoom lens system configured of a positive lens group, a negative lens group, and a positive lens group, in that order from the object side (i.e., three lens groups), and a zoom lens system configured of a positive lens group, a negative lens group, a positive lens group, and a positive lens group, in that order from the object side (i.e., four lens groups), are disclosed.

However, in the zoom lens system disclosed in Patent Literature 1, the correction of spherical aberration and astigmatism is insufficient. Furthermore, in the zoom lens systems disclosed in Patent Literatures 2 and 3, a large amount of axial chromatic aberration at the telephoto side, especially in the secondary spectrum, remains. Accordingly, the zoom lens systems of Patent Literatures 1 through 3 all tend to have a deteriorated optical quality.

SUMMARY OF THE INVENTION

The present invention has been devised in view of the above mentioned problems, and provides a positive-lead zoom lens system that achieves a superior optical quality by favorably correcting various aberrations.

According to an aspect of the present invention, a zoom lens system is provided, including a positive first lens group, and a subsequent rear lens group provided subsequently behind the first lens group, in that order from the object side. The first lens group includes at least one positive single lens element, a negative meniscus lens element having a convex surface on the object side, and at least one positive lens element, in that order from the object side. A distance between the first lens group and the subsequent rear lens group increases upon zooming from the short focal length extremity to the long focal length extremity. The following conditions (1) and (2) are satisfied:

$$fG1/fn < -1.50 \tag{1}$$

and $$65 < \nu p_{ave} \tag{2},$$

wherein fG1 designates the focal length of the first lens group, fn designates the focal length of the negative meniscus lens element that is provided within the first lens group, and $\nu p_{ave}$ designates the average value of the Abbe numbers with respect to the d-line of the positive lens elements that are provided within the first lens group.

It is desirable for the following condition (1') to be satisfied within the scope of condition (1):

$$-3.30 < fG1/fn < -1.50 \tag{1'}$$

It is desirable for the following condition (2') to be satisfied within the scope of condition (2):

$$67 < \nu p_{ave} \tag{2'}$$

It is desirable for the subsequent rear lens group to include at least one negative lens group, and for a negative $n^{th}$ lens group that is provided closest to the object side within the subsequent rear lens group to include a negative lens element that is provided closest to the object side within the negative $n^{th}$ lens group.

It is desirable for the subsequent rear lens group to include at least one negative lens group, and for the following condition (3) to be satisfied:

$$fG1/fGn < -0.70 \tag{3},$$

wherein fG1 designates the focal length of the first lens group, and fGn designates the focal length of the negative $n^{th}$ lens group that is provided closest to the object side within the subsequent rear lens group.

It is desirable for the following condition (3') to be satisfied within the scope of condition (3):

$$-5.50 < fG1/fGn < -0.70 \tag{3'}$$

It is desirable for the following condition (4) to be satisfied:

$$1.650 < nn \tag{4},$$

wherein nn designates the refractive index with respect to the d-line of the negative meniscus lens element that is provided within the first lens group.

It is desirable for the following condition (4') to be satisfied within the scope of condition (4):

$$1.650 < nn < 1.835 \tag{4'}$$

It is desirable for the following condition (5) to be satisfied:

$$1.40 < fG1/R1p < 3.30 \tag{5},$$

wherein fG1 designates the focal length of the first lens group, and Rip designates the paraxial radius of curvature of the surface closest to the object side on the first lens group.

It is desirable for the following condition (6) to be satisfied:

$$1.30<(R1n+R2n)/(R1n-R2n) \qquad (6),$$

wherein R1n designates the paraxial radius of curvature of the surface on the object side of the negative meniscus lens element provided within the first lens group, and R2n designates the paraxial radius of curvature of the surface on the image side of the negative meniscus lens element provided within the first lens group.

It is desirable for the following condition (6') to be satisfied within the scope of condition (6):

$$1.30<(R1n+R2n)/(R1n-R2n)<3.30 \qquad (6').$$

It is desirable for the subsequent rear lens group to include at least one negative lens group, and for a negative $n^{th}$ lens group that is provided closest to the object side within the subsequent rear lens group to include a negative lens element that is provided closest to the object side within the negative $n^{th}$ lens group. The following condition (7) is satisfied:

$$fGn/R2Gn<-1.10 \qquad (7),$$

wherein fGn designates the focal length of the negative $n^{th}$ lens group that is provided closest to the object side within the subsequent rear lens group, and R2Gn designates the paraxial radius of curvature of the surface on the image side of the negative lens element that is provided closest to the object side within the $n^{th}$ lens group.

It is desirable for the following condition (7') to be satisfied within the scope of condition (7):

$$-3.60<fGn/R2Gn<-1.10 \qquad (7').$$

It is desirable for the subsequent rear lens group to include at least one negative lens group, and for a negative $n^{th}$ lens group that is provided closest to the object side within the subsequent rear lens group to include a negative lens element and a positive lens element, in that order from the object side.

It is desirable for the subsequent rear lens group to include at least one negative lens group, and for a negative $n^{th}$ lens group that is provided closest to the object side within the subsequent rear lens group to include a negative lens element provided closest to the image side within the negative $n^{th}$ lens group.

It is desirable for the negative lens element that is provided closest to the image side, within the negative $n^{th}$ lens group, to include a concave surface on the object side, wherein the following condition (8) is satisfied:

$$29<vGn \qquad (8),$$

wherein vGn designates the Abbe number with respect to the d-line of the negative lens element that is provided closest to the image side within the $n^{th}$ lens group.

It is desirable for the following condition (8') to be satisfied within the scope of condition (8):

$$37<vGn \qquad (8').$$

It is desirable for the subsequent rear lens group to include at least one negative lens group, and for a negative $n^{th}$ lens group that is provided closest to the object side within the subsequent rear lens group to include a negative second lens group provided immediately behind the first lens group on the image side thereof.

It is desirable for the following condition (9) to be satisfied:

$$\theta gFn-(0.6440-0.001682\times vn)<0 \qquad (9),$$

wherein vn designates the Abbe number with respect to the d-line of the negative meniscus lens element provided within the first lens group, θgFn designates the partial dispersion ratio at the short wavelength side of the negative meniscus lens element provided within the first lens group, θgF=(ng−nF)/(nF−nC), ng designates the refractive index at the g-line, nF designates the refractive index at the F-line, and nC designates the refractive index at the C-line.

It is desirable for the following condition (10) to be satisfied:

$$34<vn \qquad (10),$$

wherein vn designates the Abbe number with respect to the d-line of the negative meniscus lens element provided within the first lens group.

It is desirable for the following condition (10') to be satisfied within the scope of condition (10):

$$34<vn<50 \qquad (10').$$

It is desirable for the following condition (11) to be satisfied:

$$2.40<fG1/R2n \qquad (11),$$

wherein fG1 designates the focal length of the first lens group, and R2n designates the paraxial radius of curvature of the surface on the image side of the negative meniscus lens element provided within the first lens group.

It is desirable for the following condition (11') to be satisfied within the scope of condition (11):

$$3.50<fG1/R2n<5.10 \qquad (11').$$

It is desirable for the following condition (12) to be satisfied:

$$4.00<fG1/1Gd<13.00 \qquad (12),$$

wherein fG1 designates the focal length of the first lens group, and 1Gd designates the distance along the optical axis from the surface closest to the object side on the first lens group to the surface closest to the image side on the first lens group.

It is desirable for the following condition (13) to be satisfied:

$$0.80<fG1/fw \qquad (13),$$

wherein fG1 designates the focal length of the first lens group, and fw designates the focal length of the entire the zoom lens system at the short focal length extremity.

It is desirable for the following condition (13') and also condition (13") to be satisfied within the scope of condition (13):

$$1.40<fG1/fw<9.80 \qquad (13'), \text{ and}$$

$$2.50<fG1/fw<6.60 \qquad (13").$$

It is desirable for the following condition (14) to be satisfied:

$$0.60<fG1/(fw\times ft)^{1/2} \qquad (14),$$

wherein fG1 designates the focal length of the first lens group, fw designates the focal length of the entire the zoom lens system at the short focal length extremity, and ft designates the focal length of the entire the zoom lens system at the long focal length extremity.

It is desirable for the following condition (14') and also condition (14") to be satisfied within the scope of condition (14):

$$1.10 < fG1/(fw \times ft)^{1/2} < 2.50 \qquad (14'), \text{ and}$$

$$1.10 < fG1/(fw \times ft)^{1/2} < 2.00 \qquad (14").$$

It is desirable for a positive meniscus lens element having a convex surface on the object side to be provided immediately in front on the object side of the negative meniscus lens element that is provided within the first lens group.

It is desirable for one or two positive lens elements to be provided on the image side of the negative meniscus lens element that is provided within the first lens group.

It is desirable for the first lens group to be configured to move toward the object side upon zooming from the short focal length extremity to the long focal length extremity.

According to the present invention, a positive-lead zoom lens system can be provided that achieves a superior optical quality by favorably correcting various aberrations.

The present disclosure relates to subject matter contained in Japanese Patent Application No. 2016-037412 (filed on Feb. 29, 2016) and Japanese Patent Application No. 2016-246429 (filed on Dec. 20, 2016) which are expressly incorporated herein in their entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the zoom lens system of FIG. 1, at the short focal length extremity when focused on an object at infinity;

FIGS. 3A, 3B, 3C and 3D show lateral aberrations that occurred in the zoom lens system of FIG. 1, at the short focal length extremity when focused on an object at infinity;

FIGS. 4A, 4B, 4C and 4D show various aberrations that occurred in the zoom lens system of FIG. 1, at the long focal length extremity when focused on an object at infinity;

FIGS. 5A, 5B, 5C and 5D show lateral aberrations that occurred in the zoom lens system of FIG. 1, at the long focal length extremity when focused on an object at infinity;

FIGS. 7A, 7B, 7C and 7D show various aberrations that occurred in the zoom lens system of FIG. 6, at the short focal length extremity when focused on an object at infinity;

FIGS. 8A, 8B, 8C and 8D show lateral aberrations that occurred in the zoom lens system of FIG. 6, at the short focal length extremity when focused on an object at infinity;

FIGS. 9A, 9B, 9C and 9D show various aberrations that occurred in the zoom lens system of FIG. 6, at the long focal length extremity when focused on an object at infinity;

FIGS. 10A, 10B, 10C and 10D show lateral aberrations that occurred in the zoom lens system of FIG. 6, at the long focal length extremity when focused on an object at infinity;

FIGS. 12A, 12B, 12C and 12D show various aberrations that occurred in the zoom lens system of FIG. 11, at the short focal length extremity when focused on an object at infinity;

FIGS. 13A, 13B, 13C and 13D show lateral aberrations that occurred in the zoom lens system of FIG. 11, at the short focal length extremity when focused on an object at infinity;

FIGS. 14A, 14B, 14C and 14D show various aberrations that occurred in the zoom lens system of FIG. 11, at the long focal length extremity when focused on an object at infinity;

FIGS. 15A, 15B, 15C and 15D show lateral aberrations that occurred in the zoom lens system of FIG. 11, at the long focal length extremity when focused on an object at infinity;

FIGS. 19A, 19B, 19C and 19D show various aberrations that occurred in the zoom lens system of FIG. 16, at the long focal length extremity when focused on an object at infinity;

FIGS. 20A, 20B, 20C and 20D show lateral aberrations that occurred in the zoom lens system of FIG. 16, at the long focal length extremity when focused on an object at infinity;

FIGS. 22A, 22B, 22C and 22D show various aberrations that occurred in the zoom lens system of FIG. 21, at the short focal length extremity when focused on an object at infinity;

FIGS. 23A, 23B, 23C and 23D show lateral aberrations that occurred in the zoom lens system of FIG. 21, at the short focal length extremity when focused on an object at infinity;

FIGS. 24A, 24B, 24C and 24D show various aberrations that occurred in the zoom lens system of FIG. 21, at the long focal length extremity when focused on an object at infinity;

FIGS. 25A, 25B, 25C and 25D show lateral aberrations that occurred in the zoom lens system of FIG. 21, at the long focal length extremity when focused on an object at infinity;

FIGS. 27A, 27B, 27C and 27D show various aberrations that occurred in the zoom lens system of FIG. 26, at the short focal length extremity when focused on an object at infinity;

FIGS. 28A, 28B, 28C and 28D show lateral aberrations that occurred in the zoom lens system of FIG. 26, at the short focal length extremity when focused on an object at infinity;

FIGS. 29A, 29B, 29C and 29D show various aberrations that occurred in the zoom lens system of FIG. 26, at the long focal length extremity when focused on an object at infinity;

FIGS. 30A, 30B, 30C and 30D show lateral aberrations that occurred in the zoom lens system of FIG. 26, at the long focal length extremity when focused on an object at infinity;

FIGS. 32A, 32B, 32C and 32D show various aberrations that occurred in the zoom lens system of FIG. 31, at the short focal length extremity when focused on an object at infinity;

FIGS. 33A, 33B, 33C and 33D show lateral aberrations that occurred in the zoom lens system of FIG. 31, at the short focal length extremity when focused on an object at infinity;

FIGS. 34A, 34B, 34C and 34D show various aberrations that occurred in the zoom lens system of FIG. 31, at the long focal length extremity when focused on an object at infinity;

FIGS. 35A, 35B, 35C and 35D show lateral aberrations that occurred in the zoom lens system of FIG. 31, at the long focal length extremity when focused on an object at infinity;

FIGS. 37A, 37B, 37C and 37D show various aberrations that occurred in the zoom lens system of FIG. 36, at the short focal length extremity when focused on an object at infinity;

FIGS. 38A, 38B, 38C and 38D show lateral aberrations that occurred in the zoom lens system of FIG. 36, at the short focal length extremity when focused on an object at infinity;

FIGS. 42A, 42B, 42C and 42D show various aberrations that occurred in the zoom lens system of FIG. 41, at the short focal length extremity when focused on an object at infinity;

FIGS. 43A, 43B, 43C and 43D show lateral aberrations that occurred in the zoom lens system of FIG. 41, at the short focal length extremity when focused on an object at infinity;

FIGS. 44A, 44B, 44C and 44D show various aberrations that occurred in the zoom lens system of FIG. 41, at the long focal length extremity when focused on an object at infinity;

FIGS. 45A, 45B, 45C and 45D show lateral aberrations that occurred in the zoom lens system of FIG. 41, at the long focal length extremity when focused on an object at infinity;

FIGS. 47A, 47B, 47C and 47D show various aberrations that occurred in the zoom lens system of FIG. 46, at the short focal length extremity when focused on an object at infinity;

FIGS. 48A, 48B, 48C and 48D show lateral aberrations that occurred in the zoom lens system of FIG. 46, at the short focal length extremity when focused on an object at infinity;

FIGS. 49A, 49B, 49C and 49D show various aberrations that occurred in the zoom lens system of FIG. 46, at the long focal length extremity when focused on an object at infinity;

FIGS. 50A, 50B, 50C and 50D show lateral aberrations that occurred in the zoom lens system of FIG. 46, at the long focal length extremity when focused on an object at infinity;

FIGS. 54A, 54B, 54C and 54D show various aberrations that occurred in the zoom lens system of FIG. 51, at the long focal length extremity when focused on an object at infinity;

FIGS. 55A, 55B, 55C and 55D show lateral aberrations that occurred in the zoom lens system of FIG. 51, at the long focal length extremity when focused on an object at infinity;

FIGS. 57A, 57B, 57C and 57D show various aberrations that occurred in the zoom lens system of FIG. 56, at the short focal length extremity when focused on an object at infinity;

FIGS. 58A, 58B, 58C and 58D show lateral aberrations that occurred in the zoom lens system of FIG. 56, at the short focal length extremity when focused on an object at infinity;

FIGS. 59A, 59B, 59C and 59D show various aberrations that occurred in the zoom lens system of FIG. 56, at the long focal length extremity when focused on an object at infinity;

FIGS. 60A, 60B, 60C and 60D show lateral aberrations that occurred in the zoom lens system of FIG. 56, at the long focal length extremity when focused on an object at infinity;

FIGS. 62A, 62B, 62C and 62D show various aberrations that occurred in the zoom lens system of FIG. 61, at the short focal length extremity when focused on an object at infinity;

FIGS. 63A, 63B, 63C and 63D show lateral aberrations that occurred in the zoom lens system of FIG. 61, at the short focal length extremity when focused on an object at infinity;

FIGS. 64A, 64B, 64C and 64D show various aberrations that occurred in the zoom lens system of FIG. 61, at the long focal length extremity when focused on an object at infinity;

FIGS. 65A, 65B, 65C and 65D show lateral aberrations that occurred in the zoom lens system of FIG. 61, at the long focal length extremity when focused on an object at infinity;

FIGS. 67A, 67B, 67C and 67D show various aberrations that occurred in the zoom lens system of FIG. 66, at the short focal length extremity when focused on an object at infinity;

FIGS. 68A, 68B, 68C and 68D show lateral aberrations that occurred in the zoom lens system of FIG. 66, at the short focal length extremity when focused on an object at infinity;

FIGS. 69A, 69B, 69C and 69D show various aberrations that occurred in the zoom lens system of FIG. 66, at the long focal length extremity when focused on an object at infinity;

FIGS. 70A, 70B, 70C and 70D show lateral aberrations that occurred in the zoom lens system of FIG. 66, at the long focal length extremity when focused on an object at infinity;

DESCRIPTION OF THE EMBODIMENTS

<Positive/Negative/Positive/Negative 4-Lens-Group Zoom Lens System>

As shown in the zoom path diagrams of FIGS. 71 through 75, each of the first through fifth numerical embodiments of the zoom lens system, according to the illustrated embodiment, is configured of a positive first lens group G1A, a negative second lens group (subsequent rear lens group/$n^{th}$ lens group) G2A, a positive third lens group (subsequent rear lens group) G3A, and a negative fourth lens group (subsequent rear lens group) G4A, in that order from the object side. A diaphragm S is provided within the third lens group G3A and moves integrally with the third lens group G3A during zooming. "I" designates the imaging plane (imaging surface of an image sensor).

Upon zooming from the short focal length extremity (Wide) to the long focal length extremity (Tele), each lens group behaves in the following manner:

In each of the first through fifth numerical embodiments, the first lens group G1A monotonically moves toward the object side (FIGS. 71 through 75).

Figure 72:
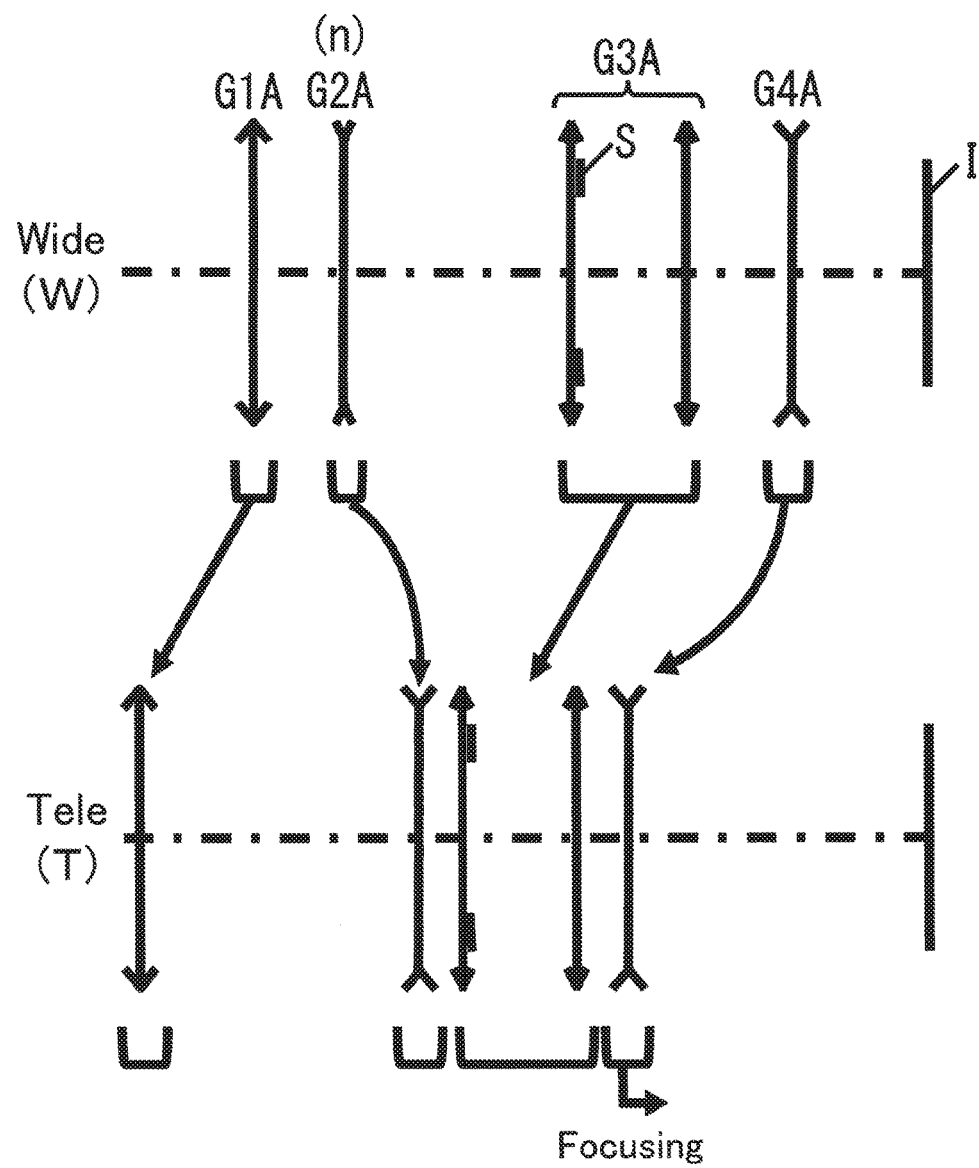
FIG. 72 shows a zoom path of the second numerical embodiment of the zoom lens system, according to the present invention.
Figure 73:
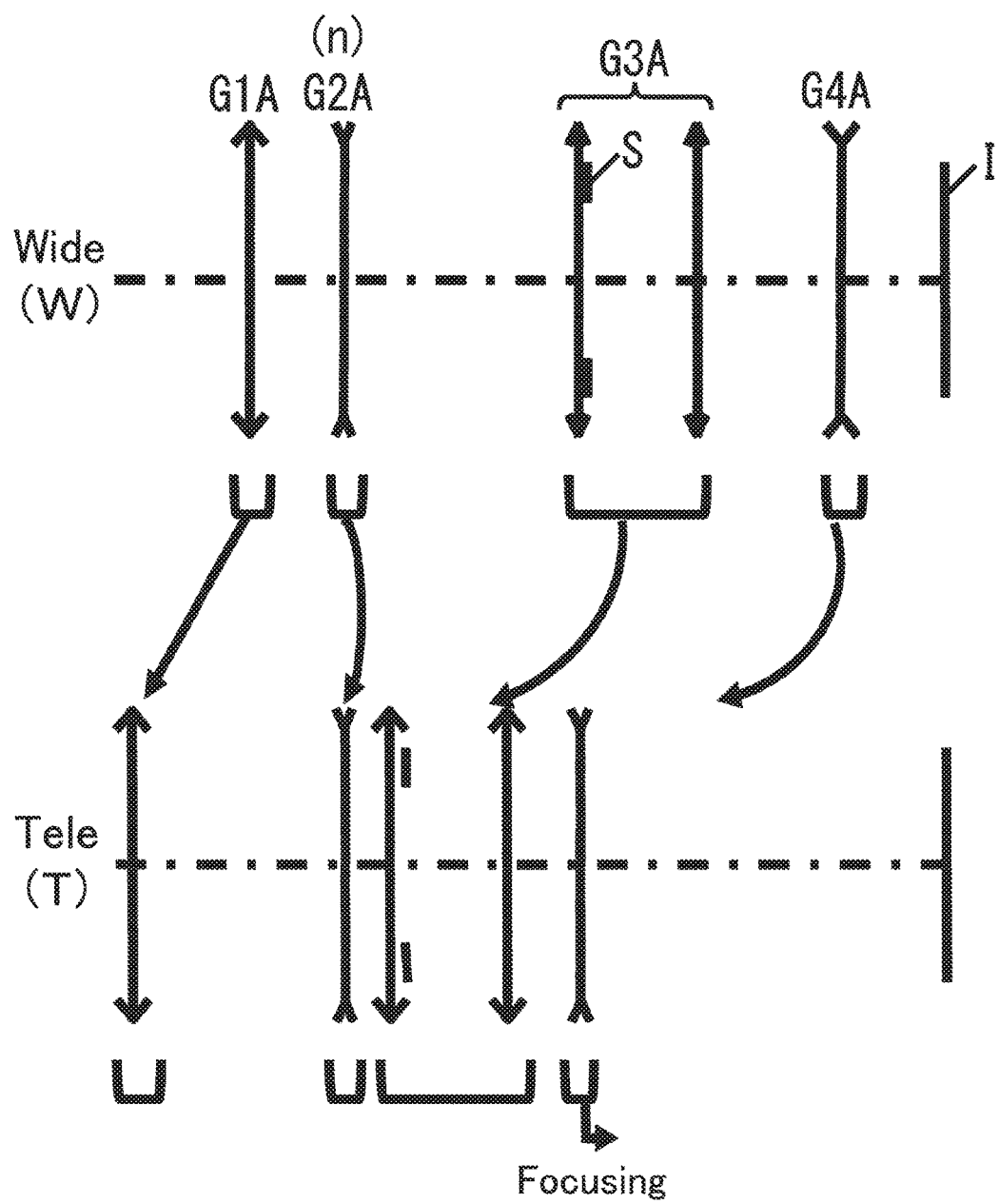
FIG. 73 shows a zoom path of the third numerical embodiment of the zoom lens system, according to the present invention.
Figure 74:
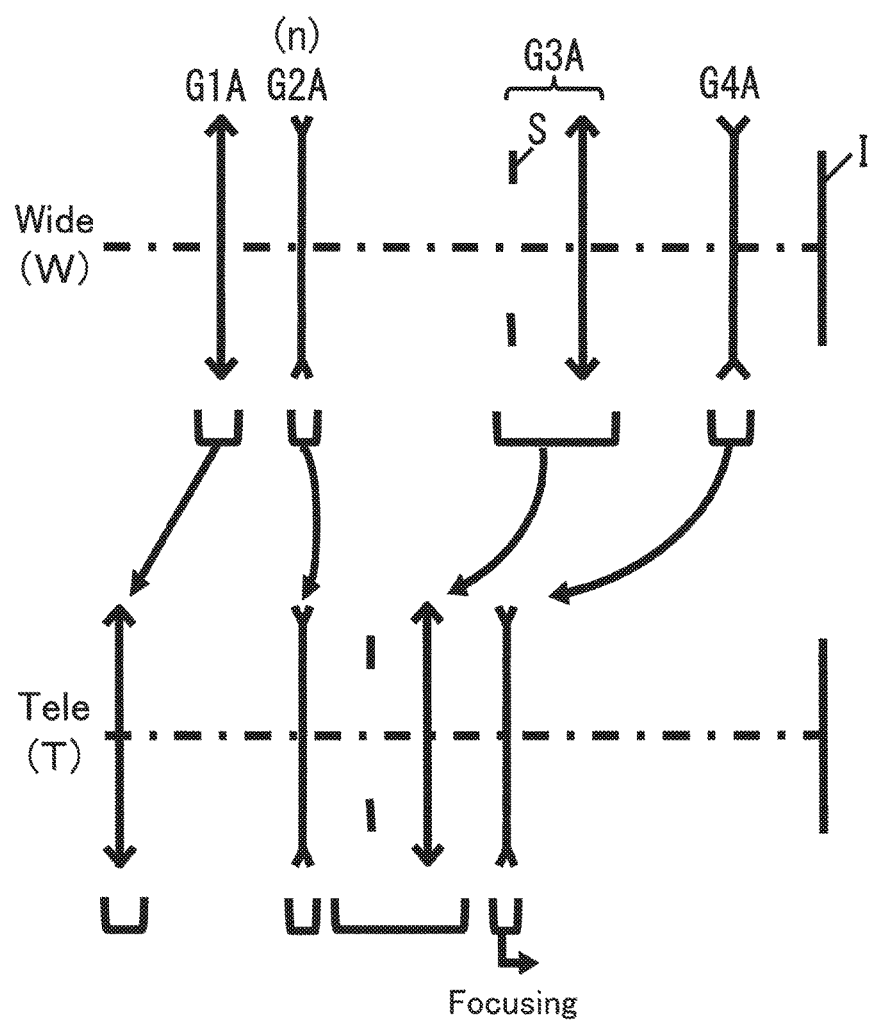
FIG. 74 shows a zoom path of the fourth numerical embodiment of the zoom lens system, according to the present invention.
Figure 75:
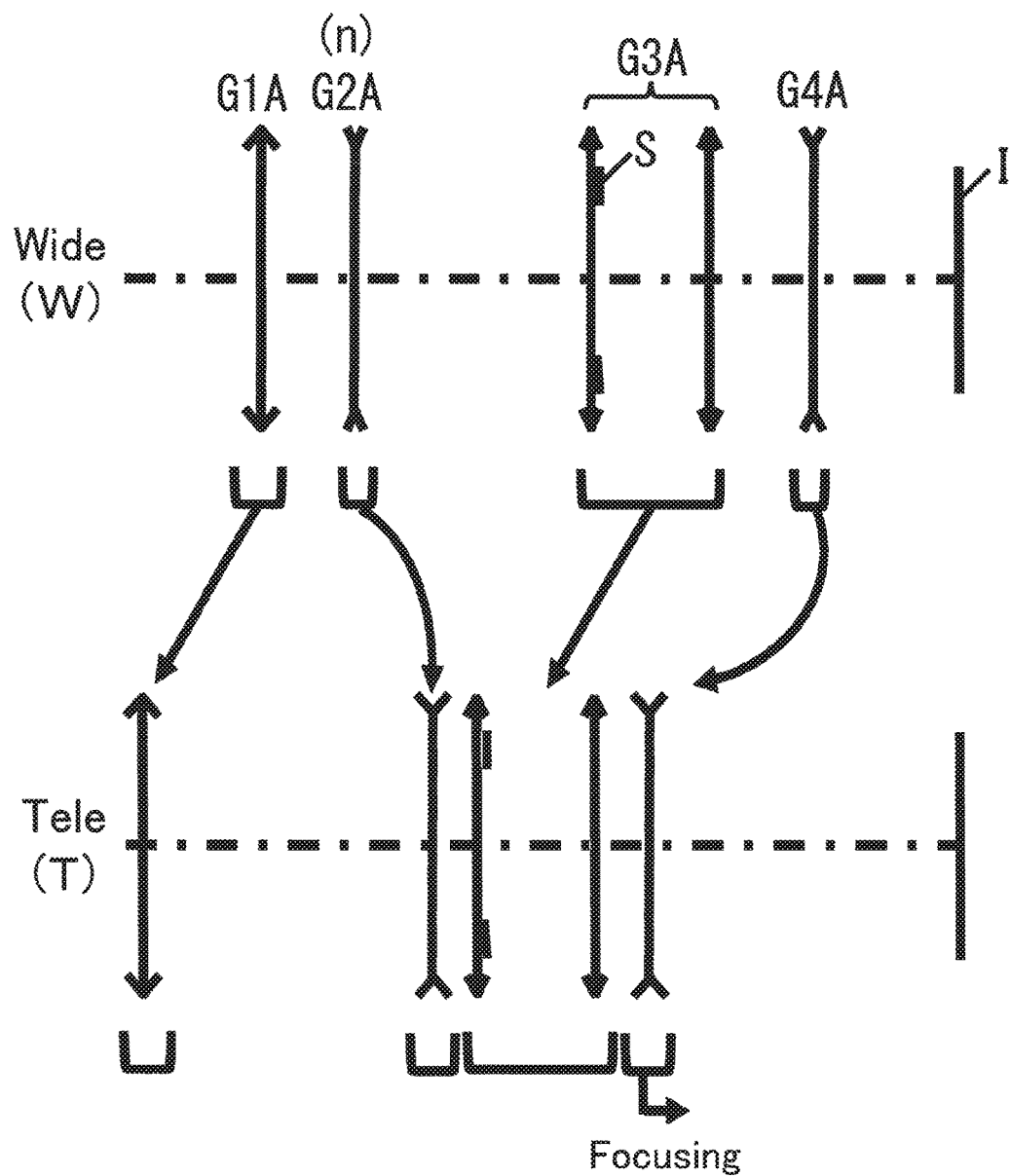
FIG. 75 shows a zoom path of the fifth numerical embodiment of the zoom lens system, according to the present invention.

In each of the first, third and fourth numerical embodiments, the second lens group G2A first moves toward the image side and thereafter returns toward the object side (FIGS. 71, 73 and 74), and in each of the second and fifth embodiments the second lens group G2A moves monotonically toward the image side (FIGS. 72 and 75).

In each of the first, third and fourth numerical embodiments, the third lens group G3A first moves toward the image side and thereafter moves toward the object side to a position exceeding that of the short focal length extremity (FIGS. 71, 73 and 74), and in each of the second and fifth numerical embodiments, the third lens group G3A moves monotonically toward the object side (FIGS. 72 and 75).

In each of the first through fifth numerical embodiments, the fourth lens group G4A first moves toward the image side and thereafter moves toward the object side to a position exceeding that of the short focal length extremity (FIGS. 71 through 75).

Consequently, during zooming, the distance between the first lens group G1A and the second lens group G2A increases, the distance between the second lens group G2A and the third lens group G3A decreases, and the distance between the third lens group G3A and the fourth lens group G4A increases or decreases.

Note that there is some freedom in the behavior of the each lens group during zooming, and various minor design changes are possible.

Focusing on an object at infinity to an object at a close distance is carried out by moving the fourth lens group G4A toward the image side (the fourth lens group G4A constitutes a focusing lens group).

In each of the first through fourth numerical embodiments, the first lens group G1A is configured of a positive meniscus lens element 11A having a convex surface on the object side, a negative meniscus lens element 12A having a convex surface on the object side, and a positive meniscus lens element 13A having a convex surface on the object side, in that order from the object side. The negative meniscus lens element 12A and the positive meniscus lens element 13A are cemented to each other in the first, second and fourth numerical embodiments, and are not cemented to each other in the third numerical embodiment.

In the fifth numerical embodiment, the first lens group G1A is configured of a biconvex positive lens element 11A', a positive meniscus lens element 12A' having a convex surface on the object side, a negative meniscus lens element 13A' having a convex surface on the object side, and a positive meniscus lens element 14A' having a convex surface on the object side, in that order from the object side. The negative meniscus lens element 13A' and the positive meniscus lens element 14A' are cemented to each other.

In each of the first through third numerical embodiments, the second lens group ($n^{th}$ lens group) G2A is configured of a biconcave negative lens element 21A, a positive meniscus lens element 22A having a convex surface on the object side, and a biconcave negative lens element 23A or a negative meniscus lens element 23A having a convex surface on the image side, in that order from the object side. The biconcave negative lens element 21A and the positive meniscus lens element 22A are cemented to each other.

In the fourth numerical embodiment, the second lens group ($n^{th}$ lens group) G2A is configured of a biconcave lens element 21A', a biconvex positive lens element 22A', a negative meniscus lens element 23A having a convex surface on the image side, a biconvex positive lens element 24A', a biconvex positive lens element 25A', and a biconcave negative lens element 26A', in that order from the object side. The biconcave negative lens element 21A' and the biconvex positive lens element 22A' are cemented to each other, and the biconvex positive lens element 25A' and the biconcave negative lens element 26A' are cemented to each other.

In the fifth numerical embodiment, the second lens group ($n^{th}$ lens group) G2A is configured of a biconcave negative lens element 21A", a positive meniscus lens element 22A" having a convex surface on the object side, a biconcave negative lens element 23A", and a negative meniscus lens element 24A" having a convex surface on the image side, in that order from the object side. The biconcave negative lens element 21A" and the positive meniscus lens element 22A" are cemented to each other.

<Positive/Negative/Negative/Positive/Negative 5-Lens-Group Zoom Lens System>

Figure 76:
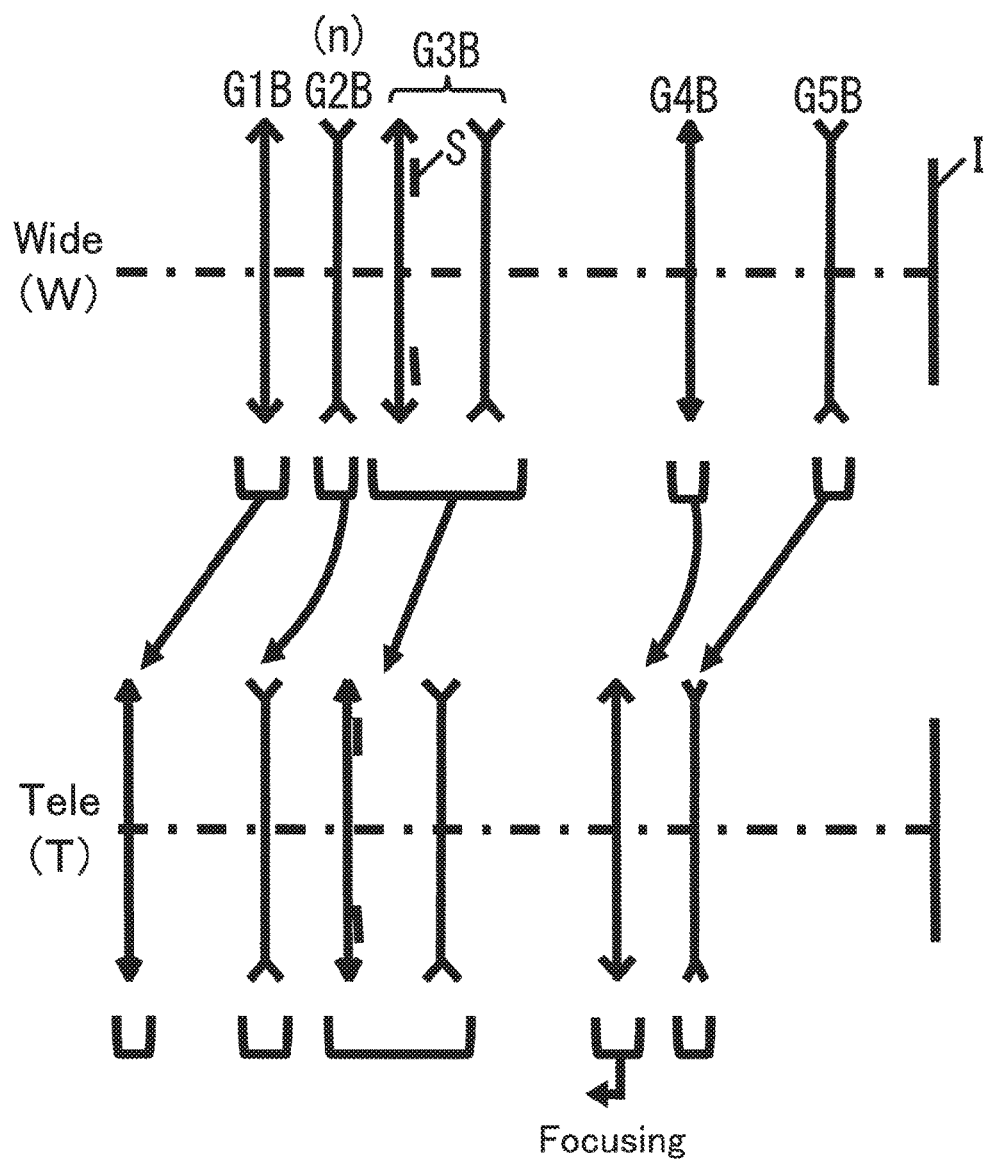
FIG. 76 shows a zoom path of the sixth numerical embodiment of the zoom lens system, according to the present invention.

As shown in the zoom path diagram of FIG. 76, the sixth numerical embodiment of the zoom lens system, according to the illustrated embodiment, is configured of a positive first lens group G1B, a negative second lens group (subsequent rear lens group/$n^{th}$ lens group) G2B, a negative third lens group (subsequent rear lens group) G3B, a positive fourth lens group (subsequent rear lens group) G4B, and a negative fifth lens group (subsequent rear lens group) G5B, in that order from the object side. A diaphragm S is provided within the third lens group G3B and moves integrally with the third lens group G3B during zooming. "I" designates the imaging plane (imaging surface of an image sensor).

Upon zooming from the short focal length extremity (Wide) to the long focal length extremity (Tele), the first lens group G1B, the second lens group G2B, the third lens group G3B and the fifth lens group G5B move monotonically toward the object side, and the fourth lens group G4B first moves toward the image side and thereafter move toward the object side to a position exceeding that of the short focal length extremity.

Consequently, during zooming, the distance between the first lens group G1B and the second lens group G2B increases, the distance between the second lens group G2B and the third lens group G3B increases, the distance between the third lens group G3B and the fourth lens group G4B increases, and the distance between the fourth lens group G4B and the fifth lens group G5B decreases.

Note that there is some freedom in the behavior of the each lens group during zooming, and various minor design changes are possible.

Focusing on an object at infinity to an object at a close distance is carried out by moving the fourth lens group G4B toward the object side (the fourth lens group G4B constitutes a focusing lens group).

The first lens group G1B is configured of a positive meniscus lens element 11B having a convex surface on the object side, a negative meniscus lens element 12B having a convex surface on the object side, and a positive meniscus lens element 13B having a convex surface on the object side, in that order from the object side. The negative meniscus lens element 12B and the positive meniscus lens element 13B are cemented to each other.

The second lens group ($n^{th}$ lens group) G2B is configured of a biconcave negative lens element 21B, a biconvex positive lens element 22B, and a negative meniscus lens element 23B having a convex surface on the image side, in that order from the object side. The biconcave negative lens element 21B and the biconvex positive lens element 22B are cemented to each other.

<Positive/Positive/Negative/Positive/Negative 5-Lens-Group Zoom Lens System>

Figure 77:
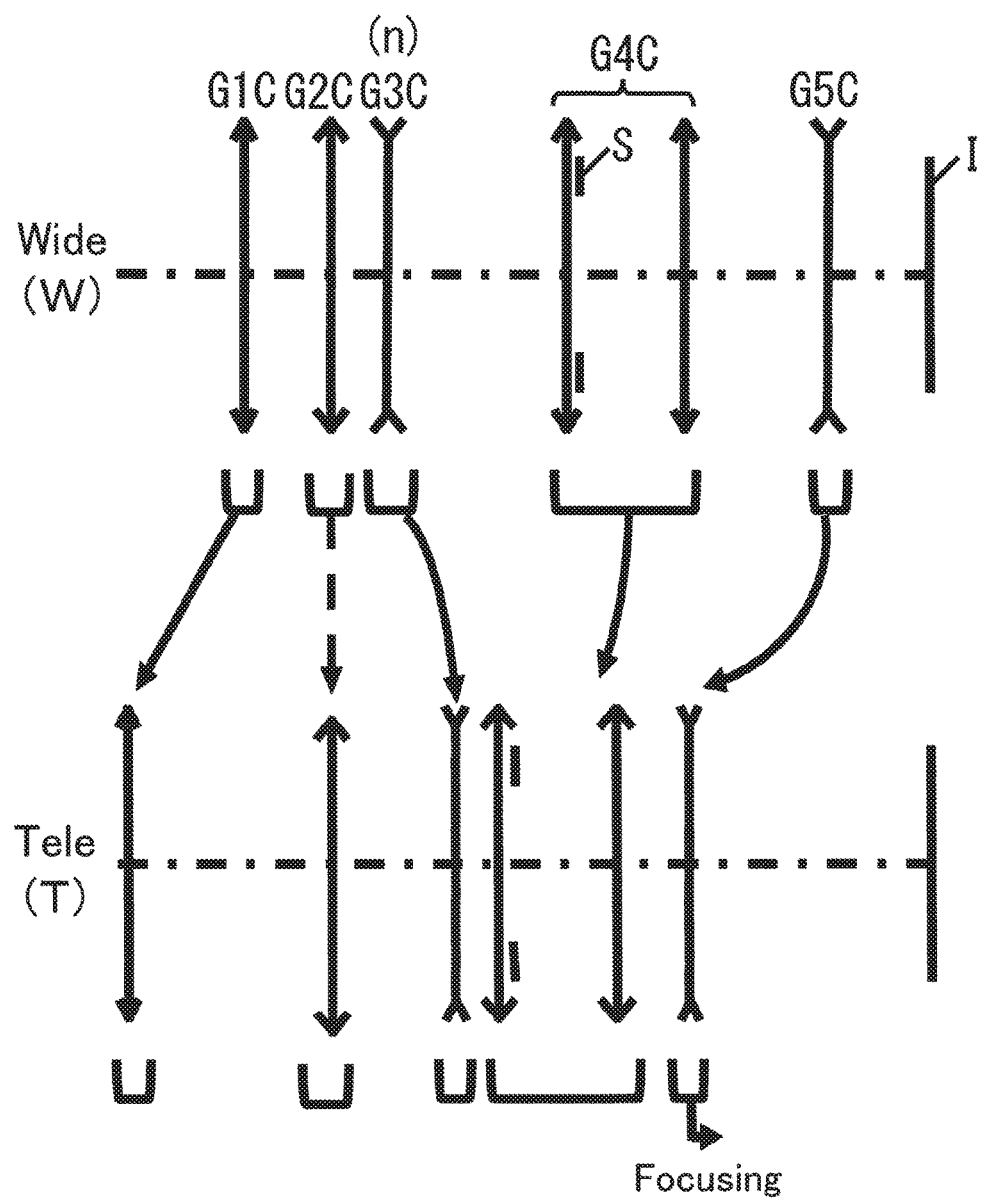
FIG. 77 shows a zoom path of the seventh numerical embodiment of the zoom lens system, according to the present invention.

As shown in the zoom path diagram of FIG. 77, the seventh numerical embodiment of the zoom lens system, according to the illustrated embodiment, is configured of a positive first lens group G1C, a positive second lens group (subsequent rear lens group) G2C, a negative third lens group (subsequent rear lens group/nth lens group) G3C, a positive fourth lens group (subsequent rear lens group) G4C, and a negative fifth lens group (subsequent rear lens group) G5C, in that order from the object side. A diaphragm S is provided within the fourth lens group G4C and moves integrally with the fourth lens group G4C during zooming. "I" designates the imaging plane (imaging surface of an image sensor).

Upon zooming from the short focal length extremity (Wide) to the long focal length extremity (Tele), the first lens group G1C, the fourth lens group G4C and the fifth lens group G5C move monotonically toward the object side, the second lens group G2C remains stationary relative to the imaging plane I (does not move in the optical axis direction), and the third lens group G3C moves monotonically toward the image side.

Consequently, during zooming, the distance between the first lens group G1C and the second lens group G2C increases, the distance between the second lens group G2C and the third lens group G3C increases, the distance between the third lens group G3C and the fourth lens group G4C decreases, and the distance between the fourth lens group G4C and the fifth lens group G5C decreases.

Note that there is some freedom in the behavior of the each lens group during zooming, and various minor design changes are possible.

Focusing on an object at infinity to an object at a close distance is carried out by moving the fifth lens group G5C toward the image side (the fifth lens group G5C constitutes a focusing lens group).

The first lens group G1C is configured of a positive meniscus lens element 11C having a convex surface on the object side, a negative meniscus lens element 12C having a convex surface on the object side, and a positive meniscus lens element 13C having a convex surface on the object side, in that order from the object side. The negative meniscus lens element 12C and the positive meniscus lens element 13C are cemented to each other.

The third lens group ($n^{th}$ lens group) G3C is configured of a biconcave negative lens element 31C, a positive meniscus lens element 32C having a convex surface on the object side, and a biconcave negative lens element 33C, in that order from the object side. The biconcave negative lens element 31C and the positive meniscus lens element 32C are cemented to each other.

<Positive/Negative/Positive/Negative/Positive 5-Lens-Group Zoom Lens System>

Figure 78:
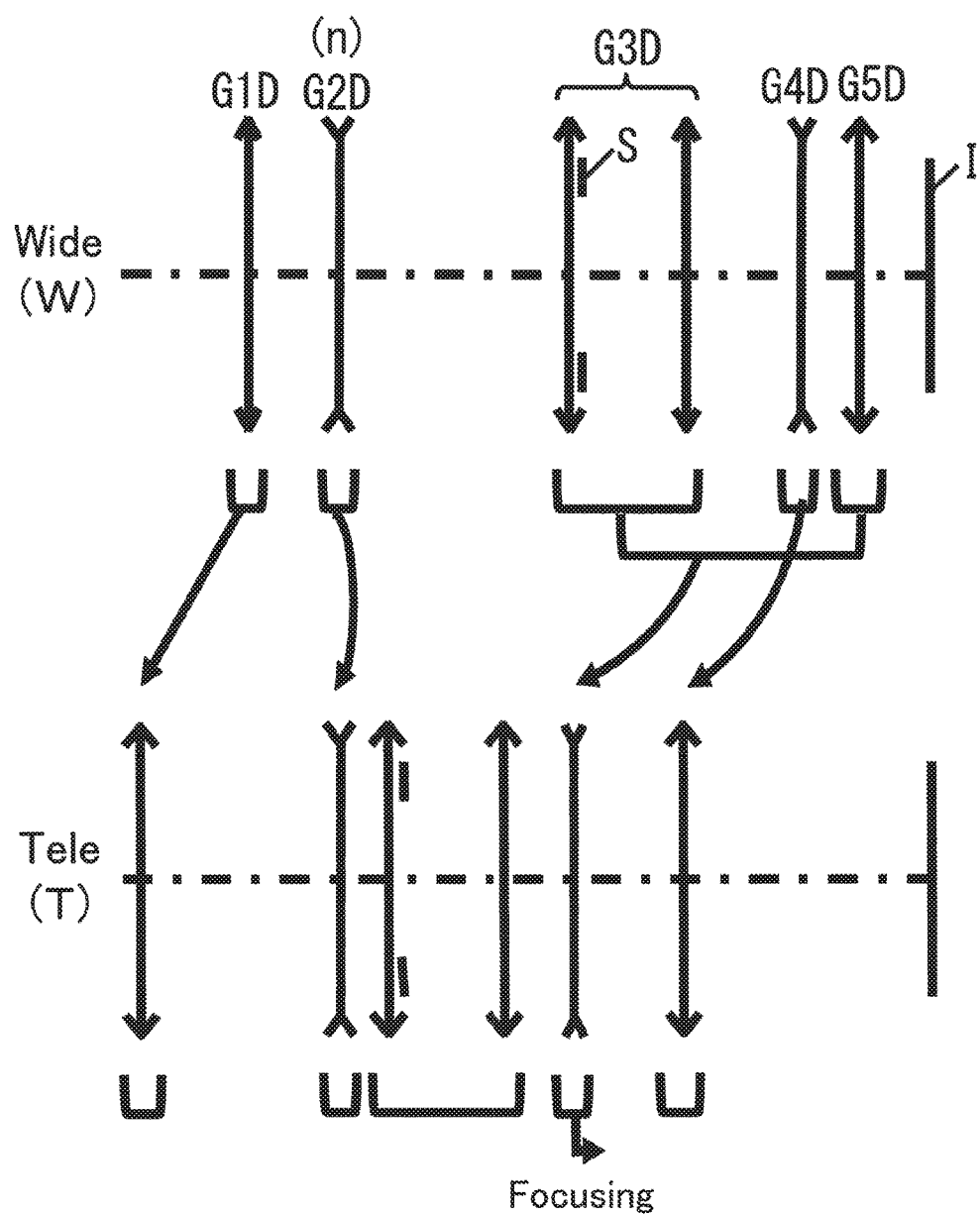
FIG. 78 shows a zoom path of the eighth numerical embodiment of the zoom lens system, according to the present invention.

As shown in the zoom path diagram of FIG. 78, the eighth numerical embodiment of the zoom lens system, according to the illustrated embodiment, is configured of a positive first lens group G1D, a negative second lens group (subsequent rear lens group/nth lens group) G2D, a positive third lens group (subsequent rear lens group) G3D, a negative fourth lens group (subsequent rear lens group) G4D, and a positive fifth lens group (subsequent rear lens group) G5D, in that order from the object side. A diaphragm S is provided within the third lens group G3D and moves integrally with the third lens group G3D during zooming. "I" designates the imaging plane (imaging surface of an image sensor).

Upon zooming from the short focal length extremity (Wide) to the long focal length extremity (Tele), the first lens group G1D, the third lens group G3D, the fourth lens group G4D and the fifth lens group G5D move monotonically toward the object side; the second lens group G2D first moves toward the image side and thereafter returns toward the object side. The third lens group G3D and the fifth lens group G5D move integrally with each other during zooming.

Consequently, during zooming, the distance between the first lens group G1D and the second lens group G2D increases, the distance between the second lens group G2D and the third lens group G3D decreases, the distance between the third lens group G3D and the fourth lens group G4D decreases, and the distance between the fourth lens group G4D and the fifth lens group G5D increases.

Note that there is some freedom in the behavior of the each lens group during zooming, and various minor design changes are possible.

Focusing on an object at infinity to an object at a close distance is carried out by moving the fourth lens group G4D toward the image side (the fourth lens group G4D constitutes a focusing lens group).

The first lens group G1D is configured of a positive meniscus lens element 11D having a convex surface on the object side, a negative meniscus lens element 12D having a convex surface on the object side, and a positive meniscus lens element 13D having a convex surface on the object side, in that order from the object side. The negative meniscus lens element 12D and the positive meniscus lens element 13D are cemented to each other.

The second lens group ($n^{th}$ lens group) G2D is configured of a biconcave negative lens element 21D, a positive meniscus lens element 22D having a convex surface on the object side, and a negative meniscus lens element 23D having a convex surface on the image side, in that order from the object side. The biconcave negative lens element 21D and the positive meniscus lens element 22D are cemented to each other.

<Positive/Negative/Positive/Positive/Negative/Positive 6-Lens-Group Zoom Lens System>

Figure 79:
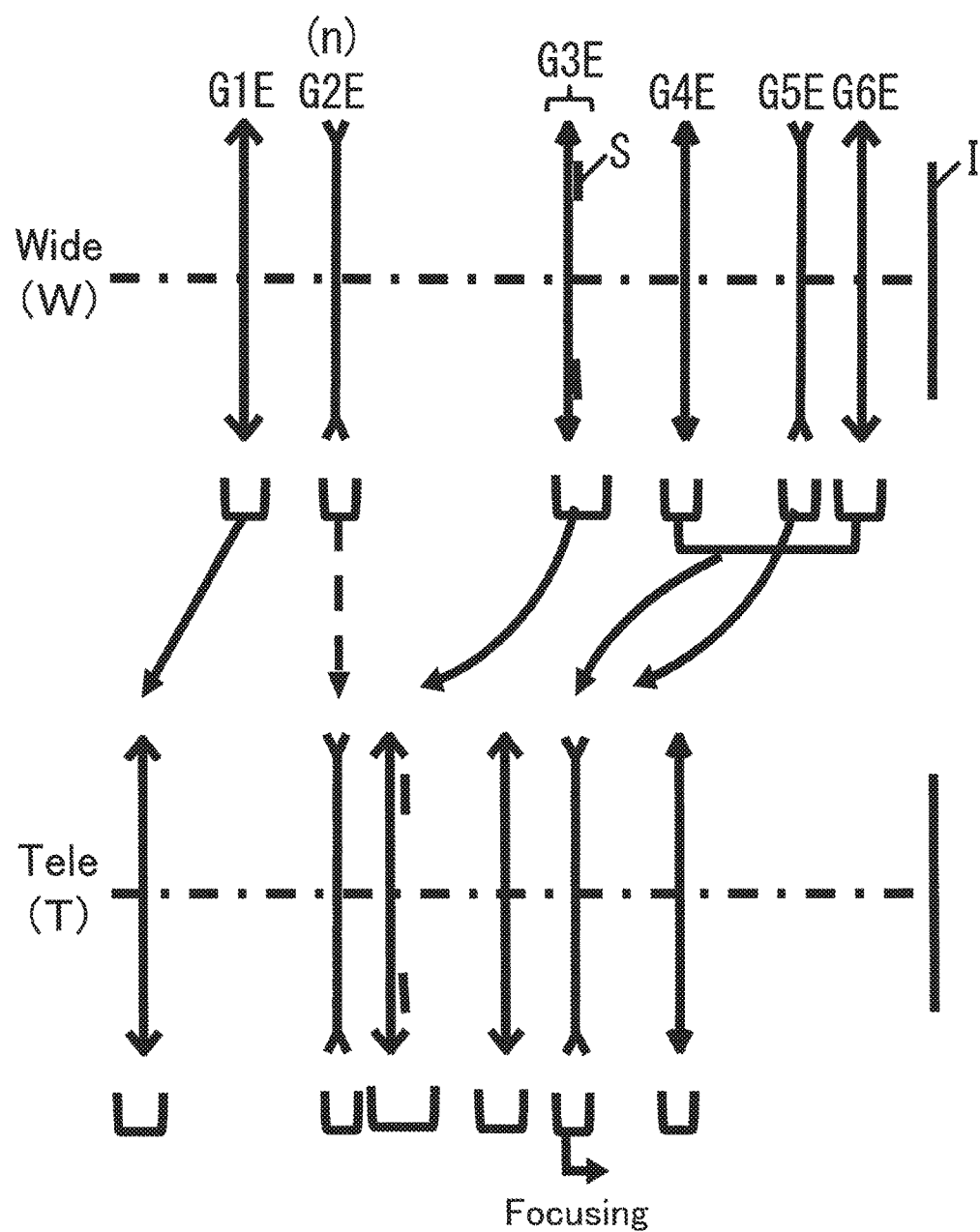
FIG. 79 shows a zoom path of the ninth numerical embodiment of the zoom lens system, according to the present invention.

As shown in the zoom path diagram of FIG. 79, the ninth numerical embodiment of the zoom lens system, according to the illustrated embodiment, is configured of a positive first lens group G1E, a negative second lens group (subsequent rear lens group/nth lens group) G2E, a positive third lens group (subsequent rear lens group) G3E, a positive fourth lens group (subsequent rear lens group) G4E, a negative fifth lens group (subsequent rear lens group) G5E, and a positive sixth lens group (subsequent rear lens group) G6E, in that order from the Object side. A diaphragm S is provided within the third lens group G3E and moves integrally with the third lens group G3E during zooming. "I" designates the imaging plane (imaging surface of an image sensor).

Upon zooming from the short focal length extremity (Wide) to the long focal length extremity (Tele), the first lens group G1E, the third lens group G3E, the fourth lens group G4E, the fifth lens group G5E and the sixth lens group G6E move monotonically toward the object side; the second lens group G2E remains stationary relative to the imaging plane I (does not move in the optical axis direction). The fourth lens group G4E and the sixth lens group G6E move integrally with each other during zooming.

Consequently, during zooming, the distance between the first lens group G1E and the second lens group G2E increases, the distance between the second lens group G2E and the third lens group G3E decreases, the distance between the third lens group G3E and the fourth lens group G4E increases, the distance between the fourth lens group G4E and the fifth lens group G5E decreases, and the distance between the fifth lens group G5E and the sixth lens group G6E increases.

Note that there is some freedom in the behavior of the each lens group during zooming, and various minor design changes are possible.

Focusing on an object at infinity to an object at a close distance is carried out by moving the fifth lens group G5E toward the image side (the fifth lens group G5E constitutes a focusing lens group).

The first lens group G1E is configured of a positive meniscus lens element 11E having a convex surface on the object side, a negative meniscus lens element 12E having a convex surface on the object side, and a positive meniscus lens element 13E having a convex surface on the object side, in that order from the object side. The negative meniscus lens element 12E and the positive meniscus lens element 13E are cemented to each other.

The second lens group ($n^{th}$ lens group) G2E is configured of a biconcave negative lens element 21E, a positive meniscus lens element 22E having a convex surface on the object side, and a negative meniscus lens element 23E having a convex surface on the image side, in that order from the object side. The biconcave negative lens element 21E and the positive meniscus lens element 22E are cemented to each other.

<Positive/Negative/Positive 3-Lens-Group Zoom Lens System>

Figure 80:
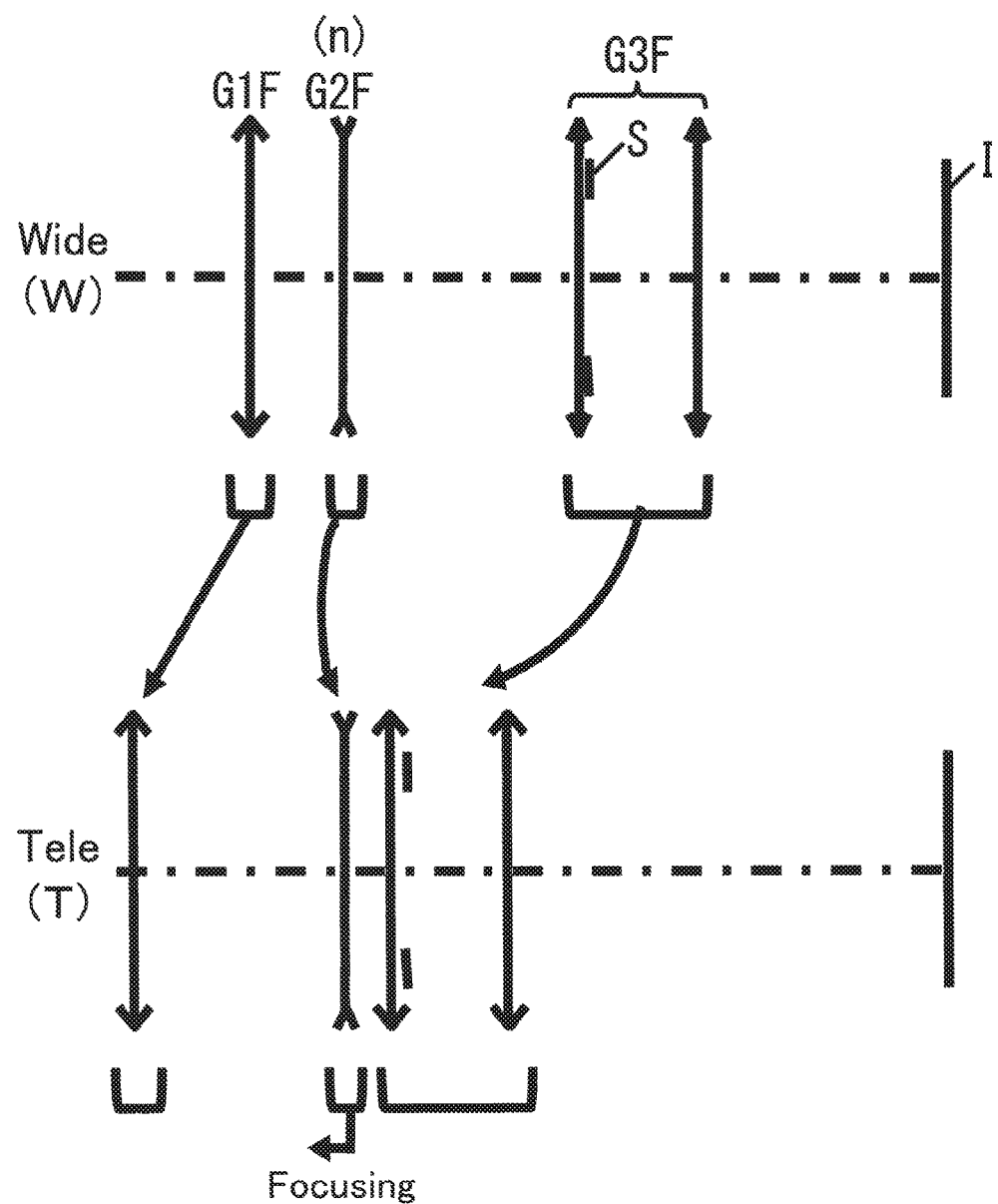
FIG. 80 shows a zoom path of the tenth numerical embodiment of the zoom lens system, according to the present invention.
Figure 81:
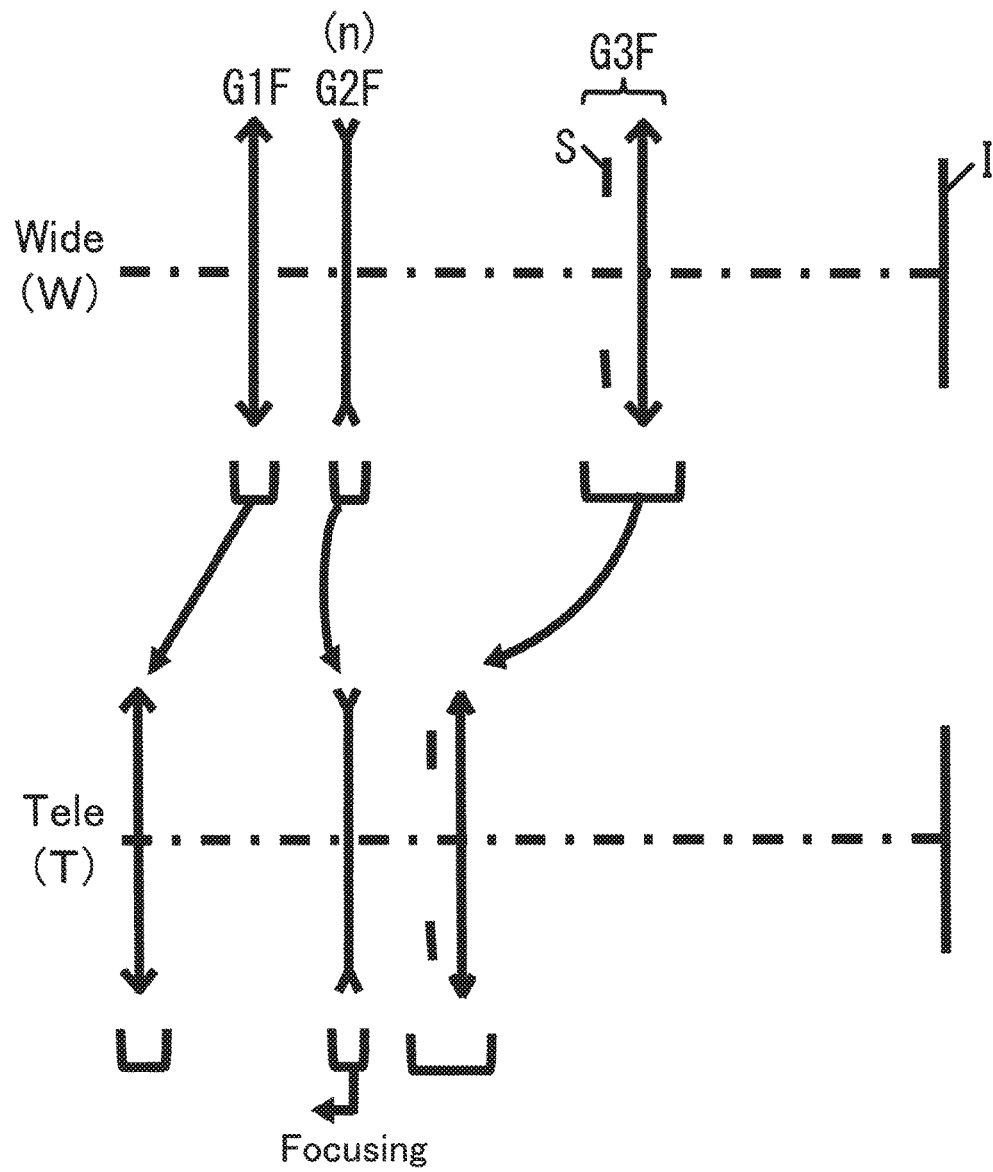
FIG. 81 shows a zoom path of the eleventh numerical embodiment of the zoom lens system, according to the present invention.
Figure 82:
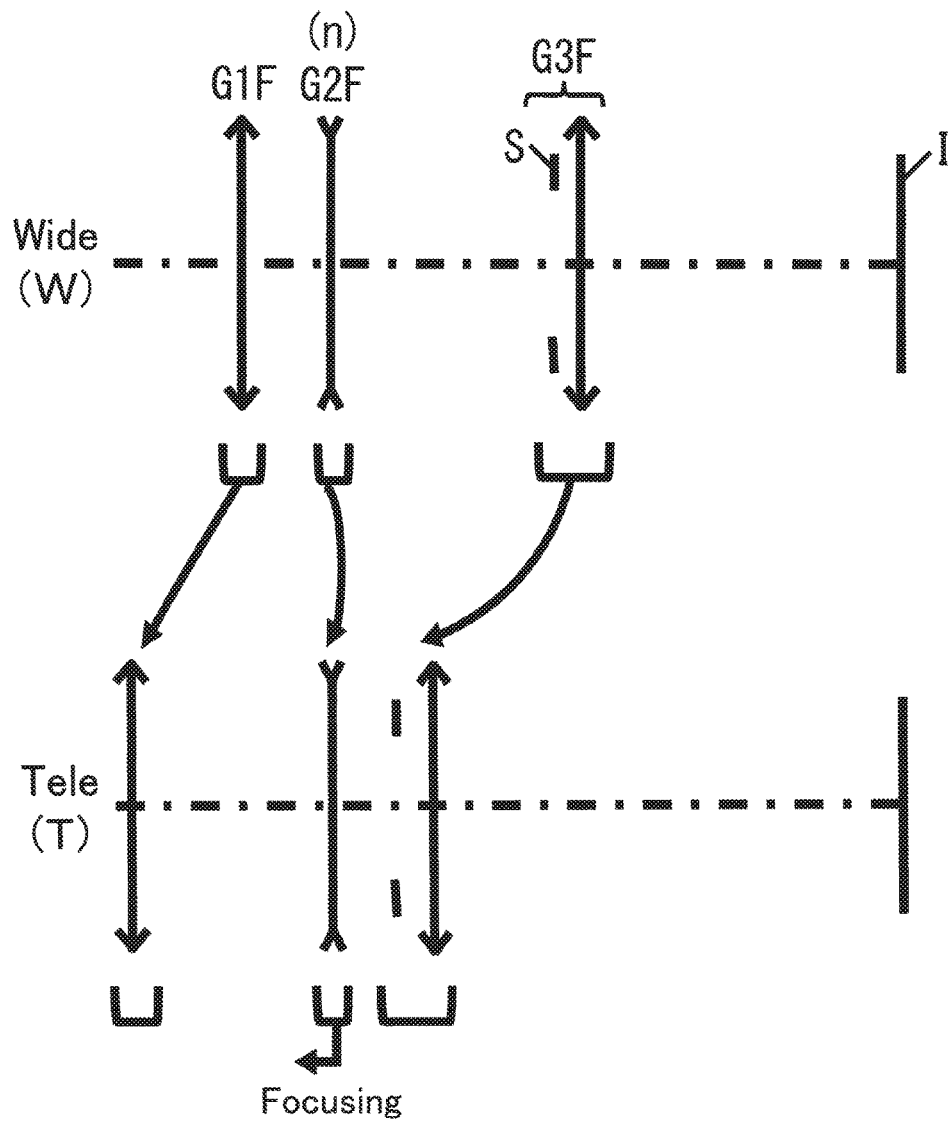
FIG. 82 shows a zoom path of the twelfth numerical embodiment of the zoom lens system, according to the present invention.

As shown in the zoom path diagrams of FIGS. 80 through 82, each of the tenth through twelfth numerical embodiments of the zoom lens system, according to the illustrated embodiment, is configured of a positive first lens group G1F, a negative second lens group (subsequent rear lens group/$n^{th}$lens group) G2F, and a positive third lens group (subsequent rear lens group) G3F, in that order from the object side. A diaphragm S is provided within the third lens group G3F and moves integrally with the third lens group G3F during zooming. "I" designates the imaging plane (imaging surface of an image sensor).

Upon zooming from the short focal length extremity (Wide) to the long focal length extremity (Tele), each lens group behaves in the following manner:

In each of the tenth through twelfth numerical embodiments, the first lens group G1F and the third lens group G3F monotonically moves toward the object side (FIGS. 80 through 82).

In each of the tenth and eleventh numerical embodiments, the second lens group G2F first moves toward the object side and thereafter returns toward the image side (FIGS. 80 and 81), and in twelfth embodiment the second lens group G2F first moves toward the image side and thereafter returns toward the object side (FIG. 82).

Consequently, during zooming, the distance between the first lens group G1F and the second lens group G2F increases, and the distance between the second lens group G2F and the third lens group G3F decreases.

Note that there is some freedom in the behavior of the each lens group during zooming, and various minor design changes are possible.

Focusing on an object at infinity to an object at a close distance is carried out by moving the second lens group G2F toward the object side (the second lens group G2F constitutes a focusing lens group).

The first lens group G1F is configured of a positive meniscus lens element 11F having a convex surface on the object side, a negative meniscus lens element 12F having a convex surface on the object side, and a positive meniscus lens element 13F having a convex surface on the object side, in that order from the object side. The negative meniscus lens element 12F and the positive meniscus lens element 13F are cemented to each other.

The second lens group ($n^{th}$ lens group) G2F is configured of a biconcave negative lens element 21F, a positive meniscus lens element 22F having a convex surface on the object side, and a biconcave negative lens element 23F, in that order from the object side. The biconcave negative lens element 21F and the positive meniscus lens element 22F are cemented to each other.

<Positive/Negative/Negative/Positive 4-Lens-Group Zoom Lens System>

Figure 83:
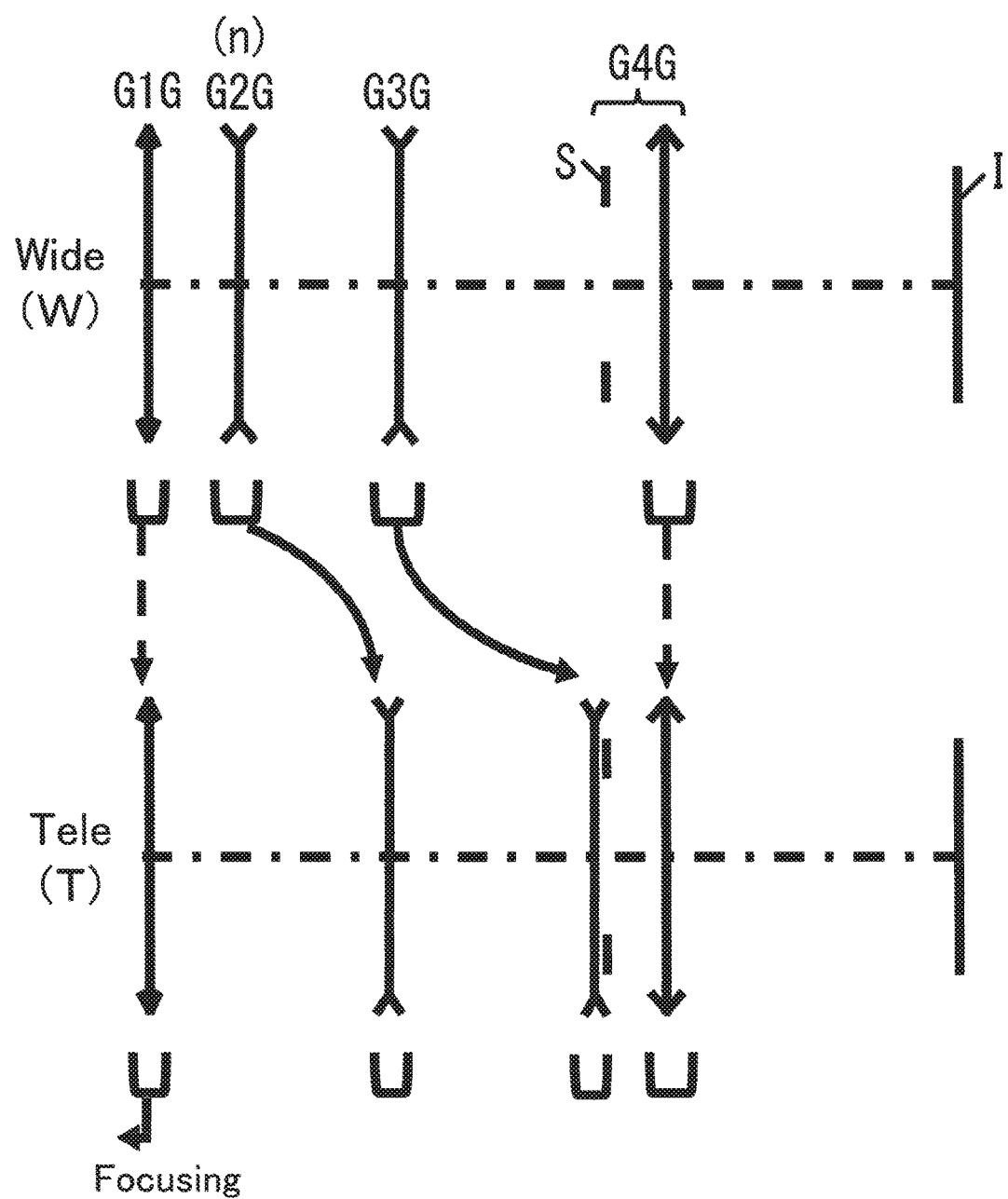
FIG. 83 shows a zoom path of the thirteenth and fourteenth numerical embodiments of the zoom lens system, according to the present invention.

As shown in the zoom path diagram of FIG. 83, each of the thirteenth and fourteenth numerical embodiments of the zoom lens system, according to the illustrated embodiment, is configured of a positive first lens group G1G, a negative second lens group (subsequent rear lens group/$n^{th}$ lens group) G2G, a negative third lens group (subsequent rear lens group) G3G, and a positive fourth lens group (subsequent rear lens group) G4G, in that order from the object side. A diaphragm S is provided within the fourth lens group G4G and moves integrally with the fourth lens group G4G during zooming. "I" designates the imaging plane (imaging surface of an image sensor).

Upon zooming from the short focal length extremity (Wide) to the long focal length extremity (Tele), the first lens group G1G and the fourth lens group G4G remain stationary relative to the imaging plane (do not move in the optical axis direction), and the second lens group G2G and the third lens group G3G monotonically move toward the image side.

Consequently, during zooming, the distance between the first lens group G1G and the second lens group G2G increases, the distance between the second lens group G2G and the third lens group G3G decreases, and the distance between the third lens group G3G and the fourth lens group G4G decreases.

Note that there is some freedom in the behavior of the each lens group during zooming, and various minor design changes are possible.

Focusing on an object at infinity to an object at a close distance is carried out by moving the first lens group G1G toward the object side (the first lens group G1G constitutes a focusing lens group).

The first lens group G1G is configured of a positive meniscus lens element 11G having a convex surface on the object side, a negative meniscus lens element 12G having a convex surface on the object side, a positive meniscus lens element 13G having a convex surface on the object side, and a positive meniscus lens element 14G having a convex surface on the object side, in that order from the object side. The negative meniscus lens element 12G and the positive meniscus lens element 13G are cemented to each other.

In the thirteenth numerical embodiment, the second lens group ($n^{th}$ lens group) G2G is configured of a biconcave negative lens element 21G, a biconvex positive lens element 22G, and a biconcave negative lens element 23G, in that order from the object side. In the fourteenth numerical embodiment, the second lens group ($n^{th}$ lens group) G2G is configured of a biconcave negative lens element 21G, a positive meniscus lens element 22G having a convex surface on the object side, and a biconcave negative lens element 23G, in that order from the object side. In the thirteenth numerical embodiment, the biconcave negative lens element 21G and the biconvex positive lens element 22G are not cemented to each other; and in the fourteenth numerical embodiment, the biconcave negative lens element 21G and the positive meniscus lens element 22G are cemented to each other.

<Summary of Numerical Embodiments 1 Through 14 of Zoom Lens System>

The zoom lens system of the illustrated embodiments includes a positive first lens group (G1A through G1G), and a subsequent rear lens group (G2A through G4A, G2B through G5B, G2C through G5C, G2D through G5D, G2E through G6E, G2F through G3F, and G2G through G4G) provided subsequently behind the first lens group, in that order from the object side, and is a so-called "positive-lead" zoom lens system which achieves an improved optical quality by favorably correctly various aberrations, over the entire zooming range, such as spherical aberration, coma, astigmatism and chromatic aberration, etc.

Generally, in a zoom lens system, the greater the focal length in the telephoto range, the greater the entrance pupil diameter. In particular, since the first lens group, which is provided closest to the object side, is positioned where the entrance pupil diameter is largest, in the illustrated embodiments, the first lens group has been appropriately configured in order to efficiently correct the various aberrations and to converge the light rays onto the imaging plane (imaging surface) I.

Specifically, the positive first lens group (G1A through G1G) includes at least one positive lens element (11A, 11A' and 12A', 11B, 11C, 11D, 11E, 11F, 11G), a negative meniscus lens element having a convex surface on the object side (12A, 13A', 12B, 12C, 12D, 12E, 12F, 12G), and at least one positive lens element (13A, 14A', 13B, 13C, 13D, 13E, 13F, 13G and 14G), in that order from the object side.

By providing a positive single lens element (11A, 11A', 11B, 11C, 11D, 11E, 11F, 11G) closest to the object side within the first lens group, the largest entrance pupil can be efficiently converged, so that the burden of aberration corrections on the subsequent lens elements within the first lens group can be reduced. If a negative lens element were to be provided closest to the object side within the first lens group, the incident light rays would diverge, thereby further increasing the size of the light bundle incident on the subsequent lens elements that are provided within the first lens group, so that the burden of aberration corrections on the subsequent lens elements within the first lens group would become excessively great. Furthermore, if the positive lens element provided closest to the object side within the first lens group were to be cemented to a negative lens element, the positive refractive power of such a cemented lens would weaken and the converging function thereof would be reduced, and the refractive power of the positive lens element would become strong due to the cementing function with the negative lens element, so that spherical aberration and coma occur solely from such a cemented lens.

Furthermore, it is possible to provide a plurality of positive single lens elements from a position that is closest to the object side within the first lens group. According to such a configuration, the burden of aberration correction on each respective positive single lens elements can be reduced (the burden of correcting aberrations can shared among the plurality of positive single lens elements), thereby achieving a high aberration-correction effect, and the f-number at the telephoto range can be reduced (made brighter/faster).

A negative meniscus lens element (12A, 13A', 12B, 12C, 12D, 12E, 12F, 12G) can be provided subsequent to (behind) the above-described one or more positive single lens elements that are provided closest to the object side within the first lens group. By configuring this negative meniscus lens element to have a negative refractive power that is strong to a certain extent, spherical aberration, coma and chromatic aberration, etc., can be favorably corrected. If a negative lens element having a flat surface or a concave surface on the object side were to be used instead of this negative meniscus lens element, the difference in angle between incident angle of the light rays and the normal to the surface (on the object side) of such a negative lens element would be large, so that a large amount of aberrations would occur. In particular, it becomes difficult to correct abaxial aberration (coma, astigmatism and lateral chromatic aberration) via the subsequent lens elements provided within the first lens group.

At least one positive lens element (13A, 14A', 13B, 13C, 13D, 13E, 13F, 13G and 14G) is provided subsequent to the negative meniscus lens element within the first lens group. Since the aforementioned negative meniscus lens element (within the first lens group) must have a certain strength of negative refractive power in order to correct aberrations, spherical aberration and coma can occur on the concave surface on the image side of the negative meniscus lens element. The at least one positive lens element provided subsequently to the negative meniscus lens element has the role of correcting such spherical aberration and coma.

However, there is a risk of the optical quality deteriorating due to relative decentration occurring between the surface on the image side of the negative meniscus lens element and the surface on the object side of the positive lens element that is provided immediately behind the negative meniscus lens element. Hence, by cementing the surface on the image side of the negative meniscus lens element to the surface on the object side of the positive lens element (that is provided immediately behind the negative meniscus lens element), deterioration in the optical quality, caused by manufacturing error, can be suppressed. In the case where the surface on the image side of the negative meniscus lens element is not cemented to the surface on the object side of the positive lens element, by providing a certain amount of air space between these lens elements and providing a difference in radius of curvature between the two opposing surfaces thereof (the surface on the image side of the negative meniscus lens element and the surface on the object side of the positive lens element), this air space can be utilized as an air lens for correction of spherical aberration and coma; in such a case, a spacer ring can be sandwiched between the two lens surfaces thereof, or a chamfer portion of one of the lens elements can abut against the surface of the other lens element and be fixed in a lens frame, in order to reduce manufacturing error.

It is desirable for the at least one positive lens element to be a positive meniscus lens element having a convex surface on the object side. Accordingly, the difference between the normal to the lens surface and the angle of incidence of the light rays can be reduced to thereby suppress occurrence of aberrations. Since the first lens group has an overall positive refractive power, if attention is only paid to shortening the overall length of the zoom lens system, this tends to result in a design in which the surface on the image side of the (above-mentioned) positive lens element, provided within the first lens group, is a convex surface (biconvex lens element), in order to strengthen the positive refractive power thereof. However, in such a case, the difference in angle between the normal to the surface and the incident angle of the light rays increases, so that a large amount of aberrations occur.

By configuring the first lens group of a positive lens element, a negative meniscus lens element having a convex surface on the object side, and a positive lens element, in that order from the object side (three lens elements), the first lens group has a symmetrical lens distribution in which the central negative meniscus lens element is sandwiched between the two positive lens elements that are on either side, whereby reducing the thickness of the first lens group due to the small number of lens elements and also favorably correcting aberrations can be both achieved.

If the first lens group is fixed (stationary) during zooming, in order make abaxial light incident at the short focal length extremity, the diameter of the first lens group (forefront lens element diameter) becomes large, whereby abaxial coma, etc., tends to occur. However, if, as with the illustrated embodiments, the first lens group is moved (advanced) toward the object side during zooming, the outer diameter of the first lens group (forefront lens element) can be reduced, thereby achieving miniaturization, suppressing abaxial coma, etc., and achieving a superior optical quality.

The subsequent lens groups that are subsequently provided behind the first lens group include at least one negative lens group, and in the illustrated embodiments, the negative lens group that is positioned closest to the object side out of the subsequent lens groups is defined as the "$n^{th}$ lens group". By changing the mutual distances between this negative $n^{th}$ lens group and the lens groups provided on either side thereof (in front and behind), a relatively large zoom ratio can be achieved. Furthermore, in the case where, e.g., a zoom lens system is applied to a camera system having an interchangeable lens, an insufficient backfocus easily occurs at the wide-angle range, in which the focal length is short; however, by optimally setting the refractive power and configuration of the negative $n^{th}$ lens group, a sufficient backfocus can be obtained and an improvement in the optical quality can also be achieved.

By providing a negative lens element closest to the object side within the a negative $n^{th}$ lens group, a sufficient backfocus can be effectively obtained. Furthermore, it is desirable for the surface on the image side of the negative lens element that is provided closest to the object side within the $n^{th}$ lens group to be a concave surface (in other words, a surface having a profile convexing toward the object side). Since the negative $n^{th}$ lens group has a small entrance pupil diameter compared to the first lens group, if the surface on the image side of the negative lens element that is provided closest to the object side therein has a profile convexing toward the object side, since the divergence of the angle between a normal to the surface and the incidence angle of the light rays can be reduced, and thereby provide a curvature having certain degree of strength, it is possible to correct aberrations and obtain a sufficient backfocus.

By providing a positive lens element subsequent to (and immediately behind) the negative lens element that is provided closest to the object side within the negative $n^{th}$ lens group, coma and lateral chromatic aberration on the wide-angle side, spherical aberration on the telephoto side, and axial chromatic aberration over the entire zooming range can be favorably corrected. Furthermore, by cementing the negative lens element that is closest to the object side within the negative $n^{th}$ lens group to the subsequent positive lens element, it becomes easier to align the spherical aberration at each wavelength at the telephoto side.

The greater the zoom ratio, in particular, the greater the focal length at the wide-angle side, the stronger the negative refractive power that is required in the $n^{th}$ lens group, so that an additional negative lens element in the $n^{th}$ lens group becomes necessary. Therefore, it is desirable to also provide a negative lens element closest to the image side within the $n^{th}$ lens group in addition to the negative lens element that is closest to the object side within the $n^{th}$ lens group. Since the light that is incident on the negative lens element that is closest to the image side is divergent light, it is desirable for this negative lens element that is closest to the image side to have a concave surface on the object side. Accordingly, even in the case where the zoom ratio is large, fluctuations in coma and astigmatism over the entire zooming range can be suppressed.

By configuring the negative $n^{th}$ lens group of a cemented lens formed by a negative lens element and a positive lens element having a cemented surface that faces the object side; and a negative lens element, in that order from the object side (three lens elements), the $n^{th}$ lens group has a symmetrical distribution with a positive lens element sandwiched in the middle and a negative lens element on either side (front and rear sides) thereof, whereby reducing the thickness of the $n^{th}$ lens group due to the small number of lens elements and also favorably correcting aberrations can be both achieved.

Conditions (1) and (1') specify the ratio of the focal length of the first lens group to the focal length of the negative meniscus lens element that is provided within the first lens group. By satisfying condition (1), spherical aberration, coma and chromatic aberration can be favorably corrected. Furthermore, by satisfying condition (1'), in addition to the above effect, spherical aberration, coma, astigmatism and chromatic aberration can be favorably corrected over the entire zooming range.

If the upper limit of conditions (1) and (1') are exceeded, the refractive power of the negative meniscus lens element that is provided within the first lens group becomes too weak, so that it becomes difficult to correct spherical aberration, coma and chromatic aberration.

If the lower limit of condition (1') is exceeded, the refractive power of the negative meniscus lens element that is provided within the first lens group becomes too strong, so that it becomes difficult to correct spherical aberration, coma, astigmatism and chromatic aberration over the entire zooming range.

Conditions (2) and (2') specify the average value of the Abbe number with respect to the d-line of the positive lens elements that are provided within the first lens group. By satisfying condition (2), axial chromatic aberration at the telephoto side and lateral chromatic aberration over the entire zooming range can be favorably corrected. Furthermore, fluctuation of spherical aberration, coma and astigmatism during zooming can be reduced. These functional effects can be more prominently obtained if condition (2') is satisfied.

If the lower limit of condition (2) is exceeded, it becomes difficult to correct axial chromatic aberration at the telephoto side and lateral chromatic aberration over the entire zooming range. Furthermore, if an attempt is made to correct chromatic aberration with the lower limit of condition (2) exceeded, since the refractive power of each lens element within the first lens group must be excessively strengthened, a large amount of fluctuation in spherical aberration, coma and astigmatism during zooming occurs.

Conditions (3) and (3') specify a ratio of the focal length of the first lens group to the focal length of the negative $n^{th}$ lens group that is positioned closest to the object side within the subsequent lens groups. By satisfying condition (3), spherical aberration, coma, astigmatism and chromatic aberration can be favorably corrected. Furthermore, by satisfying condition (3'), in addition to the above effect, the amount of movement (in the optical axis direction) of the first lens group during zooming can be suppressed, thereby achieving miniaturization; and abaxial coma, astigmatism and lateral chromatic aberration can be favorably corrected.

If the upper limit of conditions (3) and (3') is exceeded, the refractive power of the first lens group becomes too strong, so that correction of spherical aberration, coma, astigmatism and chromatic aberration becomes difficult.

If the lower limit of condition (3') is exceeded, the refractive power of the first lens group becomes too week, so that the amount of movement of the first lens group during zooming increases. Accordingly, the entire length of the zoom lens system increases, and the diameter of the first lens group must be increased in order for the abaxial light bundle to pass therethrough (unavoidably increasing the diameter of the forefront lens), so the abaxial coma, astigmatism and lateral chromatic aberration worsen (increase).

Conditions (4) and (4') specify the refractive index at the d-line of the negative meniscus lens element that is provided within the first lens group. By satisfying condition (4), spherical aberration, coma, astigmatism and chromatic aberration can be favorably corrected over the entire zooming range. Furthermore, by satisfying condition (4'), in addition to the above effect, spherical aberration, coma, axial chromatic aberration and lateral chromatic aberration can be favorably corrected.

If the lower limit of conditions (4) and (4') is exceeded, the curvature of the concave surface on the image side of the negative meniscus lens element that is provided within the first lens group becomes too strong, so that it becomes difficult to correct spherical aberration, coma, astigmatism and chromatic aberration over the entire zooming range.

If the upper limit of condition (4') is exceeded, the difference between the refractive index of the negative meniscus lens element provided within the first lens group and the refractive index of the positive lens element that is provided immediately behind on the image side of this negative meniscus lens element becomes too large, so that it becomes difficult to correct spherical aberration and coma. If an attempt is made to reduce this difference in refractive index by increasing the refractive index of the positive lens element that is provided immediately behind on the image side of the negative meniscus lens element provided within the first lens group, since a high dispersion material will need to be selected, correction of axial chromatic aberration and lateral chromatic aberration becomes difficult.

Condition (5) specifies the ratio of the focal length of the first lens group to the paraxial radius of curvature of the surface closest to the object side of the first lens group. By satisfying condition (5), spherical aberration, coma, astigmatism and lateral chromatic aberration can be favorably corrected.

If the upper limit of condition (5) is exceeded, the curvature of the surface that is closest to the object side of the first lens group becomes too strong, so that it becomes difficult to correct spherical aberration, coma and astigmatism over the entire zooming range.

If the lower limit of condition (5) is exceeded, when the curvature of the surface on the object side of the lens element that is provided closest to the object side within the first lens group becomes weak, the curvature of the surface on the image side of this lens element must be strengthened in order to maintain a certain amount of positive refractive power, resulting in difficulty in correcting spherical aberration, coma, and astigmatism.

Conditions (6) and (6') specify the profile (shaping factor) of the negative meniscus lens element that is provided within the first lens group. By satisfying condition (6), the angle between the incident light rays of the abaxial light bundle and the normal to the surface can be reduced, so that coma, astigmatism and lateral chromatic aberration can be favorably corrected. By further satisfying condition (6'), in addition to the above effect, spherical aberration, coma, astigmatism and chromatic aberration can be favorably corrected over the entire zooming range.

If the lower limit of conditions (6) and (6') is exceeded, the surface on the object side of the negative lens element that is provided within the first lens group becomes a flat surface or a concave surface, so that the angle between the incident light rays of the abaxial light bundle and the normal to the surface becomes large. Accordingly, it becomes difficult to correct coma, astigmatism, lateral chromatic aberration.

If the upper limit of condition (6') is exceeded, the surface on the image side of the negative meniscus lens element provided within the first lens group becomes a concave surface having a strong curvature, so that it becomes difficult to correct spherical aberration, coma, astigmatism and chromatic aberration over the entire zooming range.

Conditions (7) and (7') specify the ratio of the focal length of the negative $n^{th}$ lens group, positioned closest to the object side within the subsequent lens groups, to the paraxial radius of curvature of the surface on the image side of the negative lens element that is provided closest to the object side within the $n^{th}$ lens group. By satisfying condition (7), coma mainly at the telephoto side can be favorably corrected. By further satisfying condition (7'), in addition to the above effect, fluctuations in the field curvature during zooming can be suppressed.

If the upper limit of conditions (7) and (7') is exceeded, the curvature of the surface on the image side of the negative lens element that is provided closest to the object side within the $n^{th}$ lens group becomes too weak, and the surface on the object side thereof becomes a concave surface having a strong curvature. This results in it becoming difficult to correct coma mainly at the telephoto side.

If the lower limit of condition (7') is exceeded, the curvature of the surface on the image side of the negative lens element that is closest to the object side within the $n^{th}$ lens group becomes too strong, so that fluctuation in the field curvature during zooming increases.

Conditions (8) and (8') specify the Abbe number with respect to the d-line of the negative lens element that is closest to the image side within the $n^{th}$ lens group. By satisfying condition (8), lateral chromatic aberration over the entire zooming range and axial chromatic aberration mainly at the telephoto side can be favorably corrected. These functional effects can be more prominently obtained if condition (8') is satisfied.

If the lower limit of condition (8) is exceeded, it becomes difficult to correct lateral chromatic aberration over the entire zooming range and axial chromatic aberration mainly at the telephoto side.

Condition (9) specifies a relationship, which should be satisfied, between the Abbe number with respect to the d-line and the partial dispersion ratio at the short wavelength side (from the g-line to the F-line) of the negative meniscus lens element (the anomalous dispersion characteristics of the negative meniscus lens element) within the first lens group. By satisfying condition (9), the anomalous dispersion characteristics of the negative meniscus lens element provided within the first lens group can be optimally set, and the secondary spectrum of the axial chromatic aberration can be suppressed.

If condition (9) is not satisfied, a lens material having high anomalous dispersion characteristics will need to be used for the negative meniscus lens element within the first lens group, so that the secondary spectrum of the axial chromatic aberration increases.

Conditions (10) and (10') specify the Abbe number with respect to the d-line of the negative meniscus lens element within the first lens group. By satisfying condition (10), axial chromatic aberration and lateral chromatic aberration can be favorably corrected. By further satisfying condition (10'), in addition to the above effect, fluctuations in spherical aberration, coma and astigmatism during zooming can be reduced to small amounts.

If the lower limit of conditions (10) and (10') is exceeded, axial chromatic aberration and lateral chromatic aberration become overcorrected.

If the upper limit of condition (10') is exceeded, correction of axial chromatic aberration and lateral chromatic aberration becomes insufficient. If an attempt is made to correct chromatic aberration with the upper limit of condition (10') exceeded, the refractive power of each lens element within the first lens group becomes strong (would need to be strengthened), so that fluctuation in spherical aberration, coma and astigmatism during zooming increases.

Conditions (11) and (11') specify the ratio of the focal length of the first lens group to the paraxial radius of curvature of the surface on the image side on the negative meniscus lens element within the first lens group. By satisfying condition (11), correction of spherical aberration, coma and chromatic aberration can be carried out by the negative meniscus lens element. These functional effects can be more prominently obtained if condition (11') is satisfied. Furthermore, by satisfying condition (11'), in addition to the above effects, spherical aberration and coma that occur on the concave surface on the image side of the negative meniscus lens element can be favorably corrected.

If the lower limit of condition (11) is exceeded, the radius of curvature of the surface on the image side on the negative meniscus lens element within the first lens group becomes too large, so that the refractive power of the negative meniscus lens element becomes too weak, thereby making it difficult for the negative meniscus lens element to correct spherical aberration, coma and chromatic aberration.

If the upper limit of condition (11') is exceeded, the curvature of the concave surface on the image side of the negative meniscus lens element within the first lens group becomes too strong (the radius of curvature becomes too small), so that it becomes difficult to correct spherical aberration and coma that occur at this concave surface on the image side.

Condition (12) specifies the ratio of the focal length of the first lens group to the distance along the optical axis from the surface closest to the object side on the first lens group to the surface closest to the image side on the first lens group (i.e., the thickness of the first lens group). By satisfying condition (12), the first lens group, and hence the entire zoom lens system, can be miniaturized (the overall length of the zoom lens system can be shortened), and spherical aberration, coma, astigmatism and chromatic aberration (lateral chromatic aberration) can be favorably corrected.

If the upper limit of condition (12) is exceeded, the refractive power of the first lens group becomes too weak, so that the amount of movement of the first lens group (the advancing amount) during zooming increases. Consequently, the overall length of the zoom lens system becomes large, and the diameter of the first lens group must be increased in order for the abaxial light bundle to pass therethrough (unavoidably increasing the diameter of the forefront lens), so the abaxial coma, astigmatism and lateral chromatic aberration worsen (increase).

If the lower limit of condition (12) is exceeded, the refractive power of the first lens group becomes too strong, so that correction of spherical aberration, coma, astigmatism and chromatic aberration becomes difficult. Furthermore, the first lens group, and hence the entire zoom lens system, increases in size (the entire length of the zoom lens system increases).

Conditions (13), (13') and (13") specify the ratio of the focal length of the first lens group to the focal length of the entire zoom lens system at the short focal length extremity.

By satisfying condition (13), spherical aberration, coma, astigmatism and chromatic aberration can be favorably corrected. By satisfying condition (13'), in addition to the above effect, the amount of movement of the first lens group during zooming can be suppressed to thereby achieve miniaturization of the zoom lens system while favorably correcting abaxial coma, astigmatism, and lateral chromatic aberration. These additional effects are even more prominent upon satisfying condition (13").

If the lower limit of condition (13) is exceeded, the refractive power of the first lens group becomes too strong, so that correction of spherical aberration, coma, astigmatism and chromatic aberration becomes difficult.

If the upper limit of condition (13') is exceeded, the refractive power of the first lens group becomes too weak, so that the amount of movement (advancing amount) of the first lens group during zooming increases. Consequently, the entire length of the zoom lens system increases, and the diameter of the first lens group must be increased in order for the abaxial light bundle to pass therethrough (unavoidably increasing the diameter of the forefront lens), so the abaxial coma, astigmatism and lateral chromatic aberration worsen (increase).

Conditions (14), (14') and (14") specify the ratio of the focal length of the first lens group, to the focal length of the entire zoom lens system at the short focal length extremity, to the focal length of the entire zoom lens system at the long focal length extremity. By satisfying condition (14), spherical aberration, coma, astigmatism and chromatic aberration can be favorably corrected. By satisfying condition (14'), in addition to the above effect, the amount of movement of the first lens group during zooming can be suppressed to thereby achieve miniaturization of the zoom lens system while favorably correcting abaxial coma, astigmatism, and lateral chromatic aberration. These additional effects are even more prominent upon satisfying condition (14").

If the lower limit of condition (14) is exceeded, the refractive power of the first lens group becomes too strong, so that correction of spherical aberration, coma, astigmatism and chromatic aberration becomes difficult.

If the upper limit of condition (14') is exceeded, the refractive power of the first lens group becomes too weak, so that the amount of movement (advancing amount) of the first lens group during zooming increases. Consequently, the entire length of the zoom lens system increases, and the diameter of the first lens group must be increased in order for the abaxial light bundle to pass therethrough (unavoidably increasing the diameter of the forefront lens), so the abaxial coma, astigmatism and lateral chromatic aberration worsen (increase).

[Embodiments]

Specific first through fourteenth numerical embodiments will be herein discussed. In the various aberration diagrams, lateral aberration diagrams and the tables, the d-line, g-line and C-line show aberrations at their respective wavelengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, ν(d) designates the Abbe number with respect to the d-line, fn designates the focal length of the negative meniscus lens element within the first lens group, and θgFn designates the partial dispersion ratio at the short wavelength side of the negative meniscus lens element provided within the first lens group. The backfocus is the distance from the surface on the side closest to the image side of the zoom lens system to the imaging plane I (FIGS. 71 through 84). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm). An aspherical surface lens is not used in any of the first through fourteenth embodiments. However, an embodiment is possible in which aberrations can be corrected by using an aspherical surface of diffraction surface at any part of the optical system.

[Embodiment 1]

Figure 1:
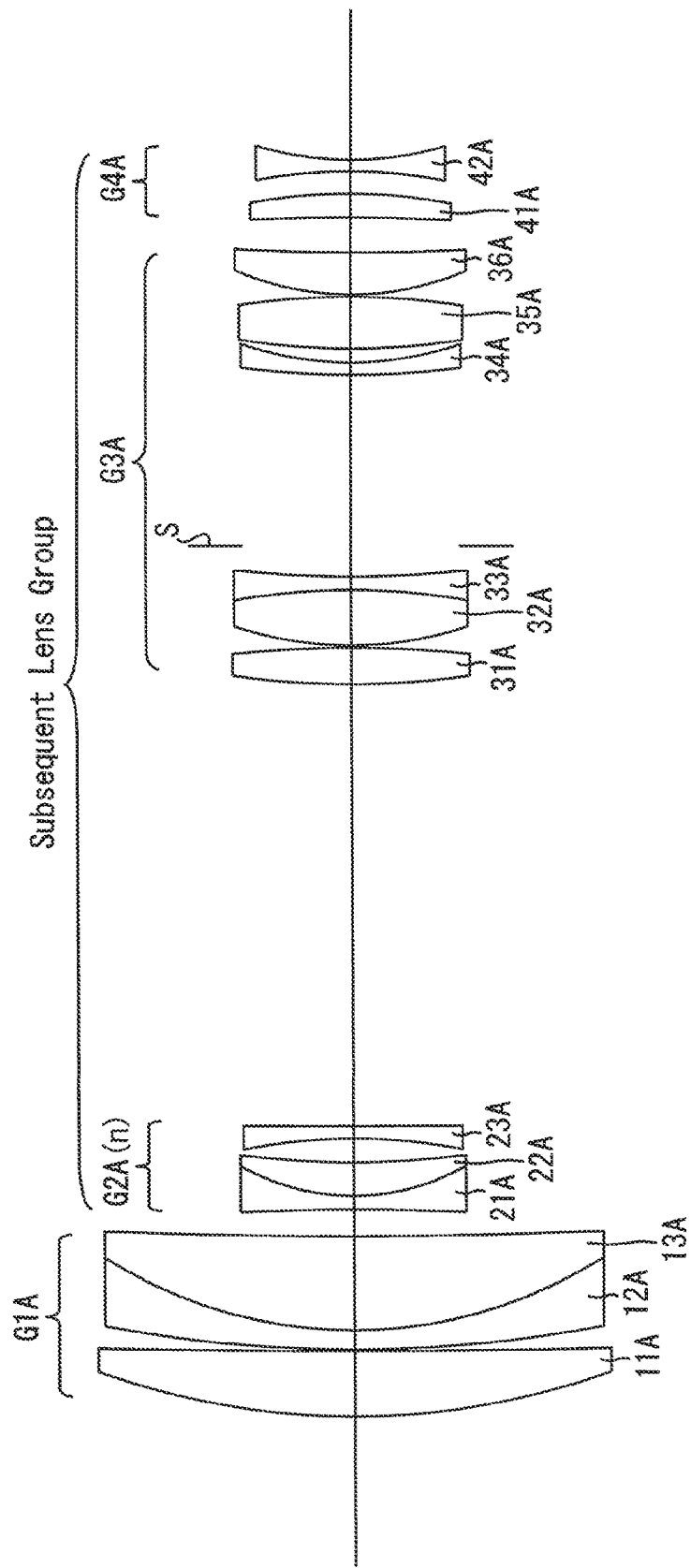
FIG. 1 shows a lens arrangement of a first numerical embodiment of a zoom lens system, according to the present invention, at the short focal length extremity when focused on an object at infinity.

FIGS. 1 through 5D and Tables 1 through 4 disclose a first numerical embodiment of the zoom lens system according to the present invention. FIG. 1 shows a lens arrangement of the zoom lens system at the short focal length extremity when focused on an object at infinity. FIGS. 2A, 2B, 2C and 2D show various aberrations that occurred in the zoom lens system of FIG. 1, at the short focal length extremity when focused on an object at infinity. FIGS. 3A, 3B, 3C and 3D show lateral aberrations that occurred in the zoom lens system of FIG. 1, at the short focal length extremity when focused on an object at infinity. FIGS. 4A, 4B, 4C and 4D show various aberrations that occurred in the zoom lens system of FIG. 1, at the long focal length extremity when focused on an object at infinity. FIGS. 5A, 5B, 5O and 5D show lateral aberrations that occurred in the zoom lens system of FIG. 1, at the long focal length extremity when focused on an object at infinity. Table 1 indicates the surface data. Table 2 indicates various lens system data when the zoom lens system is focused on an object at infinity (photographing magnification=0). Table 3 indicates lens-group data. Table 4 indicates various lens system data when the zoom lens system is focused on an object at a finite distance.

The zoom lens system of the present first numerical embodiment is configured of a positive first lens group G1A, a negative second lens group (subsequent rear lens group/$n^{th}$ lens group) G2A, a positive third lens group (subsequent rear lens group) G3A, and a negative fourth lens group (subsequent rear lens group) G4A, in that order from the object side. A diaphragm S is provided within the third lens group G3A and moves integrally with the third lens group G3A during zooming.

The first lens group G1A is configured of a positive meniscus lens element 11A having a convex surface on the object side, a negative meniscus lens element 12A having a convex surface on the object side, and a positive meniscus lens element 13A having a convex surface on the object side, in that order from the object side. The negative meniscus lens element 12A and the positive meniscus lens element 13A are cemented to each other.

The second lens group G2A is configured of a biconcave negative lens element 21A, a positive meniscus lens element 22A having a convex surface on the object side, and a biconcave negative lens element 23A, in that order from the object side. The biconcave negative lens element 21A and the positive meniscus lens element 22A are cemented to each other.

The third lens group G3A is configured of a biconvex positive lens element 31A, a biconvex positive lens element 32A, a biconcave negative lens element 33A, a diaphragm S, a negative meniscus lens element 34A having a convex surface on the object side, a biconvex positive lens element 35A, and a positive meniscus lens element 36A having a convex surface on the object side, in that order from the object side. The biconvex positive lens element 32A and the biconcave negative lens element 33A are cemented to each other.

The fourth lens group G4A is configured of a positive meniscus lens element 41A having a convex surface on the image side, and a biconcave negative lens element 42A, in that order from the object side.

TABLE 1

SURFACE DATA

| Surf. No. | R | d | N(d) | ν(d) |
|---|---|---|---|---|
| 1 | 66.223 | 5.940 | 1.51633 | 64.14 |
| 2 | 990.033 | 0.150 | | |
| 3 | 119.740 | 1.700 | 1.78590 | 44.20 |
| 4 | 41.913 | 8.270 | 1.48749 | 70.24 |
| 5 | 533.575 | d5 | | |
| 6 | −200.863 | 1.200 | 1.79952 | 42.22 |
| 7 | 20.538 | 2.960 | 1.84666 | 23.78 |
| 8 | 77.368 | 2.101 | | |
| 9 | −49.938 | 1.100 | 1.80400 | 46.58 |
| 10 | 3743.504 | d10 | | |
| 11 | 74.271 | 3.220 | 1.72916 | 54.68 |
| 12 | −101.460 | 0.200 | | |
| 13 | 33.328 | 4.920 | 1.49700 | 81.55 |
| 14 | −58.601 | 1.200 | 1.80610 | 33.27 |
| 15 | 97.682 | 2.700 | | |
| 16 (Diaphragm) | ∞ | 15.026 | | |
| 17 | 78.451 | 1.100 | 1.80610 | 33.27 |
| 18 | 30.401 | 1.242 | | |
| 19 | 67.476 | 4.540 | 1.58913 | 61.13 |
| 20 | −67.476 | 0.200 | | |
| 21 | 26.356 | 3.730 | 1.58313 | 59.37 |
| 22 | 200.093 | d22 | | |
| 23 | −225.082 | 2.110 | 1.78472 | 25.68 |
| 24 | −47.838 | 1.968 | | |
| 25 | −44.791 | 1.000 | 1.69680 | 55.53 |
| 26 | 29.861 | — | | |
| fn: | −82.849 | | | |
| θgFn: | 0.5631 | | | |

TABLE 2

VARIOUS DATA WHEN FOCUSED ON OBJECT AT INFINITY
(Photographing Magnification = 0)
Zoom Ratio: 5.15

| | Short Focal Length Extremity | Intermediate Focal Length | Long Focal Length Extremity |
|---|---|---|---|
| FNO. | 4.60 | 5.14 | 6.48 |
| f | 56.500 | 132.085 | 291.188 |
| W | 14.5 | 6.0 | 2.7 |
| Y | 14.24 | 14.24 | 14.24 |
| fB | 52.474 | 57.967 | 81.814 |
| L | 163.502 | 201.850 | 233.845 |
| d5 | 2.392 | 53.371 | 79.101 |
| d10 | 39.049 | 18.199 | 3.044 |
| d22 | 3.010 | 5.736 | 3.310 |

TABLE 3

LENS GROUP DATA

| Lens Group | 1$^{st}$ Surf. | Focal Length |
|---|---|---|
| 1 | 1 | 166.473 |
| 2(Subsequent/n) | 6 | −33.874 |
| 3(Subsequent) | 11 | 35.379 |
| 4(Subsequent) | 23 | −39.835 |

TABLE 4

VARIOUS DATA WHEN FOCUSED ON
OBJECT AT FINITE DISTANCE

| Object-to-Image Dist. | 5000.0 | 5000.0 | 5000.0 |
|---|---|---|---|
| Magnification | −0.012 | −0.027 | −0.058 |
| d5 | 2.392 | 53.371 | 79.101 |
| d10 | 39.049 | 18.199 | 3.044 |
| d22 | 3.163 | 6.455 | 5.408 |
| fB | 52.321 | 57.248 | 79.716 |
| Object-to-Image Dist. | 1500.0 | 1500.0 | 1500.0 |
| Magnification | −0.041 | −0.090 | −0.191 |
| d5 | 2.392 | 53.371 | 79.101 |
| d10 | 39.049 | 18.199 | 3.044 |
| d22 | 3.553 | 8.216 | 10.562 |
| fB | 51.931 | 55.487 | 74.562 |

[Embodiment 2]

Figure 6:
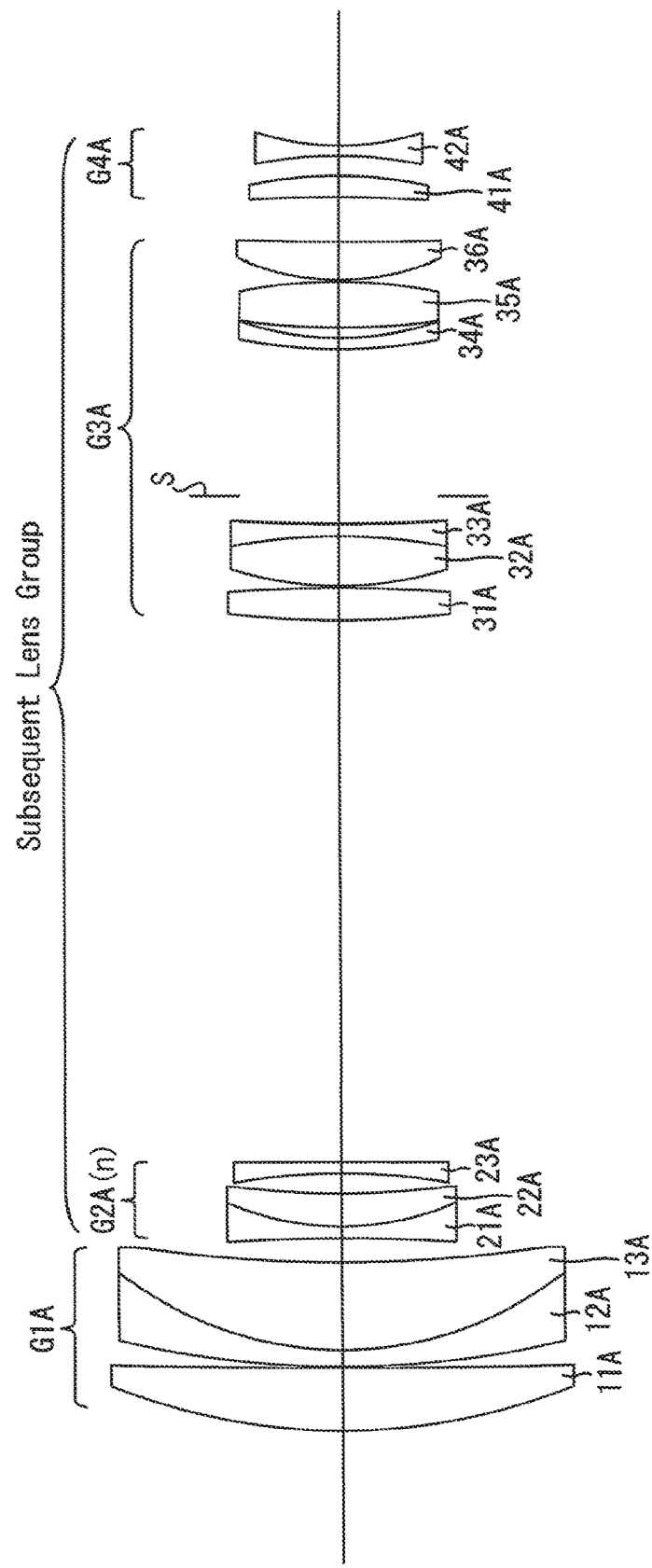
FIG. 6 shows a lens arrangement of a second numerical embodiment of a zoom lens system, according to the present invention, at the short focal length extremity when focused on an object at infinity.

FIGS. 6 through 10D and Tables 5 through 8 disclose a second numerical embodiment of the zoom lens system according to the present invention. FIG. 6 shows a lens arrangement of the zoom lens system at the short focal length extremity when focused on an object at infinity. FIGS. 7A, 7B, 7C and 7D show various aberrations that occurred in the zoom lens system of FIG. 6, at the short focal length extremity when focused on an object at infinity. FIGS. 8A, 8B, 8C and 8D show lateral aberrations that occurred in the zoom lens system of FIG. 6, at the short focal length extremity when focused on an object at infinity. FIGS. 9A, 9B, 9C and 9D show various aberrations that occurred in the zoom lens system of FIG. 6, at the long focal length extremity when focused on an object at infinity. FIGS. 10A, 10B, 100 and 10D show lateral aberrations that occurred in the zoom lens system of FIG. 6, at the long focal length extremity when focused on an object at infinity. Table 5 indicates the surface data. Table 6 indicates various lens system data when the zoom lens system is focused on an object at infinity (photographing magnification=0). Table 7 indicates lens-group data. Table 8 indicates various lens system data when the zoom lens system is focused on an object at a finite distance.

The lens arrangement of the second numerical embodiment is the same as that of the first numerical embodiment except for the following aspect:

(1) The negative lens element 23A of the second lens group G2A is a negative meniscus lens element having a convex surface on the image side.

TABLE 5

SURFACE DATA

| Surf. No. | R | d | N(d) | ν(d) |
|---|---|---|---|---|
| 1 | 61.393 | 6.401 | 1.51633 | 64.14 |
| 2 | 902.173 | 0.150 | | |
| 3 | 95.930 | 1.700 | 1.77250 | 49.60 |
| 4 | 36.721 | 8.600 | 1.49700 | 81.55 |
| 5 | 141.796 | d5 | | |
| 6 | −177.869 | 1.200 | 1.77250 | 49.60 |
| 7 | 29.098 | 3.290 | 1.84666 | 23.78 |
| 8 | 86.418 | 2.000 | | |
| 9 | −62.371 | 1.100 | 1.75700 | 47.82 |
| 10 | −2093.121 | d10 | | |
| 11 | 99.539 | 3.220 | 1.77250 | 49.60 |
| 12 | −149.308 | 0.200 | | |
| 13 | 36.913 | 4.920 | 1.43875 | 94.94 |
| 14 | −59.665 | 1.200 | 1.85026 | 32.27 |
| 15 | 214.161 | 2.700 | | |
| 16 (Diaphragm) | ∞ | 14.600 | | |
| 17 | 53.687 | 1.100 | 1.80610 | 33.27 |
| 18 | 31.115 | 1.020 | | |

TABLE 5-continued

SURFACE DATA

| Surf. No. | R | d | N(d) | v(d) |
|---|---|---|---|---|
| 19 | 75.699 | 4.540 | 1.48749 | 70.24 |
| 20 | −52.963 | 0.200 | | |
| 21 | 25.649 | 3.730 | 1.51633 | 64.14 |
| 22 | 367.504 | d22 | | |
| 23 | −151.738 | 2.110 | 1.78472 | 25.68 |
| 24 | −43.324 | 1.970 | | |
| 25 | −41.608 | 1.000 | 1.69680 | 55.53 |
| 26 | 27.738 | — | | |
| fn: | −77.992 | | | |
| θgFn: | 0.5520 | | | |

TABLE 6

VARIOUS DATA WHEN FOCUSED ON OBJECT AT INFINITY
(Photographing Magnification = 0)
Zoom Ratio: 5.15

| | Short Focal Length Extremity | Intermediate Focal Length | Long Focal Length Extremity |
|---|---|---|---|
| FNO. | 4.60 | 5.21 | 6.30 |
| f | 56.475 | 131.498 | 291.112 |
| W | 14.6 | 6.1 | 2.7 |
| Y | 14.24 | 14.24 | 14.24 |
| fB | 52.790 | 60.197 | 80.531 |
| L | 180.222 | 209.742 | 239.581 |
| d5 | 2.392 | 53.073 | 85.419 |
| d10 | 53.667 | 23.179 | 3.000 |
| d22 | 4.422 | 6.342 | 3.681 |

TABLE 7

LENS GROUP DATA

| Lens Group | 1st Surf. | Focal Length |
|---|---|---|
| 1 | 1 | 186.993 |
| 2(Subsequent/n) | 6 | −42.087 |
| 3(Subsequent) | 11 | 35.447 |
| 4(Subsequent) | 23 | −35.658 |

TABLE 8

VARIOUS DATA WHEN FOCUSED ON
OBJECT AT FINITE DISTANCE

| Object-to-Image Dist. | 5000.0 | 5000.0 | 5000.0 |
|---|---|---|---|
| Magnification | −0.012 | −0.026 | −0.058 |
| d5 | 2.392 | 53.073 | 85.419 |
| d10 | 53.667 | 23.179 | 3.000 |
| d22 | 4.551 | 6.913 | 5.480 |
| fB | 52.661 | 59.626 | 78.732 |
| Object-to-Image Dist. | 1500.0 | 1500.0 | 1500.0 |
| Magnification | −0.041 | −0.090 | −0.188 |
| d5 | 2.392 | 53.073 | 85.419 |
| d10 | 53.667 | 23.179 | 3.000 |
| d22 | 4.881 | 8.309 | 9.804 |
| fB | 52.330 | 58.230 | 74.408 |

[Embodiment 3]

Figure 11:
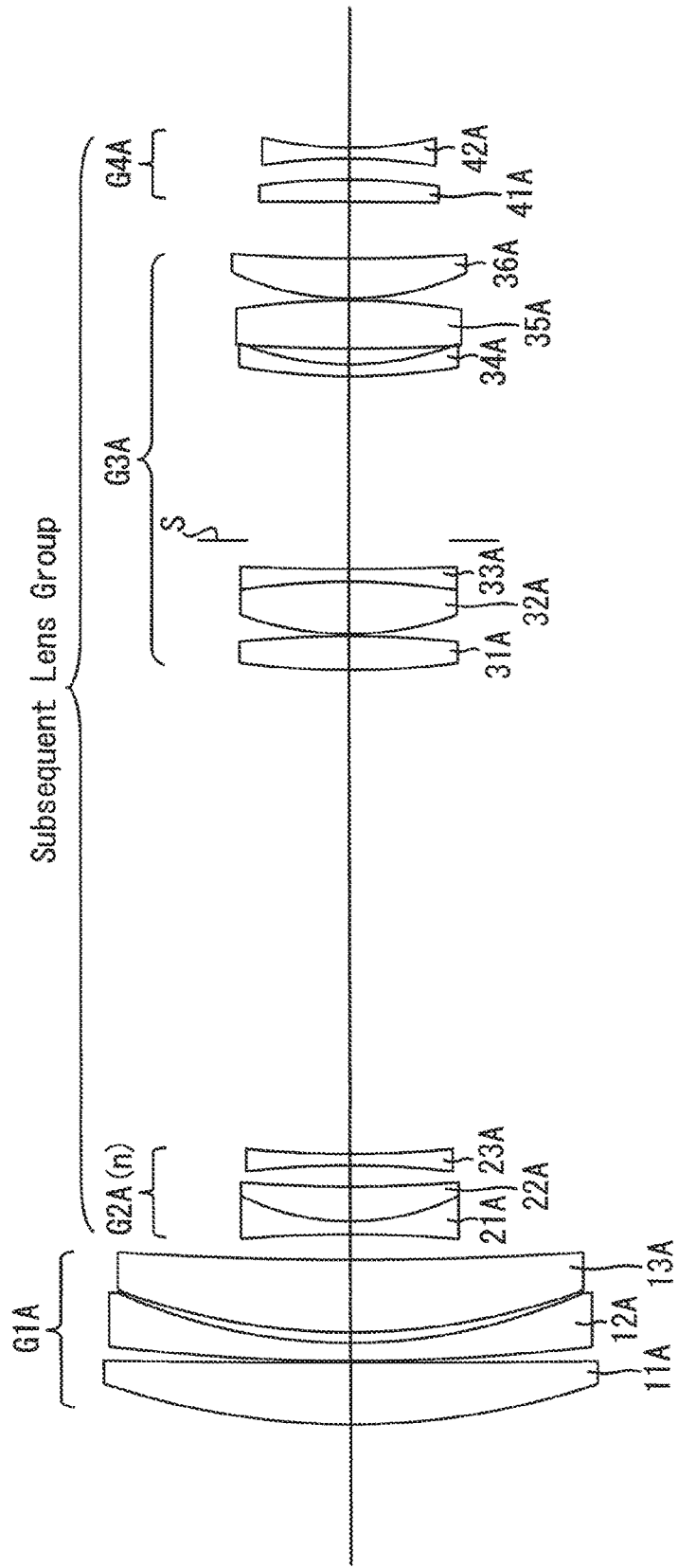
FIG. 11 shows a lens arrangement of a third numerical embodiment of a zoom lens system, according to the present invention, at the short focal length extremity when focused on an object at infinity.

FIGS. 11 through 15D and Tables 9 through 12 disclose a third numerical embodiment of the zoom lens system according to the present invention. FIG. 11 shows a lens arrangement of the zoom lens system at the short focal length extremity when focused on an object at infinity. FIGS. 12A, 12B, 12C and 12D show various aberrations that occurred in the zoom lens system of FIG. 11, at the short focal length extremity when focused on an object at infinity. FIGS. 13A, 13B, 13C and 13D show lateral aberrations that occurred in the zoom lens system of FIG. 11, at the short focal length extremity when focused on an object at infinity. FIGS. 14A, 14B, 14C and 14D show various aberrations that occurred in the zoom lens system of FIG. 11, at the long focal length extremity when focused on an object at infinity. FIGS. 15A, 15B, 15C and 15D show lateral aberrations that occurred in the zoom lens system of FIG. 11, at the long focal length extremity when focused on an object at infinity. Table 9 indicates the surface data. Table 10 indicates various lens system data when the zoom lens system is focused on an object at infinity (photographing magnification=0). Table 11 indicates lens-group data. Table 12 indicates various lens system data when the zoom lens system is focused on an object at a finite distance.

The lens arrangement of the third numerical embodiment is the same as that of the first numerical embodiment except for the following aspect:

(1) The negative meniscus lens element 12A and the positive meniscus lens element 13A of the first lens group G1A are not cemented to each other.

TABLE 9

SURFACE DATA

| Surf. No. | R | d | N(d) | v(d) |
|---|---|---|---|---|
| 1 | 72.233 | 5.940 | 1.56384 | 60.67 |
| 2 | 2154.156 | 0.150 | | |
| 3 | 198.530 | 1.695 | 1.65412 | 39.68 |
| 4 | 53.924 | 1.018 | | |
| 5 | 64.003 | 6.793 | 1.48749 | 70.24 |
| 6 | 351.929 | d6 | | |
| 7 | −122.680 | 1.200 | 1.72000 | 41.98 |
| 8 | 23.598 | 3.290 | 1.84666 | 23.78 |
| 9 | 145.444 | 2.000 | | |
| 10 | −85.911 | 1.100 | 1.83400 | 37.16 |
| 11 | 104.904 | d11 | | |
| 12 | 85.156 | 3.220 | 1.60311 | 60.64 |
| 13 | −100.708 | 0.200 | | |
| 14 | 31.321 | 4.920 | 1.43875 | 94.94 |
| 15 | −69.807 | 1.200 | 1.80610 | 33.27 |
| 16 | 264.365 | 2.700 | | |
| 17 (Diaphragm) | ∞ | 15.347 | | |
| 18 | 63.407 | 1.100 | 1.80610 | 33.27 |
| 19 | 28.316 | 1.524 | | |
| 20 | 196.667 | 4.540 | 1.58913 | 61.13 |
| 21 | −70.259 | 0.200 | | |
| 22 | 27.416 | 3.730 | 1.58313 | 59.37 |
| 23 | 149.019 | d23 | | |
| 24 | −1112.327 | 2.110 | 1.78472 | 25.68 |
| 25 | −59.735 | 1.970 | | |
| 26 | −53.548 | 1.000 | 1.69680 | 55.53 |
| 27 | 38.046 | — | | |
| fn: | −113.707 | | | |
| θgFn: | 0.5737 | | | |

TABLE 10

VARIOUS DATA WHEN FOCUSED ON OBJECT AT INFINITY
(Photographing Magnification = 0)
Zoom Ratio: 5.14

| | Short Focal Length Extremity | Intermediate Focal Length | Long Focal Length Extremity |
|---|---|---|---|
| FNO. | 4.60 | 4.96 | 6.52 |
| f | 56.497 | 105.725 | 290.400 |
| W | 14.6 | 7.6 | 2.8 |
| Y | 14.24 | 14.24 | 14.24 |
| fB | 49.997 | 49.721 | 81.617 |
| L | 169.218 | 197.275 | 247.917 |
| d6 | 2.400 | 46.685 | 93.054 |

TABLE 10-continued

VARIOUS DATA WHEN FOCUSED ON OBJECT AT INFINITY
(Photographing Magnification = 0)
Zoom Ratio: 5.14

|  | Short Focal Length Extremity | Intermediate Focal Length | Long Focal Length Extremity |
|---|---|---|---|
| d11 | 45.623 | 23.956 | 3.000 |
| d23 | 5.252 | 9.966 | 3.300 |

TABLE 11

LENS GROUP DATA

| Lens Group | 1st Surf. | Focal Length |
|---|---|---|
| 1 | 1 | 194.587 |
| 2(Subsequent/n) | 7 | −41.025 |
| 3(Subsequent) | 12 | 40.075 |
| 4(Subsequent) | 24 | −55.109 |

TABLE 12

VARIOUS DATA WHEN FOCUSED ON
OBJECT AT FINITE DISTANCE

| Object-to-Image Dist. | 5000.0 | 5000.0 | 5000.0 |
|---|---|---|---|
| Magnification | −0.012 | −0.021 | −0.058 |
| d6 | 2.400 | 46.685 | 93.054 |
| d11 | 45.623 | 23.956 | 3.000 |
| d23 | 5.517 | 10.870 | 6.742 |
| fB | 48.732 | 48.817 | 78.175 |
| Object-to-Image Dist. | 1500.0 | 1500.0 | 1500.0 |
| Magnification | −0.041 | −0.073 | −0.190 |
| d6 | 2.400 | 46.685 | 93.054 |
| d11 | 45.623 | 23.956 | 3.000 |
| d23 | 6.194 | 13.155 | 15.603 |
| fB | 48.055 | 46.532 | 69.314 |

[Embodiment 4]

Figure 16:
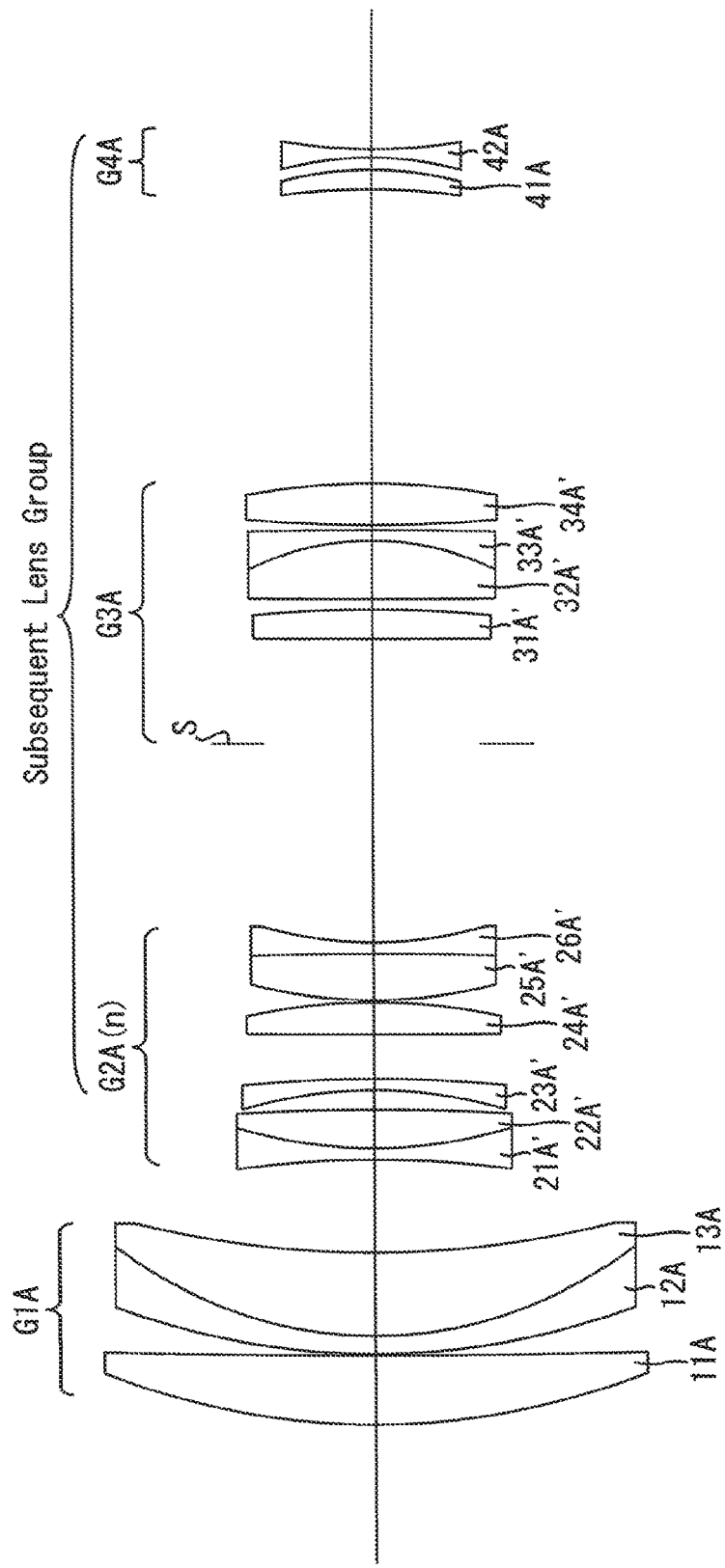
FIG. 16 shows a lens arrangement of a fourth numerical embodiment of a zoom lens system, according to the present invention, at the short focal length extremity when focused on an object at infinity.
Figures 17A, 17B, 17C, 17D:
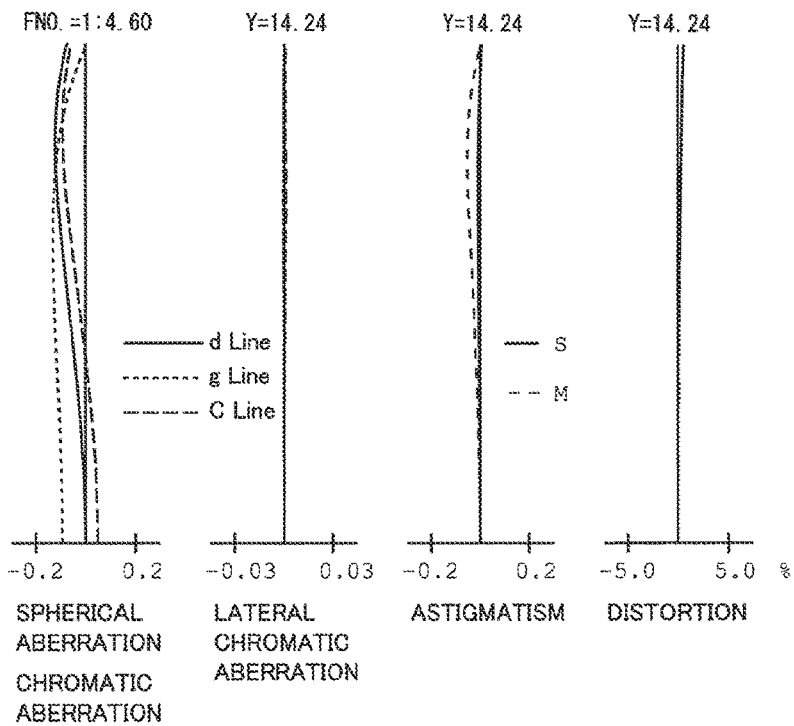
FIGS. 17A, 17B, 17C and 17D show various aberrations that occurred in the zoom lens system of FIG. 16, at the short focal length extremity when focused on an object at infinity.
Figure 18A:
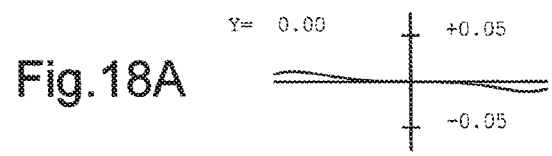
FIGS. 18A, 18B, 18C and 18D show lateral aberrations that occurred in the zoom lens system of FIG. 16, at the short focal length extremity when focused on an object at infinity.
Figure 18B:
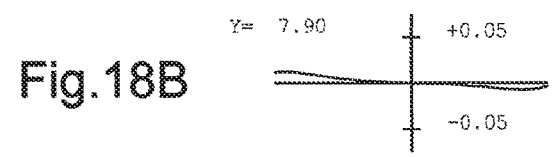
Figure 18C:
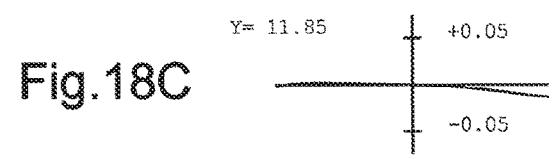
Figure 18D:
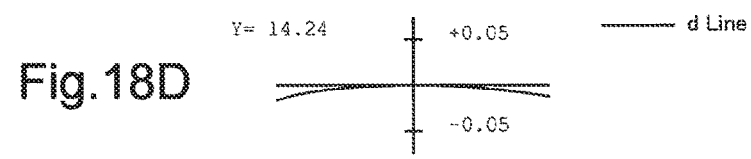

FIGS. 16 through 20D and Tables 13 through 16 disclose a fourth numerical embodiment of the zoom lens system according to the present invention. FIG. 16 shows a lens arrangement of the zoom lens system at the short focal length extremity when focused on an object at infinity. FIGS. 17A, 17B, 17C and 17D show various aberrations that occurred in the zoom lens system of FIG. 16, at the short focal length extremity when focused on an object at infinity. FIGS. 18A, 18B, 18C and 18D show lateral aberrations that occurred in the zoom lens system of FIG. 16, at the short focal length extremity when focused on an object at infinity. FIGS. 19A, 19B, 19C and 19D show various aberrations that occurred in the zoom lens system of FIG. 16, at the long focal length extremity when focused on an object at infinity. FIGS. 20A, 20B, 20C and 20D show lateral aberrations that occurred in the zoom lens system of FIG. 16, at the long focal length extremity when focused on an object at infinity. Table 13 indicates the surface data. Table 14 indicates various lens system data when the zoom lens system is focused on an object at infinity (photographing magnification=0). Table 15 indicates lens-group data. Table 16 indicates various lens system data when the zoom lens system is focused on an object at a finite distance.

The lens arrangement of the fourth numerical embodiment is the same as that of the first numerical embodiment except for the following aspects:

(1) The second lens group G2A is configured of a biconcave negative lens element 21A', a biconvex positive lens element 22A', a negative meniscus lens element 23A' having a convex surface on the image side, a biconvex positive lens element 24A', a biconvex positive lens element 25A', and a biconcave negative lens element 26A', in that order from the object side. The biconcave negative lens element 21A' and the biconvex positive lens element 22A' are cemented to each other. The biconvex positive lens element 25A' and the biconcave negative lens element 26A' are cemented to each other.

(2) The third lens group G3A is configured of a biconvex positive lens element 31A', a biconvex positive lens element 32A', a negative meniscus lens element 33A' having a convex surface on the image side, a biconvex positive lens element 34A', in that order from the object side. The biconvex positive lens element 32A' and the negative meniscus lens element 33A' are cemented to each other.

TABLE 13

SURFACE DATA

| Surf. No. | R | d | N(d) | ν(d) |
|---|---|---|---|---|
| 1 | 70.162 | 6.719 | 1.48749 | 70.24 |
| 2 | 1062.964 | 0.150 |  |  |
| 3 | 72.242 | 1.700 | 1.79952 | 42.22 |
| 4 | 40.808 | 7.950 | 1.49700 | 81.55 |
| 5 | 95.931 | d5 |  |  |
| 6 | −99.283 | 1.100 | 1.65412 | 39.68 |
| 7 | 46.676 | 3.671 | 1.84666 | 23.78 |
| 8 | −227.495 | 1.850 |  |  |
| 9 | −45.478 | 1.100 | 1.74400 | 44.79 |
| 10 | −130.368 | 4.240 |  |  |
| 11 | 1010.844 | 3.020 | 1.69680 | 55.53 |
| 12 | −57.629 | 0.200 |  |  |
| 13 | 47.198 | 4.388 | 1.58913 | 61.13 |
| 14 | −554.056 | 1.120 | 1.90366 | 31.31 |
| 15 | 39.442 | d15 |  |  |
| 16 (Diaphragm) | ∞ | 9.970 |  |  |
| 17 | 1476.750 | 2.844 | 1.49700 | 81.55 |
| 18 | −113.772 | 1.000 |  |  |
| 19 | 2490.306 | 5.600 | 1.58913 | 61.13 |
| 20 | −27.109 | 1.000 | 1.74950 | 35.33 |
| 21 | −601.561 | 0.500 |  |  |
| 22 | 149.878 | 3.977 | 1.80440 | 39.58 |
| 23 | −66.211 | d23 |  |  |
| 24 | −65.900 | 1.840 | 1.80518 | 25.43 |
| 25 | −34.671 | 1.160 |  |  |
| 26 | −33.551 | 0.800 | 1.61800 | 63.33 |
| 27 | 52.978 | — |  |  |
| fn: | −120.191 |  |  |  |
| θgFn: | 0.5672 |  |  |  |

TABLE 14

VARIOUS DATA WHEN FOCUSED ON OBJECT AT INFINITY
(Photographing Magnification = 0)
Zoom Ratio: 2.35

|  | Short Focal Length Extremity | Intermediate Focal Length | Long Focal Length Extremity |
|---|---|---|---|
| FNO. | 4.60 | 5.10 | 6.03 |
| f | 123.700 | 199.066 | 290.532 |
| W | 6.5 | 4.0 | 2.8 |
| Y | 14.24 | 14.24 | 14.24 |
| fB | 37.599 | 59.674 | 90.719 |
| L | 159.21 | 197.42 | 234.86 |
| d5 | 8.870 | 51.240 | 68.920 |
| d15 | 18.930 | 7.360 | 6.820 |
| d23 | 27.910 | 13.250 | 2.500 |

TABLE 15

LENS GROUP DATA

| Lens Group | 1st Surf. | Focal Length |
|---|---|---|
| 1 | 1 | 181.463 |
| 2(Subsequent/n) | 6 | −164.680 |
| 3(Subsequent) | 17 | 57.648 |
| 4(Subsequent) | 24 | −53.157 |

TABLE 16

VARIOUS DATA WHEN FOCUSED ON OBJECT AT FINITE DISTANCE

| | | | |
|---|---|---|---|
| Object-to-Image Dist. | 5000.0 | 5000.0 | 5000.0 |
| Magnification | −0.025 | −0.040 | −0.059 |
| d5 | 8.870 | 51.240 | 68.920 |
| d15 | 18.930 | 7.360 | 6.820 |
| d23 | 29.564 | 15.585 | 5.254 |
| fB | 35.945 | 57.339 | 87.965 |
| Object-to-Image Dist. | 3000.0 | 3000.0 | 3000.0 |
| Magnification | −0.042 | −0.067 | −0.099 |
| d5 | 8.870 | 51.240 | 68.920 |
| d15 | 18.930 | 7.360 | 6.820 |
| d23 | 30.745 | 17.241 | 7.197 |
| fB | 34.764 | 55.683 | 86.022 |

[Embodiment 5]

Figure 21:
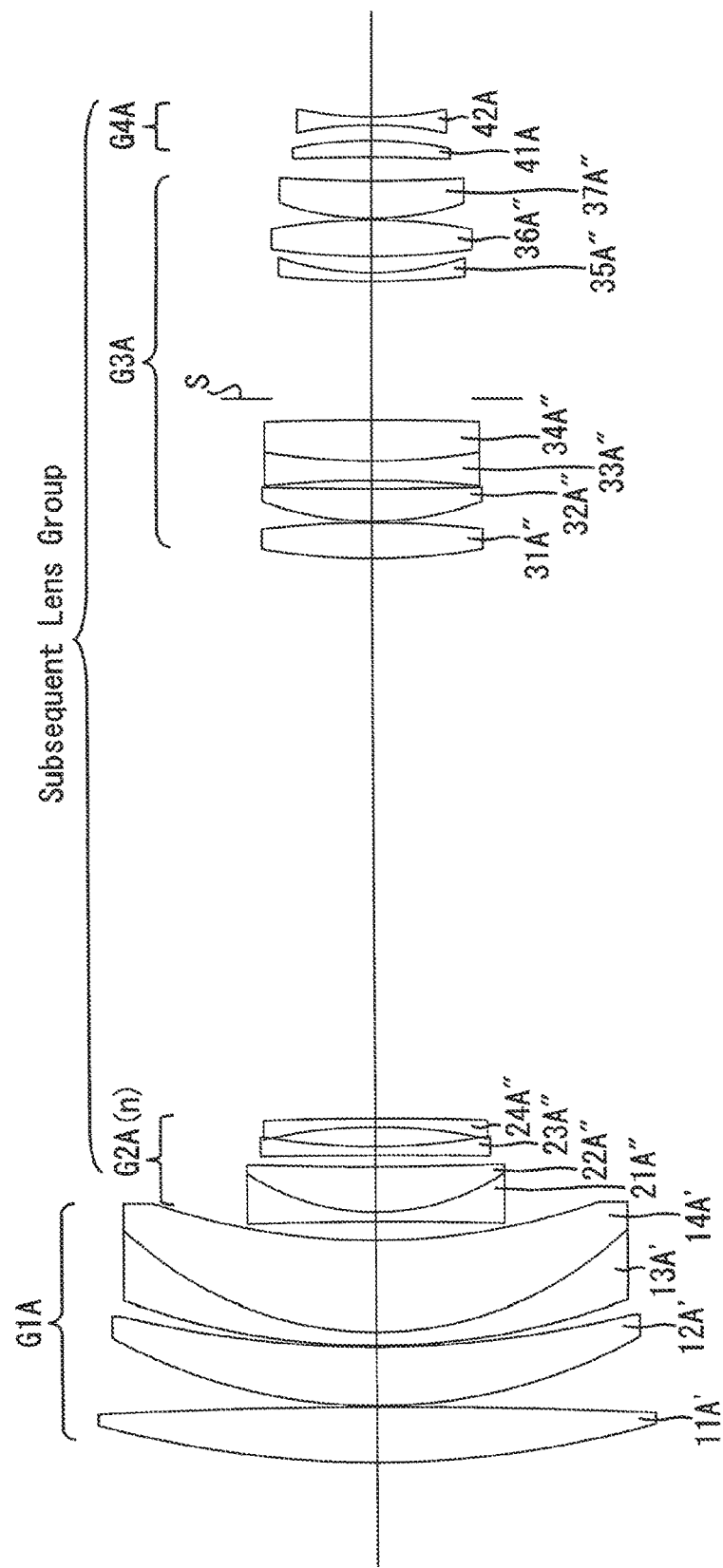
FIG. 21 shows a lens arrangement of a fifth numerical embodiment of a zoom lens system, according to the present invention, at the short focal length extremity when focused on an object at infinity.

FIGS. 21 through 25D and Tables 17 through 20 disclose a fifth numerical embodiment of the zoom lens system according to the present invention. FIG. 21 shows a lens arrangement of the zoom lens system at the short focal length extremity when focused on an object at infinity. FIGS. 22A, 22B, 22C and 22D show various aberrations that occurred in the zoom lens system of FIG. 21, at the short focal length extremity when focused on an object at infinity. FIGS. 23A, 23B, 23C and 23D show lateral aberrations that occurred in the zoom lens system of FIG. 21, at the short focal length extremity when focused on an object at infinity. FIGS. 24A, 24B, 24C and 24D show various aberrations that occurred in the zoom lens system of FIG. 21, at the long focal length extremity when focused on an object at infinity. FIGS. 25A, 25B, 25C and 25D show lateral aberrations that occurred in the zoom lens system of FIG. 21, at the long focal length extremity when focused on an object at infinity. Table 17 indicates the surface data. Table 18 indicates various lens system data when the zoom lens system is focused on an object at infinity (photographing magnification=0). Table 19 indicates lens-group data. Table 20 indicates various lens system data when the zoom lens system is focused on an object at a finite distance.

The lens arrangement of the fifth numerical embodiment is the same as that of the first numerical embodiment except for the following aspects:

(1) The first lens group G1A is configured of a biconvex positive lens element 11A', a positive meniscus lens element 12A' having a convex surface on the object side, a negative meniscus lens element 13A' having a convex surface on the object side, and a positive meniscus lens element 14A' having a convex surface on the object side, in that order from the object side. The negative meniscus lens element 13A' and the positive meniscus lens element 14A' are cemented to each other.

(2) The second lens group G2A is configured of a biconcave negative lens element 21A", a positive meniscus lens element 22A" having a convex surface on the object side, a biconcave negative lens element 23A", and a negative meniscus lens element 24A" having a convex surface on the image side, in that order from the object side. The biconcave negative lens element 21A" and the positive meniscus lens element 22A" are cemented to each other.

(3) The third lens group G3A is configured of a biconvex positive lens element 31A", a positive meniscus lens element 32A" having a convex surface on the object side, a biconcave negative lens element 33A", a biconvex positive lens element 34A", a diaphragm S, a negative meniscus lens element 35A" having a convex surface on the object side, a biconvex positive lens element 36A", and a positive meniscus lens element 37A" having a convex surface on the object side, in that order from the object side. The biconcave negative lens element 33A" and the biconvex positive lens element 34A" are cemented to each other.

TABLE 17

SURFACE DATA

| Surf. No. | R | d | N(d) | ν(d) |
|---|---|---|---|---|
| 1 | 132.862 | 7.230 | 1.48749 | 70.24 |
| 2 | −708.635 | 0.150 | | |
| 3 | 69.897 | 7.447 | 1.49700 | 81.55 |
| 4 | 136.784 | 0.150 | | |
| 5 | 92.773 | 1.695 | 1.79952 | 42.22 |
| 6 | 46.408 | 11.599 | 1.49700 | 81.55 |
| 7 | 87.512 | d7 | | |
| 8 | −520.244 | 1.200 | 1.77250 | 49.60 |
| 9 | 30.265 | 5.734 | 1.80518 | 25.43 |
| 10 | 412.171 | 1.469 | | |
| 11 | −887.405 | 1.100 | 1.74400 | 44.79 |
| 12 | 81.437 | 2.514 | | |
| 13 | −65.497 | 1.100 | 1.83400 | 37.16 |
| 14 | −371.185 | d14 | | |
| 15 | 86.267 | 4.495 | 1.48749 | 70.24 |
| 16 | −124.694 | 0.200 | | |
| 17 | 42.457 | 3.989 | 1.61800 | 63.33 |
| 18 | 546.797 | 1.070 | | |
| 19 | −142.524 | 2.500 | 1.85026 | 32.27 |
| 20 | 93.572 | 5.163 | 1.49700 | 81.55 |
| 21 | −452.005 | 2.700 | | |
| 22 (Diaphragm) | ∞ | 14.795 | | |
| 23 | 114.423 | 1.100 | 1.80610 | 33.27 |
| 24 | 38.699 | 2.064 | | |
| 25 | 91.308 | 4.540 | 1.53775 | 74.70 |
| 26 | −71.519 | 0.200 | | |
| 27 | 37.686 | 4.752 | 1.72916 | 54.68 |
| 28 | 201.792 | d28 | | |
| 29 | −223.981 | 2.110 | 1.78472 | 25.68 |
| 30 | −50.837 | 1.970 | | |
| 31 | −46.569 | 1.000 | 1.69680 | 55.53 |
| 32 | 47.853 | — | | |
| fn: | −118.062 | | | |
| θgFn: | 0.5672 | | | |

TABLE 18

VARIOUS DATA WHEN FOCUSED ON OBJECT AT INFINITY
(Photographing Magnification = 0)
Zoom Ratio: 5.15

| | Short Focal Length Extremity | Intermediate Focal Length | Long Focal Length Extremity |
|---|---|---|---|
| FNO. | 3.50 | 3.68 | 4.62 |
| f | 56.528 | 132.322 | 291.175 |
| W | 14.7 | 6.1 | 2.8 |
| Y | 14.24 | 14.24 | 14.24 |
| fB | 55.633 | 55.706 | 80.363 |
| L | 225.880 | 243.399 | 254.981 |
| d7 | 2.392 | 53.073 | 73.932 |
| d14 | 70.809 | 33.953 | 3.000 |
| d28 | 3.010 | 6.631 | 3.651 |

TABLE 19

LENS GROUP DATA

| Lens Group | 1st Surf. | Focal Length |
|---|---|---|
| 1 | 1 | 189.485 |
| 2(Subsequent/n) | 8 | -42.969 |
| 3(Subsequent) | 15 | 44.318 |
| 4(Subsequent) | 29 | -58.910 |

TABLE 20

VARIOUS DATA WHEN FOCUSED ON OBJECT AT FINITE DISTANCE

| Object-to-Image Dist. | 5000.0 | 5000.0 | 5000.0 |
|---|---|---|---|
| Magnification | -0.012 | -0.026 | -0.057 |
| d7 | 2.392 | 53.073 | 73.932 |
| d14 | 70.809 | 33.953 | 3.000 |
| d28 | 3.253 | 7.933 | 7.497 |
| fB | 55.390 | 54.404 | 76.517 |
| Object-to-Image Dist. | 3000.0 | 3000.0 | 3000.0 |
| Magnification | -0.020 | -0.044 | -0.095 |
| d7 | 2.392 | 53.073 | 73.932 |
| d14 | 70.809 | 33.953 | 3.000 |
| d28 | 3.423 | 8.813 | 10.157 |
| fB | 55.220 | 53.524 | 73.857 |

[Embodiment 6]

Figure 26:
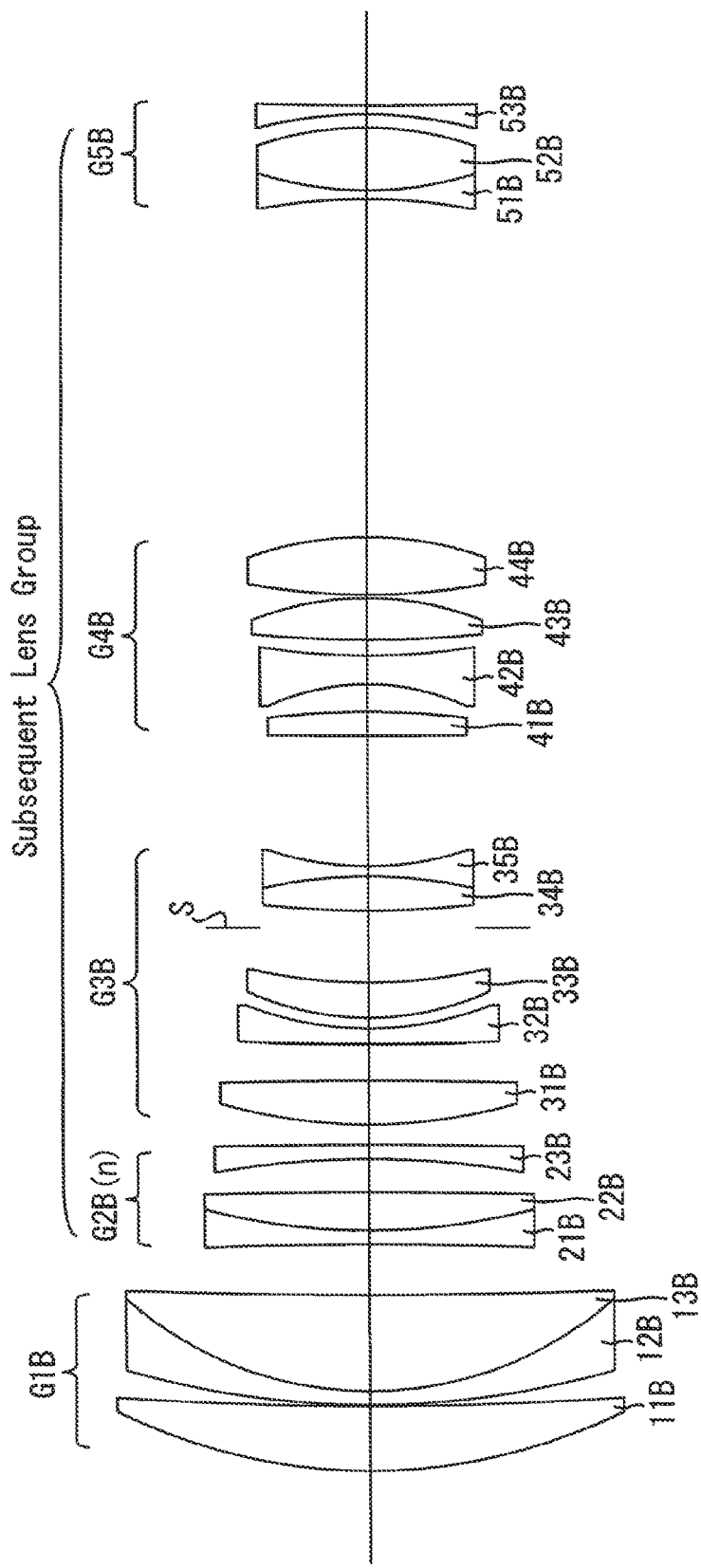
FIG. 26 shows a lens arrangement of a sixth numerical embodiment of a zoom lens system, according to the present invention, at the short focal length extremity when focused on an object at infinity.

FIGS. 26 through 30D and Tables 21 through 24 disclose a sixth numerical embodiment of the zoom lens system according to the present invention. FIG. 26 shows a lens arrangement of the zoom lens system at the short focal length extremity when focused on an object at infinity. FIGS. 27A, 27B, 27C and 27D show various aberrations that occurred in the zoom lens system of FIG. 26, at the short focal length extremity when focused on an object at infinity. FIGS. 28A, 28B, 28C and 28D show lateral aberrations that occurred in the zoom lens system of FIG. 26, at the short focal length extremity when focused on an object at infinity. FIGS. 29A, 29B, 29C and 29D show various aberrations that occurred in the zoom lens system of FIG. 26, at the long focal length extremity when focused on an object at infinity. FIGS. 30A, 30B, 30C and 30D show lateral aberrations that occurred in the zoom lens system of FIG. 26, at the long focal length extremity when focused on an object at infinity. Table 21 indicates the surface data. Table 22 indicates various lens system data when the zoom lens system is focused on an object at infinity (photographing magnification=0). Table 23 indicates lens-group data. Table 24 indicates various lens system data when the zoom lens system is focused on an object at a finite distance.

The zoom lens system of the present sixth numerical embodiment is configured of a positive first lens group G1E, a negative second lens group (subsequent rear lens group/$n^{th}$ lens group) G2B, a negative third lens group (subsequent rear lens group) G3B, a positive fourth lens group (subsequent rear lens group) G4B, and a negative fifth lens group (subsequent rear lens group) G5B, in that order from the object side. A diaphragm S is provided within the third lens group G3B and moves integrally with the third lens group G3B during zooming.

The first lens group G1B is configured of a positive meniscus lens element 11B having a convex surface on the object side, a negative meniscus lens element 12B having a convex surface on the object side, and a positive meniscus lens element 13B having a convex surface on the object side, in that order from the object side. The negative meniscus lens element 12B and the positive meniscus lens element 13B are cemented to each other.

The second lens group G2B is configured of a biconcave negative lens element 21B, a biconvex positive lens element 22B, and a negative meniscus lens element 23B having a convex surface on the image side, in that order from the object side. The biconcave negative lens element 21B and the biconvex positive lens element 22B are cemented to each other.

The third lens group G3B is configured of a biconvex positive lens element 31B, a negative meniscus lens element 32B having a convex surface on the object side, a positive meniscus lens element 33B having a convex surface on the object side, a diaphragm S, a biconvex positive lens element 34B, and a biconcave negative lens element 35B, in that order from the object side. The biconvex positive lens element 34B and the biconcave negative lens element 35B are cemented to each other.

The fourth lens group G4B is configured of a biconvex positive lens element 41B, a biconcave negative lens element 42B, a biconvex positive lens element 43B, and a biconvex positive lens element 44B, in that order from the object side.

The fifth lens group G5B is configured of a biconcave negative lens element 51B, a biconvex positive lens element 52B, and a biconcave negative lens element 53B, in that order from the object side. The biconcave negative lens element 51B and the biconvex positive lens element 52B are cemented to each other.

TABLE 21

SURFACE DATA

| Surf. No. | R | d | N(d) | ν(d) |
|---|---|---|---|---|
| 1 | 81.092 | 9.232 | 1.51633 | 64.14 |
| 2 | 554.790 | 0.150 | | |
| 3 | 122.914 | 2.000 | 1.80440 | 39.58 |
| 4 | 52.621 | 13.576 | 1.49700 | 81.55 |
| 5 | 931.131 | d5 | | |
| 6 | -637.805 | 2.000 | 1.76200 | 40.10 |
| 7 | 94.934 | 5.356 | 1.84666 | 23.78 |
| 8 | -944.748 | 4.713 | | |
| 9 | -129.931 | 2.000 | 1.71736 | 29.52 |
| 10 | -933.933 | d10 | | |
| 11 | 77.506 | 6.200 | 1.77250 | 49.60 |
| 12 | -768.348 | 5.060 | | |
| 13 | 519.703 | 2.200 | 1.72047 | 34.71 |
| 14 | 48.529 | 1.482 | | |
| 15 | 41.922 | 5.000 | 1.48749 | 70.24 |
| 16 | 74.460 | 7.740 | | |
| 17 (Diaphragm) | ∞ | 2.375 | | |
| 18 | 137.306 | 4.820 | 1.71736 | 29.52 |
| 19 | -69.450 | 1.440 | 1.65844 | 50.88 |
| 20 | 46.122 | d20 | | |
| 21 | 7259.316 | 3.380 | 1.65412 | 39.68 |
| 22 | -120.548 | 3.890 | | |
| 23 | -33.907 | 4.030 | 1.72342 | 37.96 |
| 24 | 99.779 | 2.250 | | |
| 25 | 183.180 | 5.880 | 1.59522 | 67.73 |
| 26 | -44.994 | 0.450 | | |
| 27 | 95.346 | 8.154 | 1.48749 | 70.24 |
| 28 | -51.532 | d28 | | |
| 29 | -81.811 | 1.200 | 1.80440 | 39.58 |
| 30 | 52.281 | 8.800 | 1.67270 | 32.10 |
| 31 | -50.135 | 1.920 | | |
| 32 | -62.128 | 1.200 | 1.65160 | 58.55 |
| 33 | 501.405 | — | | |
| fn: | -115.857 | | | |
| θgFn: | 0.5729 | | | |

TABLE 22

VARIOUS DATA WHEN FOCUSED ON OBJECT AT INFINITY
(Photographing Magnification = 0)
Zoom Ratio: 2.00

|     | Short Focal Length Extremity | Intermediate Focal Length | Long Focal Length Extremity |
|-----|---|---|---|
| FNO. | 4.00 | 4.78 | 5.85 |
| f | 199.850 | 300.509 | 399.850 |
| W | 6.2 | 4.1 | 3.1 |
| Y | 21.64 | 21.64 | 21.64 |
| fB | 37.600 | 64.084 | 95.259 |
| L | 230.000 | 268.818 | 297.352 |
| d5 | 7.167 | 29.997 | 36.596 |
| d10 | 2.848 | 2.787 | 3.860 |
| d20 | 18.370 | 36.866 | 43.957 |
| d28 | 47.517 | 18.586 | 1.181 |

TABLE 23

LENS GROUP DATA

| Lens Group | 1$^{st}$ Surf. | Focal Length |
|---|---|---|
| 1 | 1 | 173.972 |
| 2(Subsequent/n) | 6 | −240.999 |
| 3(Subsequent) | 11 | −371.001 |
| 4(Subsequent) | 21 | 81.393 |
| 5(Subsequent) | 29 | −94.481 |

TABLE 24

VARIOUS DATA WHEN FOCUSED ON
OBJECT AT FINITE DISTANCE

| Object-to-Image Dist. | 9000.0 | 9000.0 | 9000.0 |
|---|---|---|---|
| Magnification | −0.023 | −0.033 | −0.044 |
| d5 | 7.167 | 29.997 | 36.596 |
| d10 | 2.848 | 2.787 | 3.860 |
| d20 | 16.235 | 33.099 | 38.816 |
| d28 | 49.652 | 22.353 | 6.322 |
| fB | 37.600 | 64.084 | 95.259 |
| Object-to-Image Dist. | 5000.0 | 5000.0 | 5000.0 |
| Magnification | −0.042 | −0.060 | −0.079 |
| d5 | 7.167 | 29.997 | 36.596 |
| d10 | 2.848 | 2.787 | 3.860 |
| d20 | 14.467 | 30.160 | 35.008 |
| d28 | 51.420 | 25.291 | 10.130 |
| fB | 37.600 | 64.084 | 95.259 |

[Embodiment 7]

Figure 31:
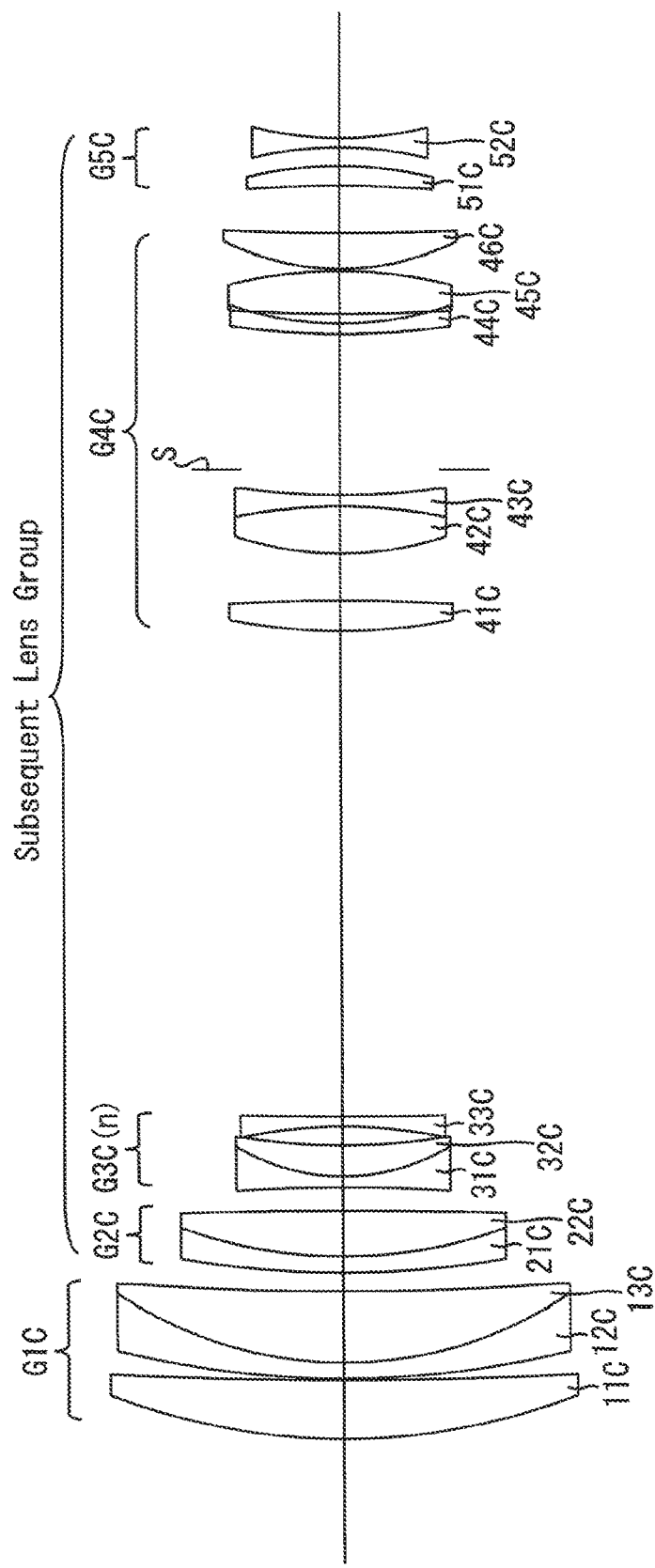
FIG. 31 shows a lens arrangement of a seventh numerical embodiment of a zoom lens system, according to the present invention, at the short focal length extremity when focused on an object at infinity.

FIGS. 31 through 35D and Tables 25 through 28 disclose a seventh numerical embodiment of the zoom lens system according to the present invention. FIG. 31 shows a lens arrangement of the zoom lens system at the short focal length extremity when focused on an object at infinity. FIGS. 32A, 32B, 32C and 32D show various aberrations that occurred in the zoom lens system of FIG. 31, at the short focal length extremity when focused on an object at infinity. FIGS. 33A, 33B, 33C and 33D show lateral aberrations that occurred in the zoom lens system of FIG. 31, at the short focal length extremity when focused on an object at infinity. FIGS. 34A, 34B, 34C and 34D show various aberrations that occurred in the zoom lens system of FIG. 31, at the long focal length extremity when focused on an object at infinity. FIGS. 35A, 35B, 35C and 35D show lateral aberrations that occurred in the zoom lens system of FIG. 31, at the long focal length extremity when focused on an object at infinity. Table 25 indicates the surface data. Table 26 indicates various lens system data when the zoom lens system is focused on an object at infinity (photographing magnification=0). Table 27 indicates lens-group data. Table 28 indicates various lens system data when the zoom lens system is focused on an object at a finite distance.

The zoom lens system of the present seventh numerical embodiment is configured of a positive first lens group G1C, a positive second lens group (subsequent rear lens group) G2C, a negative third lens group (subsequent rear lens group/n$^{th}$ lens group) G3C, a positive fourth lens group (subsequent rear lens group) G4C, and a negative fifth lens group (subsequent rear lens group) G5C, in that order from the object side. A diaphragm S is provided within the fourth lens group G4C and moves integrally with the fourth lens group G4C during zooming.

The first lens group G1C is configured of a positive meniscus lens element 11C having a convex surface on the object side, a negative meniscus lens element 12C having a convex surface on the object side, and a positive meniscus lens element 13C having a convex surface on the object side, in that order from the object side. The negative meniscus lens element 12C and the positive meniscus lens element 13C are cemented to each other.

The second lens group G2C is configured of a negative meniscus lens element 21C having a convex surface on the object side, and a biconvex positive lens element 22C, in that order from the object side. The negative meniscus lens element 21C and the biconvex positive lens element 22C are cemented to each other.

The third lens group G3C is configured of a biconcave negative lens element 31C, a positive meniscus lens element 32C having a convex surface on the object side, and a biconcave negative lens element 33C, in that order from the object side. The biconcave negative lens element 31C and the positive meniscus lens element 32C are cemented to each other. The fourth lens group G4C is configured of a biconvex positive lens element 41C, a biconvex positive lens element 42C, a biconcave negative lens element 43C, a diaphragm S, a negative meniscus lens element 44C having a convex surface on the object side, a biconvex positive lens element 45C, and a positive meniscus lens element 46C having a convex surface on the object side, in that order from the object side. The biconvex positive lens element 42C and the biconcave negative lens element 43C are cemented to each other.

The fifth lens group G5C is configured of a positive meniscus lens element 51C having a convex surface on the image side, and a biconcave negative lens element 52C, in that order from the object side.

TABLE 25

SURFACE DATA

| Surf. No. | R | d | N(d) | ν(d) |
|---|---|---|---|---|
| 1 | 69.128 | 6.401 | 1.51633 | 64.14 |
| 2 | 525.186 | 0.150 | | |
| 3 | 100.847 | 1.700 | 1.79952 | 42.22 |
| 4 | 43.884 | 7.527 | 1.48749 | 70.24 |
| 5 | 321.688 | d5 | | |
| 6 | 107.759 | 1.700 | 1.74400 | 44.79 |
| 7 | 51.867 | 4.850 | 1.48749 | 70.24 |
| 8 | −615.486 | d8 | | |
| 9 | −175.204 | 1.200 | 1.77250 | 49.60 |
| 10 | 22.413 | 3.290 | 1.84666 | 23.78 |
| 11 | 64.808 | 2.000 | | |
| 12 | −52.204 | 1.100 | 1.77250 | 49.60 |
| 13 | 552.401 | d13 | | |
| 14 | 62.895 | 3.220 | 1.77250 | 49.60 |
| 15 | −218.483 | 5.000 | | |

TABLE 25-continued

SURFACE DATA

| Surf. No. | R | d | N(d) | ν(d) |
|---|---|---|---|---|
| 16 | 36.531 | 4.920 | 1.49700 | 81.55 |
| 17 | −57.196 | 1.200 | 1.85026 | 32.27 |
| 18 | 82.066 | 2.700 | | |
| 19 (Diaphragm) | ∞ | 14.387 | | |
| 20 | 84.372 | 1.100 | 1.83400 | 37.34 |
| 21 | 37.252 | 1.020 | | |
| 22 | 195.080 | 4.540 | 1.59522 | 67.73 |
| 23 | −49.305 | 0.200 | | |
| 24 | 28.817 | 3.730 | 1.61800 | 63.33 |
| 25 | 294.452 | d25 | | |
| 26 | −132.364 | 2.110 | 1.78472 | 25.68 |
| 27 | −43.004 | 1.970 | | |
| 28 | −40.156 | 1.000 | 1.69680 | 55.53 |
| 29 | 39.612 | — | | |
| fn: | −98.480 | | | |
| θgFn: | 0.5672 | | | |

TABLE 26

VARIOUS DATA WHEN FOCUSED ON OBJECT AT INFINITY
(Photographing Magnification = 0)
Zoom Ratio: 5.30

| | Short Focal Length Extremity | Intermediate Focal Length | Long Focal Length Extremity |
|---|---|---|---|
| FNO. | 4.00 | 4.86 | 5.85 |
| f | 54.95 | 139.85 | 291.09 |
| W | 15.1 | 5.7 | 2.8 |
| Y | 14.24 | 14.24 | 14.24 |
| fB | 52.820 | 67.339 | 89.121 |
| L | 190.757 | 215.212 | 239.996 |
| d5 | 2.000 | 26.455 | 51.240 |
| d8 | 2.452 | 15.849 | 15.519 |
| d13 | 51.451 | 22.194 | 3.000 |
| d25 | 5.020 | 6.361 | 4.102 |

TABLE 27

LENS GROUP DATA

| Lens Group | 1st Surf. | Focal Length |
|---|---|---|
| 1 | 1 | 166.266 |
| 2(Subsequent/n) | 6 | 360.538 |
| 3(Subsequent) | 9 | −32.278 |
| 4(Subsequent) | 14 | 39.406 |
| 5(Subsequent) | 26 | −45.597 |

TABLE 28

VARIOUS DATA WHEN FOCUSED ON
OBJECT AT FINITE DISTANCE

| Object-to-Image Dist. | 5000.0 | 5000.0 | 5000.0 |
|---|---|---|---|
| Magnification | −0.011 | −0.028 | −0.058 |
| d5 | 2.000 | 26.455 | 51.240 |
| d8 | 2.452 | 15.849 | 15.519 |
| d13 | 51.451 | 22.194 | 3.000 |
| d25 | 5.192 | 7.147 | 6.361 |
| fB | 52.648 | 66.553 | 86.862 |
| Object-to-Image Dist. | 2000.0 | 2000.0 | 2000.0 |
| Magnification | −0.029 | −0.071 | −0.145 |
| d5 | 2.000 | 26.455 | 51.240 |
| d8 | 2.452 | 15.849 | 15.519 |
| d13 | 51.451 | 22.194 | 3.000 |
| d25 | 5.469 | 8.377 | 9.915 |
| fB | 52.371 | 65.323 | 83.308 |

[Embodiment 8]

Figure 36:
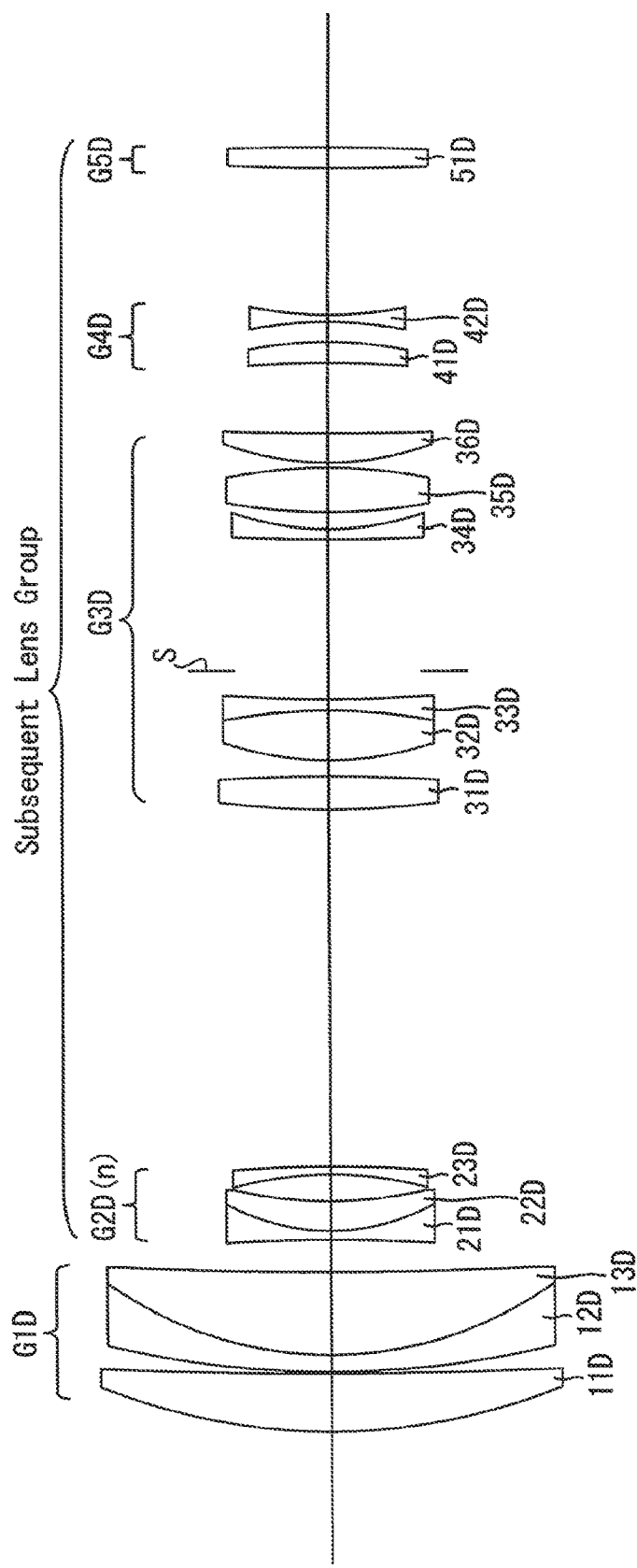
FIG. 36 shows a lens arrangement of an eighth numerical embodiment of a zoom lens system, according to the present invention, at the short focal length extremity when focused on an object at infinity.
Figures 39A, 39B, 39C, 39D:
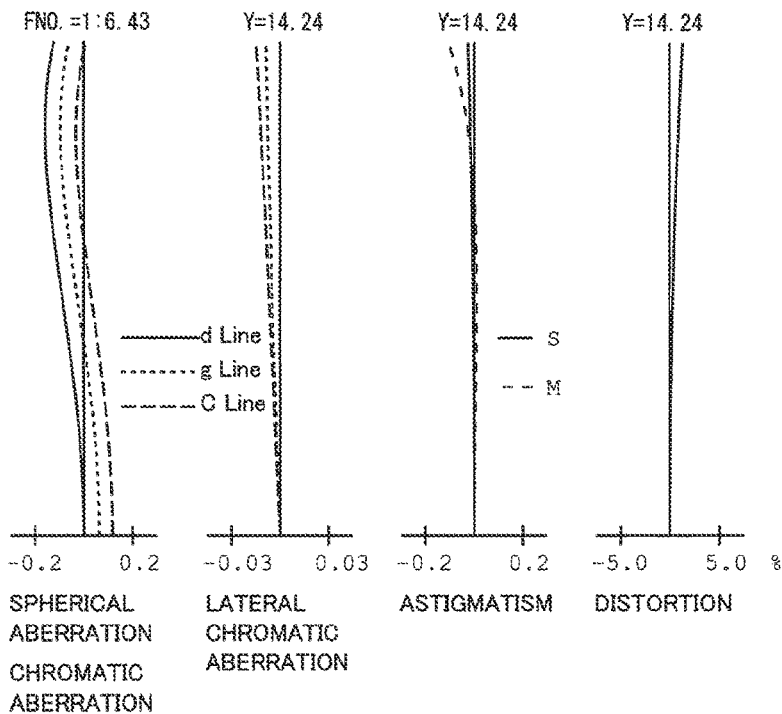
FIGS. 39A, 39B, 39C and 39D show various aberrations that occurred in the zoom lens system of FIG. 36, at the long focal length extremity when focused on an object at infinity.
Figure 40A:
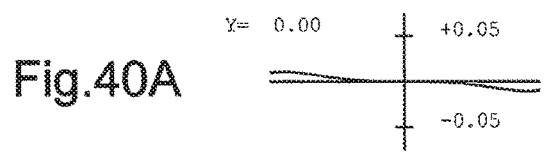
FIGS. 40A, 40B, 40C and 40D show lateral aberrations that occurred in the zoom lens system of FIG. 36, at the long focal length extremity when focused on an object at infinity.
Figure 40B:
Figure 40C:
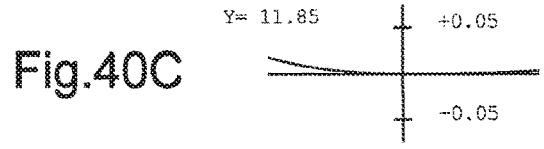
Figure 40D:
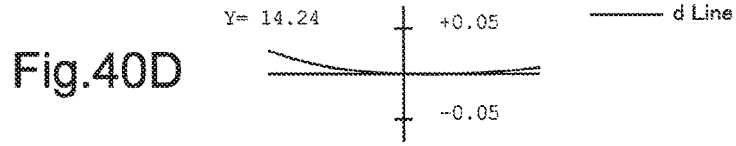

FIGS. 36 through 40D and Tables 29 through 32 disclose an eighth numerical embodiment of the zoom lens system according to the present invention. FIG. 36 shows a lens arrangement of the zoom lens system at the short focal length extremity when focused on an object at infinity. FIGS. 37A, 37B, 37C and 37D show various aberrations that occurred in the zoom lens system of FIG. 36, at the short focal length extremity when focused on an object at infinity. FIGS. 38A, 38B, 38C and 38D show lateral aberrations that occurred in the zoom lens system of FIG. 36, at the short focal length extremity when focused on an object at infinity. FIGS. 39A, 39B, 39C and 39D show various aberrations that occurred in the zoom lens system of FIG. 36, at the long focal length extremity when focused on an object at infinity. FIGS. 40A, 40B, 40C and 40D show lateral aberrations that occurred in the zoom lens system of FIG. 36, at the long focal length extremity when focused on an object at infinity. Table 29 indicates the surface data. Table 30 indicates various lens system data when the zoom lens system is focused on an object at infinity (photographing magnification=0). Table 31 indicates lens-group data. Table 32 indicates various lens system data when the zoom lens system is focused on an object at a finite distance.

The zoom lens system of the present eighth numerical embodiment is configured of a positive first lens group G1D, a negative second lens group (subsequent rear lens group/$n^{th}$ lens group) G2D, a positive third lens group (subsequent rear lens group) G3D, a negative fourth lens group (subsequent rear lens group) G4D, and a positive fifth lens group (subsequent rear lens group) G5D, in that order from the object side. A diaphragm S is provided within the third lens group G3D and moves integrally with the third lens group G3D during zooming.

The first lens group G1D is configured of a positive meniscus lens element 11D having a convex surface on the object side, a negative meniscus lens element 12D having a convex surface on the object side, and a positive meniscus lens element 13D having a convex surface on the object side, in that order from the object side. The negative meniscus lens element 12D and the positive meniscus lens element 13D are cemented to each other.

The second lens group G2D is configured of a biconcave negative lens element 21D, a positive meniscus lens element 22D having a convex surface on the object side, and a negative meniscus lens element 23D having a convex surface on the image side, in that order from the object side. The biconcave negative lens element 21D and the positive meniscus lens element 22D are cemented to each other.

The third lens group G3D is configured of a biconvex positive lens element 31D, a biconvex positive lens element 32D, a biconcave negative lens element 33D, a diaphragm S, a negative meniscus lens element 34D having a convex surface on the object side, a biconvex positive lens element 35D, and a positive meniscus lens element 36D having a convex surface on the object side, in that order from the object side. The biconvex positive lens element 32D and the biconcave negative lens element 33D are cemented to each other.

The fourth lens group G4D is configured of a positive meniscus lens element 41D having a convex surface on the image side, and a biconcave negative lens element 42D, in that order from the object side.

The fifth lens group G5D is configured of a biconvex positive lens element 51D.

TABLE 29

SURFACE DATA

| Surf. No. | R | d | N(d) | ν(d) |
|---|---|---|---|---|
| 1 | 61.765 | 5.940 | 1.51633 | 64.14 |
| 2 | 588.992 | 0.150 | | |
| 3 | 97.196 | 1.700 | 1.79952 | 42.22 |
| 4 | 39.169 | 8.210 | 1.48749 | 70.24 |
| 5 | 451.941 | d5 | | |
| 6 | −172.825 | 0.900 | 1.72916 | 54.68 |
| 7 | 22.024 | 2.960 | 1.84666 | 23.78 |
| 8 | 44.314 | 2.630 | | |
| 9 | −38.158 | 0.800 | 1.69680 | 55.53 |
| 10 | −136.863 | d10 | | |
| 11 | 85.555 | 3.220 | 1.72916 | 54.68 |
| 12 | −188.580 | 1.640 | | |
| 13 | 34.217 | 4.920 | 1.59522 | 67.73 |
| 14 | −56.730 | 1.100 | 1.80610 | 33.27 |
| 15 | 136.465 | 2.851 | | |
| 16 (Diaphragm) | ∞ | 13.105 | | |
| 17 | 220.885 | 1.000 | 1.83400 | 37.34 |
| 18 | 30.589 | 1.664 | | |
| 19 | 60.865 | 4.392 | 1.49700 | 81.55 |
| 20 | −53.647 | 0.510 | | |
| 21 | 30.636 | 2.920 | 1.69680 | 55.53 |
| 22 | 377.447 | d22 | | |
| 23 | −121.045 | 2.109 | 1.76182 | 26.52 |
| 24 | −42.590 | 2.000 | | |
| 25 | −41.378 | 0.700 | 1.69680 | 55.53 |
| 26 | 41.151 | d26 | | |
| 27 | 236.669 | 2.055 | 1.54072 | 47.23 |
| 28 | −380.932 | — | | |
| fn: | −83.143 | | | |
| θgFn: | 0.5672 | | | |

TABLE 30

VARIOUS DATA WHEN FOCUSED ON OBJECT AT INFINITY
(Photographing Magnification = 0)
Zoom Ratio: 5.20

| | Short Focal Length Extremity | Intermediate Focal Length | Long Focal Length Extremity |
|---|---|---|---|
| FNO. | 4.60 | 5.19 | 6.43 |
| f | 55.959 | 135.025 | 291.146 |
| W | 14.8 | 6.0 | 2.8 |
| Y | 14.24 | 14.24 | 14.24 |
| fB | 37.602 | 47.087 | 73.429 |
| L | 165.236 | 195.005 | 234.550 |
| d5 | 3.201 | 45.662 | 69.666 |
| d10 | 35.478 | 13.300 | 2.500 |
| d22 | 6.994 | 11.211 | 2.171 |
| d26 | 14.486 | 10.269 | 19.309 |

TABLE 31

LENS GROUP DATA

| Lens Group | 1st Surf. | Focal Length |
|---|---|---|
| 1 | 1 | 144.940 |
| 2(Subsequent/n) | 6 | −31.551 |
| 3(Subsequent) | 11 | 37.495 |
| 4(Subsequent) | 23 | −46.425 |
| 5(Subsequent) | 27 | 270.281 |

TABLE 32

VARIOUS DATA WHEN FOCUSED ON
OBJECT AT FINITE DISTANCE

| Object-to-Image Dist. | 5000.0 | 5000.0 | 5000.0 |
|---|---|---|---|
| Magnification | −0.011 | −0.027 | −0.059 |

TABLE 32-continued

VARIOUS DATA WHEN FOCUSED ON
OBJECT AT FINITE DISTANCE

| d5 | 3.201 | 45.662 | 69.666 |
|---|---|---|---|
| d10 | 35.478 | 13.300 | 2.500 |
| d22 | 7.203 | 12.286 | 4.899 |
| d26 | 14.277 | 9.194 | 16.581 |
| fB | 37.602 | 47.087 | 73.429 |
| Object-to-Image Dist. | 3000.0 | 3000.0 | 3000.0 |
| Magnification | −0.019 | −0.046 | −0.098 |
| d5 | 3.201 | 45.662 | 69.666 |
| d10 | 35.478 | 13.300 | 2.500 |
| d22 | 7.349 | 13.027 | 6.791 |
| d26 | 14.131 | 8.453 | 14.689 |
| fB | 37.602 | 47.087 | 73.429 |

[Embodiment 9]

Figure 41:
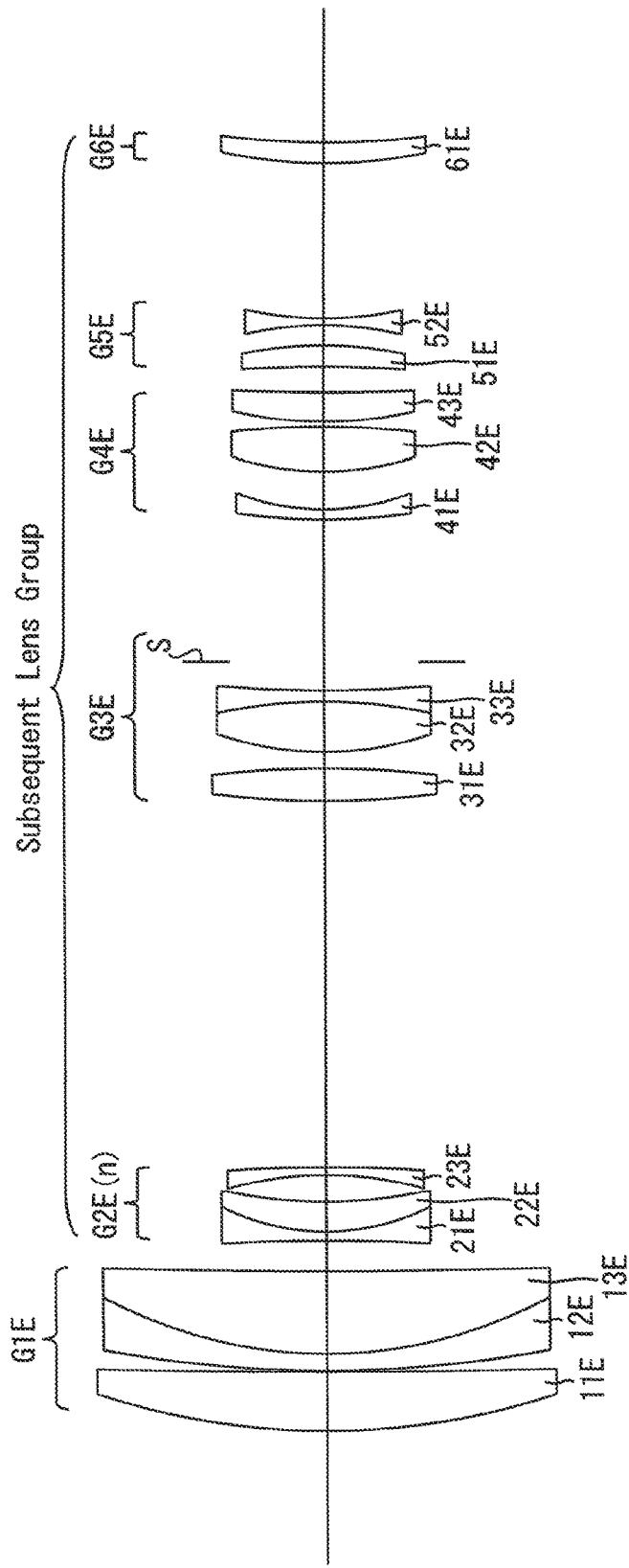
FIG. 41 shows a lens arrangement of a ninth numerical embodiment of a zoom lens system, according to the present invention, at the short focal length extremity when focused on an object at infinity.

FIGS. 41 through 45D and Tables 33 through 36 disclose a ninth numerical embodiment of the zoom lens system according to the present invention. FIG. 41 shows a lens arrangement of the zoom lens system at the short focal length extremity when focused on an object at infinity. FIGS. 42A, 42B, 42C and 42D show various aberrations that occurred in the zoom lens system of FIG. 41, at the short focal length extremity when focused on an object at infinity. FIGS. 43A, 43B, 43C and 43D show lateral aberrations that occurred in the zoom lens system of FIG. 41, at the short focal length extremity when focused on an object at infinity. FIGS. 44A, 44B, 44C and 44D show various aberrations that occurred in the zoom lens system of FIG. 41, at the long focal length extremity when focused on an object at infinity. FIGS. 45A, 45B, 45C and 45D show lateral aberrations that occurred in the zoom lens system of FIG. 41, at the long focal length extremity when focused on an object at infinity. Table 33 indicates the surface data. Table 34 indicates various lens system data when the zoom lens system is focused on an object at infinity (photographing magnification=0). Table 35 indicates lens-group data. Table 36 indicates various lens system data when the zoom lens system is focused on an object at a finite distance.

The zoom lens system of the present ninth numerical embodiment is configured of a positive first lens group G1E, a negative second lens group (subsequent rear lens group/$n^{th}$ lens group) G2E, a positive third lens group (subsequent rear lens group) G3E, a positive fourth lens group (subsequent rear lens group) G4E, a negative fifth lens group (subsequent rear lens group) G5E, and a positive sixth lens group (subsequent rear lens group) G6E, in that order from the object side. A diaphragm S is provided within the third lens group G3E and moves integrally with the third lens group G3E during zooming.

The first lens group G1E is configured of a positive meniscus lens element 11E having a convex surface on the object side, a negative meniscus lens element 12E having a convex surface on the object side, and a positive meniscus lens element 13E having a convex surface on the object side, in that order from the object side. The negative meniscus lens element 12E and the positive meniscus lens element 13E are cemented to each other.

The second lens group G2E is configured of a biconcave negative lens element 21E, a positive meniscus lens element 22E having a convex surface on the object side, and a negative meniscus lens element 23E having a convex surface on the image side, in that order from the object side. The biconcave negative lens element 21E and the positive meniscus lens element 22E are cemented to each other.

The third lens group G3E is configured of a biconvex positive lens element 31E, a biconvex positive lens element 32E, and a biconcave negative lens element 33E, in that order from the object side. The biconvex positive lens element 32E and the biconcave negative lens element 33E are cemented to each other.

The fourth lens group G4E is configured of a negative meniscus lens element 41E having a convex surface on the object side, a biconvex positive lens element 42E, and a positive meniscus lens element 43E having a convex surface on the object side, in that order from the object side.

The fifth lens group G5E is configured of a positive meniscus lens element 51E having a convex surface on the image side, and a biconcave negative lens element 52E.

The sixth lens group G6E is configured of a positive meniscus single lens element 61E having a convex surface on the object side.

TABLE 33

SURFACE DATA

| Surf. No. | R | d | N(d) | ν(d) |
|---|---|---|---|---|
| 1 | 74.014 | 5.940 | 1.48749 | 70.24 |
| 2 | 915.456 | 0.150 | | |
| 3 | 121.231 | 1.700 | 1.78590 | 44.20 |
| 4 | 47.604 | 8.210 | 1.48749 | 70.24 |
| 5 | 748.965 | d5 | | |
| 6 | −190.634 | 0.900 | 1.74100 | 52.64 |
| 7 | 23.710 | 2.960 | 1.84666 | 23.78 |
| 8 | 47.887 | 2.630 | | |
| 9 | −37.671 | 0.800 | 1.61800 | 63.33 |
| 10 | −145.430 | d10 | | |
| 11 | 93.946 | 3.220 | 1.72916 | 54.68 |
| 12 | −101.424 | 1.640 | | |
| 13 | 33.772 | 4.920 | 1.59522 | 67.73 |
| 14 | −51.804 | 1.100 | 1.80610 | 33.27 |
| 15 | 119.681 | 2.851 | | |
| 16(Diaphragm) | ∞ | d16 | | |
| 17 | 63.455 | 1.000 | 1.83400 | 37.34 |
| 18 | 24.801 | 3.719 | | |
| 19 | 30.359 | 4.392 | 1.49700 | 81.55 |
| 20 | −87.115 | 0.510 | | |
| 21 | 42.618 | 2.920 | 1.69680 | 55.53 |
| 22 | 226.723 | d22 | | |
| 23 | −126.233 | 2.109 | 1.76182 | 26.52 |
| 24 | −40.199 | 2.000 | | |
| 25 | −36.365 | 0.700 | 1.69680 | 55.53 |
| 26 | 37.591 | d26 | | |
| 27 | 51.840 | 2.055 | 1.51742 | 52.43 |
| 28 | 87.690 | — | | |
| fn: | −100.761 | | | |
| θgFn: | 0.5631 | | | |

TABLE 34

VARIOUS DATA WHEN FOCUSED ON OBJECT AT INFINITY
(Photographing Magnification = 0)
Zoom Ratio: 5.21

| | Short Focal Length Extremity | Intermediate Focal Length | Long Focal Length Extremity |
|---|---|---|---|
| FNO. | 4.60 | 5.60 | 6.48 |
| f | 56.000 | 123.120 | 291.999 |
| W | 14.8 | 6.6 | 2.8 |
| Y | 14.24 | 14.24 | 14.24 |
| fB | 37.600 | 56.366 | 70.026 |
| L | 165.367 | 209.909 | 248.397 |
| d5 | 3.000 | 47.542 | 86.031 |
| d10 | 36.367 | 19.174 | 2.500 |
| d16 | 14.122 | 12.549 | 15.563 |
| d22 | 2.544 | 3.685 | 1.913 |
| d26 | 15.309 | 14.168 | 15.940 |

TABLE 35

LENS GROUP DATA

| Lens Group | 1st Surf. | Focal Length |
|---|---|---|
| 1 | 1 | 173.992 |
| 2(Subsequent/n) | 6 | −33.596 |
| 3(Subsequent) | 11 | 44.294 |
| 4(Subsequent) | 17 | 56.311 |
| 5(Subsequent) | 23 | −41.708 |
| 6(Subsequent) | 27 | 240.371 |

TABLE 36

VARIOUS DATA WHEN FOCUSED ON OBJECT AT FINITE DISTANCE

| Object-to-Image Dist. | 5000.0 | 5000.0 | 5000.0 |
|---|---|---|---|
| Magnification | −0.011 | −0.025 | −0.058 |
| d5 | 3.000 | 47.542 | 86.031 |
| d10 | 36.367 | 19.174 | 2.500 |
| d16 | 14.122 | 12.549 | 15.563 |
| d22 | 2.725 | 4.286 | 4.509 |
| d26 | 15.128 | 13.567 | 13.344 |
| fB | 37.600 | 56.366 | 70.026 |
| Object-to-Image Dist. | 3000.0 | 3000.0 | 3000.0 |
| Magnification | −0.019 | −0.042 | −0.097 |
| d5 | 3.000 | 47.542 | 86.031 |
| d10 | 36.367 | 19.174 | 2.500 |
| d16 | 14.122 | 12.549 | 15.563 |
| d22 | 2.850 | 4.701 | 6.283 |
| d26 | 5.003 | 13.152 | 11.570 |
| fB | 37.600 | 56.366 | 70.026 |

[Embodiment 10]

Figure 46:
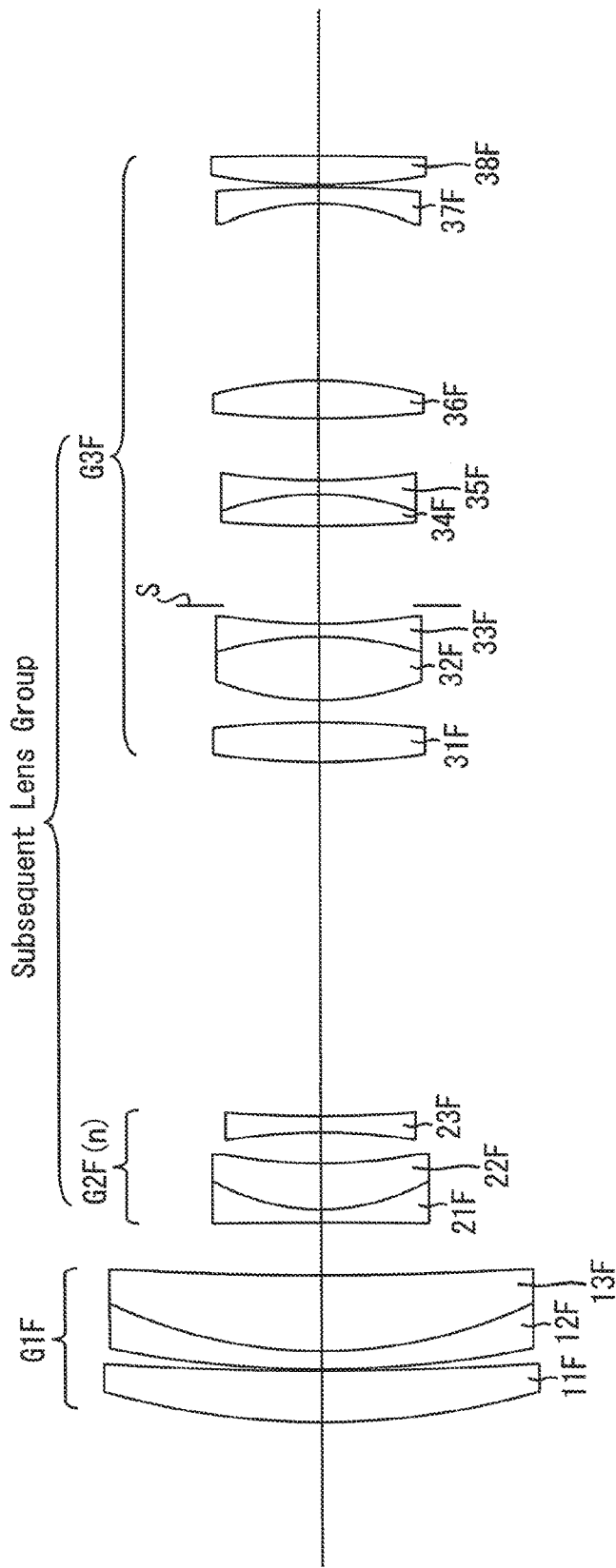
FIG. 46 shows a lens arrangement of a tenth numerical embodiment of a zoom lens system, according to the present invention, at the short focal length extremity when focused on an object at infinity.

FIGS. 46 through 50D and Tables 37 through 40 disclose a tenth numerical embodiment of the zoom lens system according to the present invention. FIG. 46 shows a lens arrangement of the zoom lens system at the short focal length extremity when focused on an object at infinity. FIGS. 47A, 47B, 47C and 47D show various aberrations that occurred in the zoom lens system of FIG. 46, at the short focal length extremity when focused on an object at infinity. FIGS. 48A, 48B, 48C and 48D show lateral aberrations that occurred in the zoom lens system of FIG. 46, at the short focal length extremity when focused on an object at infinity. FIGS. 49A, 49B, 49C and 49D show various aberrations that occurred in the zoom lens system of FIG. 46, at the long focal length extremity when focused on an object at infinity. FIGS. 50A, 50B, 50C and 50D show lateral aberrations that occurred in the zoom lens system of FIG. 46, at the long focal length extremity when focused on an object at infinity. Table 37 indicates the surface data. Table 38 indicates various lens system data when the zoom lens system is focused on an object at infinity (photographing magnification=0). Table 39 indicates lens-group data. Table 40 indicates various lens system data when the zoom lens system is focused on an object at a finite distance.

The zoom lens system of the present tenth numerical embodiment is configured of a positive first lens group G1F, a negative second lens group (subsequent rear lens group/$n^{th}$ lens group) G2F, and a positive third lens group (subsequent rear lens group) G3F, in that order from the object side. A diaphragm S is provided within the third lens group G3F and moves integrally with the third lens group G3F during zooming.

The first lens group G1F is configured of a positive meniscus lens element 11F having a convex surface on the object side, a negative meniscus lens element 12F having a convex surface on the object side, and a positive meniscus lens element 13F having a convex surface on the object side, in that order from the object side. The negative meniscus lens element 12F and the positive meniscus lens element 13F are cemented to each other.

The second lens group G2F is configured of a biconcave negative lens element 21F, a positive meniscus lens element 22F having a convex surface on the object side, and a biconcave negative lens element 23F, in that order from the object side. The biconcave negative lens element 21F and the positive meniscus lens element 22F are cemented to each other.

The third lens group G3F is configured of a biconvex positive lens element 31F, a biconvex positive lens element 32F, a biconcave negative lens element 33F, a diaphragm S, a biconvex positive lens element 34F, a biconcave negative lens element 35F, a biconvex positive lens element 36F, a negative meniscus lens element 37F having a convex surface on the image side, and a biconvex positive lens element 38F, in that order from the object side. The biconvex positive lens element 32F and the biconcave negative lens element 33F are cemented to each other. The biconvex positive lens element 34F and the biconcave negative lens element 35F are cemented to each other.

TABLE 37

SURFACE DATA

| Surf. No. | R | d | N(d) | ν(d) |
|---|---|---|---|---|
| 1 | 73.372 | 4.737 | 1.64000 | 60.08 |
| 2 | 308.552 | 0.150 | | |
| 3 | 98.116 | 1.700 | 1.83400 | 37.16 |
| 4 | 45.864 | 6.874 | 1.48749 | 70.24 |
| 5 | 320.457 | d5 | | |
| 6 | −543.000 | 1.200 | 1.69680 | 55.53 |
| 7 | 20.527 | 4.200 | 1.84666 | 23.78 |
| 8 | 50.126 | 2.806 | | |
| 9 | −56.691 | 1.500 | 1.83481 | 42.72 |
| 10 | 113.676 | d10 | | |
| 11 | 66.417 | 3.581 | 1.77250 | 49.60 |
| 12 | −89.590 | 2.000 | | |
| 13 | 26.536 | 5.796 | 1.49700 | 81.55 |
| 14 | −33.059 | 1.200 | 1.85026 | 32.27 |
| 15 | 55.548 | 1.675 | | |
| 16(Diaphragm) | ∞ | 7.268 | | |
| 17 | 125.175 | 2.873 | 1.62299 | 58.17 |
| 18 | −26.979 | 1.200 | 1.66680 | 33.05 |
| 19 | 61.108 | 5.654 | | |
| 20 | 97.439 | 3.450 | 1.80518 | 25.43 |
| 21 | −37.663 | 16.060 | | |
| 22 | −22.183 | 1.500 | 1.91082 | 35.25 |
| 23 | −96.715 | 0.200 | | |
| 24 | 58.834 | 2.633 | 1.69680 | 55.53 |
| 25 | −310.598 | — | | |
| fn: | −104.813 | | | |
| θgFn: | 0.5776 | | | |

TABLE 38

VARIOUS DATA WHEN FOCUSED ON OBJECT AT INFINITY
(Photographing Magnification = 0)
Zoom Ratio: 4.70

| | Short Focal Length Extremity | Intermediate Focal Length | Long Focal Length Extremity |
|---|---|---|---|
| FNO. | 4.30 | 5.25 | 6.47 |
| f | 51.601 | 100.118 | 242.760 |
| W | 16.3 | 8.2 | 3.4 |
| Y | 14.24 | 14.24 | 14.24 |
| fB | 42.352 | 58.425 | 78.816 |
| L | 157.671 | 192.600 | 230.307 |
| d5 | 4.800 | 36.184 | 69.535 |
| d10 | 32.263 | 19.735 | 3.700 |

TABLE 39

LENS GROUP DATA

| Lens Group | 1st Surf. | Focal Length |
|---|---|---|
| 1 | 1 | 158.229 |
| 2(Subsequent/n) | 6 | −30.075 |
| 3(Subsequent) | 11 | 38.335 |

TABLE 40

VARIOUS DATA WHEN FOCUSED ON OBJECT AT FINITE DISTANCE

| Object-to-Image Dist. | 5000.0 | 5000.0 | 5000.0 |
|---|---|---|---|
| Magnification | −0.010 | −0.020 | −0.043 |
| d5 | 4.357 | 35.232 | 65.382 |
| d10 | 32.706 | 20.687 | 7.853 |
| fB | 42.352 | 58.425 | 78.816 |
| Object-to-Image Dist. | 2000.0 | 2000.0 | 2000.0 |
| Magnification | −0.027 | −0.049 | −0.096 |
| d5 | 3.677 | 33.872 | 61.529 |
| d10 | 33.386 | 22.047 | 11.706 |
| fB | 42.352 | 58.425 | 78.816 |

[Embodiment 11]

Figure 51:
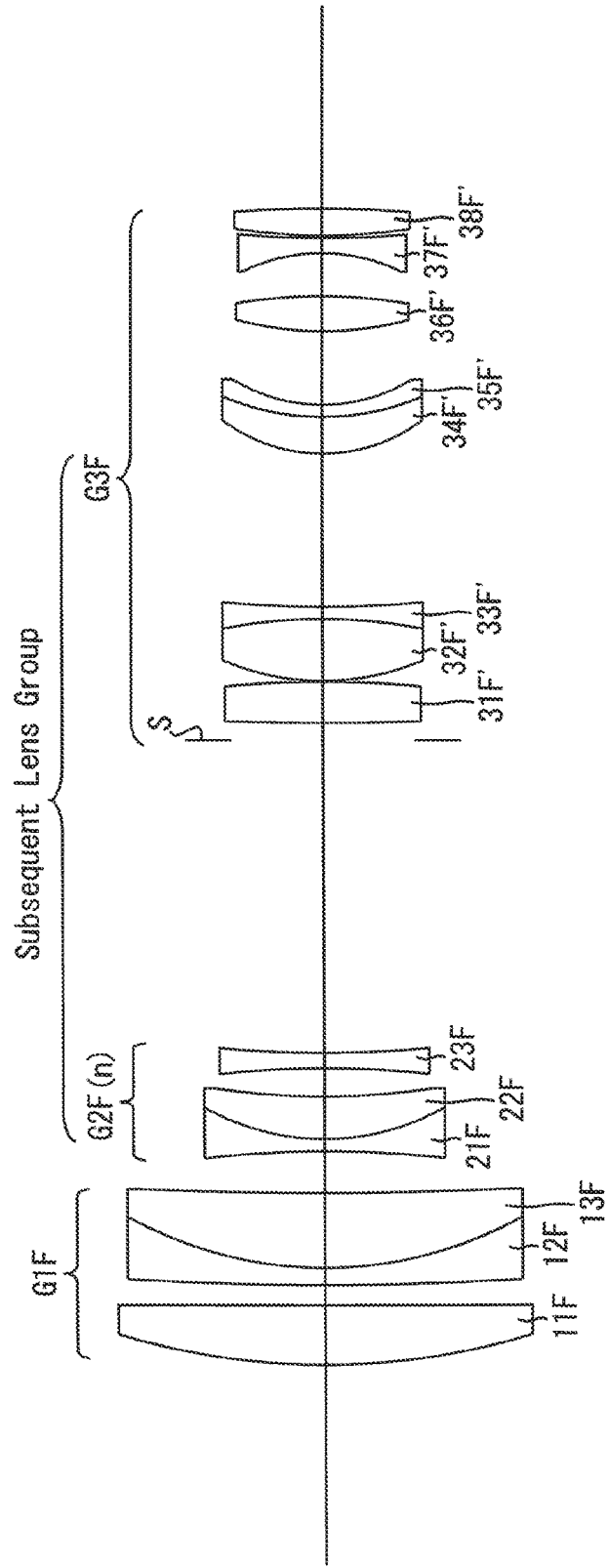
FIG. 51 shows a lens arrangement of an eleventh numerical embodiment of a zoom lens system, according to the present invention, at the short focal length extremity when focused on an object at infinity.
Figures 52A, 52B, 52C, 52D:
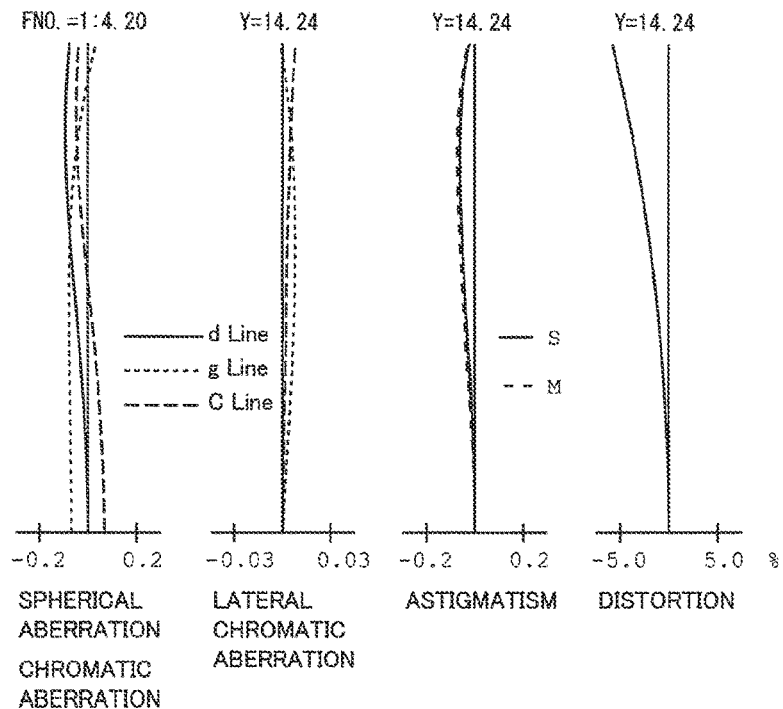
FIGS. 52A, 52B, 52C and 52D show various aberrations that occurred in the zoom lens system of FIG. 51, at the short focal length extremity when focused on an object at infinity.
Figure 53A:
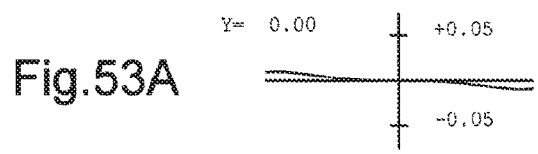
FIGS. 53A, 53B, 53C and 53D show lateral aberrations that occurred in the zoom lens system of FIG. 51, at the short focal length extremity when focused on an object at infinity.
Figure 53B:
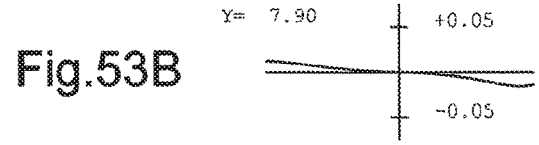
Figure 53C:
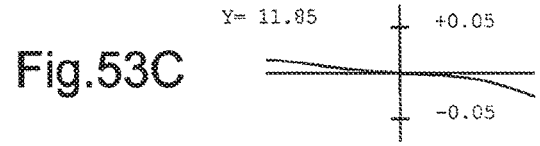
Figure 53D:
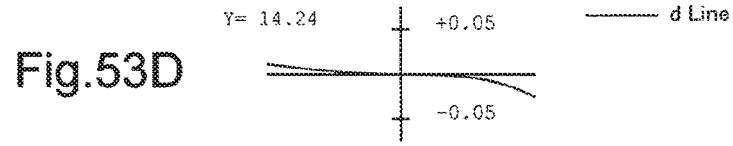

FIGS. 51 through 55D and Tables 41 through 44 disclose an eleventh numerical embodiment of the zoom lens system according to the present invention. FIG. 51 shows a lens arrangement of the zoom lens system at the short focal length extremity when focused on an object at infinity. FIGS. 52A, 52B, 52C and 52D show various aberrations that occurred in the zoom lens system of FIG. 51, at the short focal length extremity when focused on an object at infinity. FIGS. 53A, 53B, 53C and 53D show lateral aberrations that occurred in the zoom lens system of FIG. 51, at the short focal length extremity when focused on an object at infinity. FIGS. 54A, 54B, 54C and 54D show various aberrations that occurred in the zoom lens system of FIG. 51, at the long focal length extremity when focused on an object at infinity. FIGS. 55A, 55B, 55C and 55D show lateral aberrations that occurred in the zoom lens system of FIG. 51, at the long focal length extremity when focused on an object at infinity. Table 41 indicates the surface data. Table 42 indicates various lens system data when the zoom lens system is focused on an object at infinity (photographing magnification=0). Table 43 indicates lens-group data. Table 44 indicates various lens system data when the zoom lens system is focused on an object at a finite distance.

The lens arrangement of the eleventh numerical embodiment is the same as that of the tenth numerical embodiment except for the following aspect:

(1) The third lens group G3F is configured of a diaphragms, a biconvex positive lens element 31F', a biconvex positive lens element 32F', a biconcave negative lens element 33F', a positive meniscus lens element 34F' having a convex surface on the object side, a negative meniscus lens element 35F' having a convex surface on the object side, a biconvex positive lens element 36F', a biconcave negative lens element 37F', and a biconvex positive lens element 38F', in that order from the object side. The biconvex positive lens element 32F' and the biconcave negative lens element 33F' are cemented to each other. The positive meniscus lens element 34F' and the negative meniscus lens element 35F' are cemented to each other.

TABLE 41

SURFACE DATA

| Surf. No. | R | d | N(d) | v(d) |
|---|---|---|---|---|
| 1 | 71.592 | 5.865 | 1.60300 | 65.44 |
| 2 | 7024.156 | 1.966 | | |
| 3 | 312.454 | 1.700 | 1.78800 | 47.37 |
| 4 | 41.001 | 7.378 | 1.60300 | 65.44 |
| 5 | 425.713 | d5 | | |
| 6 | -103.502 | 1.200 | 1.67790 | 55.34 |
| 7 | 24.583 | 4.200 | 1.84666 | 23.78 |
| 8 | 74.776 | 2.806 | | |
| 9 | -90.360 | 1.500 | 1.83400 | 37.16 |
| 10 | 114.204 | d10 | | |
| 11 (Diaphragm) | ∞ | 1.700 | | |
| 12 | 274.288 | 4.056 | 1.73400 | 51.47 |
| 13 | -103.948 | 0.100 | | |
| 14 | 25.754 | 6.106 | 1.49700 | 81.55 |
| 15 | -52.422 | 1.200 | 1.85026 | 32.27 |
| 16 | 109.204 | 15.000 | | |
| 17 | 16.828 | 3.600 | 1.61800 | 63.33 |
| 18 | 25.738 | 1.200 | 1.58313 | 59.37 |
| 19 | 17.186 | 7.296 | | |
| 20 | 33.718 | 3.450 | 1.69680 | 55.53 |
| 21 | -49.965 | 4.207 | | |
| 22 | -18.238 | 1.500 | 1.88300 | 40.76 |
| 23 | 108.501 | 0.200 | | |
| 24 | 54.250 | 2.633 | 1.74000 | 28.30 |
| 25 | -118.278 | — | | |
| fn: | -60.056 | | | |
| θgFn: | 0.5559 | | | |

TABLE 42

VARIOUS DATA WHEN FOCUSED ON OBJECT AT INFINITY
(Photographing Magnification = 0)
Zoom Ratio: 3.79

| | Short Focal Length Extremity | Intermediate Focal Length | Long Focal Length Extremity |
|---|---|---|---|
| FNO. | 4.20 | 5.22 | 5.78 |
| f | 51.400 | 99.844 | 194.569 |
| W | 16.4 | 8.2 | 4.2 |
| Y | 14.24 | 14.24 | 14.24 |
| fB | 41.257 | 59.441 | 69.548 |
| L | 154.882 | 188.869 | 226.352 |
| d5 | 4.123 | 35.391 | 74.884 |
| d10 | 30.639 | 15.174 | 3.057 |

TABLE 43

LENS GROUP DATA

| Lens Group | 1$^{st}$ Surf. | Focal Length |
|---|---|---|
| 1 | 1 | 192.429 |
| 2(Subsequent/n) | 6 | -35.398 |
| 3(Subsequent) | 12 | 38.171 |

TABLE 44

VARIOUS DATA WHEN FOCUSED ON OBJECT AT FINITE DISTANCE

| Object-to-Image Dist. | 5000.0 | 5000.0 | 5000.0 |
|---|---|---|---|
| Magnification | -0.010 | -0.020 | -0.036 |
| d5 | 3.540 | 34.353 | 71.629 |
| d10 | 31.221 | 16.212 | 6.312 |
| fB | 41.257 | 59.441 | 69.548 |
| Object-to-Image Dist. | 2000.0 | 2000.0 | 2000.0 |
| Magnification | -0.026 | -0.049 | -0.082 |
| d5 | 2.653 | 32.853 | 67.988 |

TABLE 44-continued

VARIOUS DATA WHEN FOCUSED ON OBJECT AT FINITE DISTANCE

| d10 | 32.109 | 17.712 | 9.953 |
|---|---|---|---|
| fB | 41.257 | 59.441 | 69.548 |

[Embodiment 12]

Figure 56:
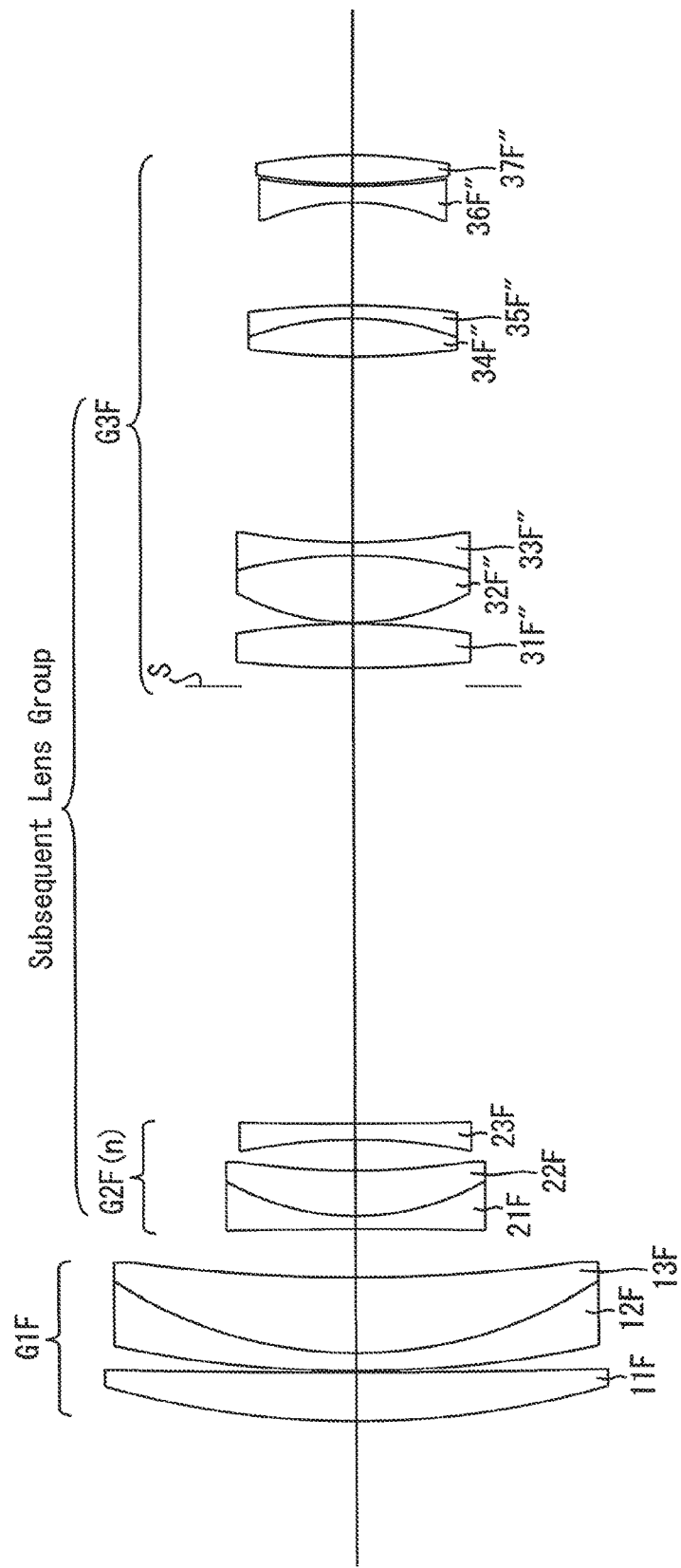
FIG. 56 shows a lens arrangement of a twelfth numerical embodiment of a zoom lens system, according to the present invention, at the short focal length extremity when focused on an object at infinity.

FIGS. 56 through 60D and Tables 45 through 48 disclose a twelfth numerical embodiment of the zoom lens system according to the present invention. FIG. 56 shows a lens arrangement of the zoom lens system at the short focal length extremity when focused on an object at infinity. FIGS. 57A, 57B, 57C and 57D show various aberrations that occurred in the zoom lens system of FIG. 56, at the short focal length extremity when focused on an object at infinity. FIGS. 58A, 58B, 58C and 58D show lateral aberrations that occurred in the zoom lens system of FIG. 56, at the short focal length extremity when focused on an object at infinity. FIGS. 59A, 59B, 59C and 59D show various aberrations that occurred in the zoom lens system of FIG. 56, at the long focal length extremity when focused on an object at infinity. FIGS. 60A, 60B, 60C and 60D show lateral aberrations that occurred in the zoom lens system of FIG. 56, at the long focal length extremity when focused on an object at infinity. Table 45 indicates the surface data. Table 46 indicates various lens system data when the zoom lens system is focused on an object at infinity (photographing magnification=0). Table 47 indicates lens-group data. Table 48 indicates various lens system data when the zoom lens system is focused on an object at a finite distance.

The lens arrangement of the twelfth numerical embodiment is the same as that of the tenth numerical embodiment except for the following aspect:

(1) The third lens group G3F is configured of a diaphragms, a biconvex positive lens element 31F", a biconvex positive lens element 32F", a biconcave negative lens element 33F", a biconvex positive lens element 34F", a negative meniscus lens element 35F" having a convex surface on the image side, a biconcave positive lens element 36F", and a biconvex positive lens element 37F", in that order from the object side. The biconvex positive lens element 32F" and the biconcave negative lens element 33F" are cemented to each other. The biconvex positive lens element 34F" and the negative meniscus lens element 35F" are cemented to each other.

TABLE 45

SURFACE DATA

| Surf. No. | R | d | N(d) | v(d) |
|---|---|---|---|---|
| 1 | 85.329 | 4.529 | 1.77250 | 49.60 |
| 2 | 983.202 | 0.150 | | |
| 3 | 107.046 | 1.700 | 1.72047 | 34.71 |
| 4 | 41.690 | 6.874 | 1.49700 | 81.55 |
| 5 | 156.582 | d5 | | |
| 6 | -541.000 | 1.200 | 1.78800 | 47.37 |
| 7 | 24.160 | 4.200 | 1.84666 | 23.78 |
| 8 | 75.055 | 2.806 | | |
| 9 | -55.520 | 1.500 | 1.81600 | 46.62 |
| 10 | 551.971 | d10 | | |
| 11 (Diaphragm) | ∞ | 1.700 | | |
| 12 | 109.153 | 4.056 | 1.61800 | 63.33 |
| 13 | -64.888 | 0.100 | | |
| 14 | 23.204 | 6.106 | 1.49700 | 81.55 |
| 15 | -44.037 | 1.200 | 1.85026 | 32.27 |
| 16 | 58.912 | 16.952 | | |
| 17 | 75.831 | 3.450 | 1.83400 | 37.16 |

TABLE 45-continued

SURFACE DATA

| Surf. No. | R | d | N(d) | ν(d) |
|---|---|---|---|---|
| 18 | −27.995 | 1.200 | 1.61772 | 49.81 |
| 19 | −71.414 | 9.369 | | |
| 20 | −21.513 | 1.500 | 1.88300 | 40.76 |
| 21 | 59.394 | 0.200 | | |
| 22 | 51.421 | 2.633 | 1.60562 | 43.70 |
| 23 | −50.348 | — | | |
| fn: | −95.821 | | | |
| θgFn: | 0.5834 | | | |

TABLE 46

VARIOUS DATA WHEN FOCUSED ON OBJECT AT INFINITY
(Photographing Magnification = 0)
Zoom Ratio: 4.03

| | Short Focal Length Extremity | Intermediate Focal Length | Long Focal Length Extremity |
|---|---|---|---|
| FNO. | 4.10 | 4.60 | 6.35 |
| f | 55.319 | 99.962 | 222.785 |
| W | 14.9 | 8.1 | 3.6 |
| Y | 14.24 | 14.24 | 14.24 |
| fB | 40.231 | 48.460 | 77.781 |
| L | 156.000 | 177.008 | 199.353 |
| d5 | 4.400 | 32.812 | 48.147 |
| d10 | 39.945 | 24.312 | 2.000 |

TABLE 47

LENS GROUP DATA

| Lens Group | 1st Surf. | Focal Length |
|---|---|---|
| 1 | 1 | 147.222 |
| 2(Subsequent/n) | 6 | −37.110 |
| 3(Subsequent) | 12 | 40.191 |

TABLE 48

VARIOUS DATA WHEN FOCUSED ON OBJECT AT FINITE DISTANCE

| Object-to-Image Dist. | 5000.0 | 5000.0 | 5000.0 |
|---|---|---|---|
| Magnification | −0.011 | −0.019 | −0.039 |
| d5 | 3.488 | 30.426 | 42.368 |
| d10 | 40.857 | 26.697 | 7.780 |
| fB | 40.231 | 48.460 | 77.781 |
| Object-to-Image Dist. | 2000.0 | 2000.0 | 2000.0 |
| Magnification | −0.028 | −0.046 | −0.088 |
| d5 | 2.145 | 27.492 | 37.552 |
| d10 | 42.200 | 29.631 | 12.596 |
| fB | 40.231 | 48.460 | 77.781 |

[Embodiment 13]

Figure 61:
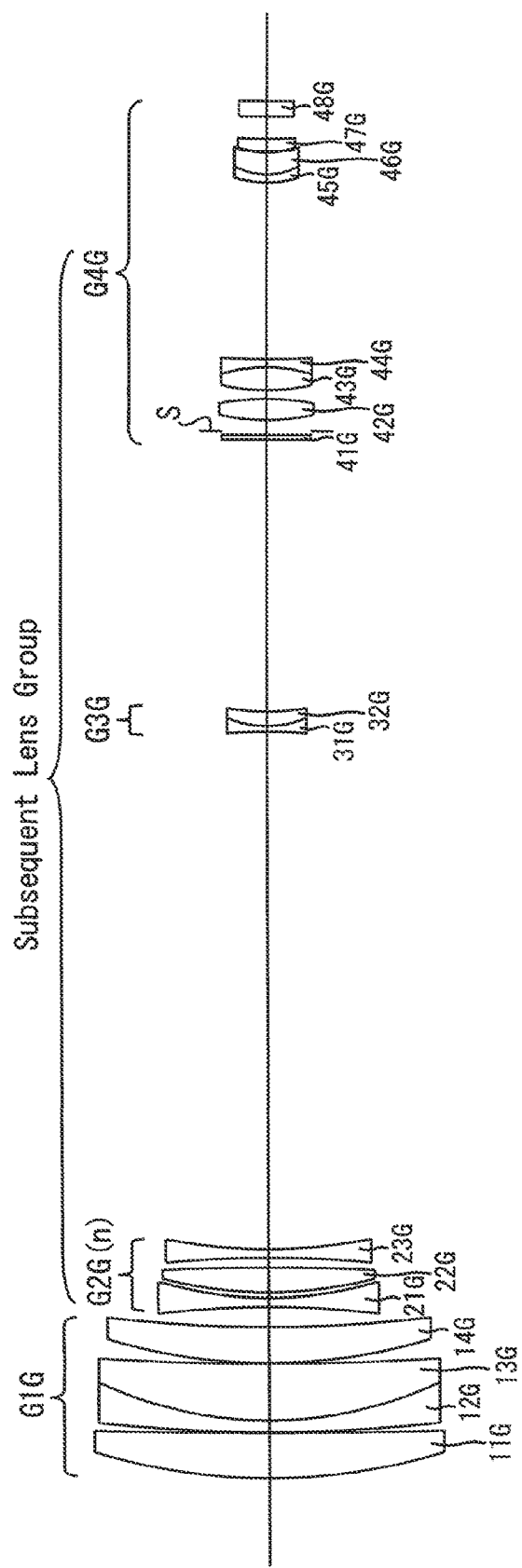
FIG. 61 shows a lens arrangement of a thirteenth numerical embodiment of a zoom lens system, according to the present invention, at the short focal length extremity when focused on an object at infinity.

FIGS. 61 through 65D and Tables 49 through 52 disclose a thirteenth numerical embodiment of the zoom lens system according to the present invention. FIG. 61 shows a lens arrangement of the zoom lens system at the short focal length extremity when focused on an object at infinity. FIGS. 62A, 62B, 62C and 62D show various aberrations that occurred in the zoom lens system of FIG. 61, at the short focal length extremity when focused on an object at infinity. FIGS. 63A, 63B, 63C and 63D show lateral aberrations that occurred in the zoom lens system of FIG. 61, at the short focal length extremity when focused on an object at infinity. FIGS. 64A, 64B, 64C and 64D show various aberrations that occurred in the zoom lens system of FIG. 61, at the long focal length extremity when focused on an object at infinity. FIGS. 65A, 65B, 65C and 65D show lateral aberrations that occurred in the zoom lens system of FIG. 61, at the long focal length extremity when focused on an object at infinity. Table 49 indicates the surface data. Table 50 indicates various lens system data when the zoom lens system is focused on an object at infinity (photographing magnification=0). Table 51 indicates lens-group data. Table 52 indicates various lens system data when the zoom lens system is focused on an object at a finite distance.

The zoom lens system of the present thirteenth numerical embodiment is configured of a positive first lens group G1G, a negative second lens group (subsequent rear lens group/$n^{th}$ lens group) G2G, a negative third lens group (subsequent rear lens group) G3G, and a positive fourth lens group (subsequent rear lens group) G4G, in that order from the object side. A diaphragm S is provided within the fourth lens group G4G and moves integrally with the fourth lens group G4G during zooming.

The first lens group G1G is configured of a positive meniscus lens element 11G having a convex surface on the object side, a negative meniscus lens element 12G having a convex surface on the object side, a positive meniscus lens element 13G having a convex surface on the object side, and a positive meniscus lens element 14G having a convex surface on the object side, in that order from the object side. The negative meniscus lens element 12G and the positive meniscus lens element 13G are cemented to each other.

The second lens group G2G is configured of a biconcave negative lens element 21G, a biconvex positive lens element 22G, and a biconcave negative lens element 23G, in that order from the object side.

The third lens group G3G is configured of a biconcave negative lens element 31G, and a positive meniscus lens element 32G having a convex surface on the object side, in that order from the object side. The biconcave negative lens element 31G and the positive meniscus lens element 32G are cemented to each other.

The fourth lens group G4G is configured of an ND filter 41G, a diaphragm S, a biconvex positive lens element 42G, a biconvex positive lens element 43G, a biconcave negative lens element 44G, a negative meniscus lens element 45G having a convex surface on the object side, a positive meniscus lens element 46G having a convex surface on the object side, a positive meniscus lens element 47G having a convex surface on the object side, and a flat parallel plate 48G, in that order from the object side. The biconvex positive lens element 43G and the biconcave negative lens element 44G are cemented to each other. The negative meniscus lens element 45G and the positive meniscus lens element 46G are cemented to each other.

TABLE 49

SURFACE DATA

| Surf. No. | R | d | N(d) | ν(d) |
|---|---|---|---|---|
| 1 | 138.399 | 10.386 | 1.59522 | 67.73 |
| 2 | 1728.931 | 0.200 | | |
| 3 | 367.501 | 2.650 | 1.78800 | 47.37 |
| 4 | 89.949 | 13.160 | 1.49700 | 81.55 |
| 5 | 627.536 | 0.200 | | |
| 6 | 131.406 | 8.105 | 1.43875 | 94.94 |
| 7 | 327.171 | d7 | | |
| 8 | −214.076 | 2.000 | 1.83481 | 42.72 |
| 9 | 90.051 | 1.231 | | |
| 10 | 100.764 | 5.606 | 1.84666 | 23.78 |

TABLE 49-continued

SURFACE DATA

| Surf. No. | R | d | N(d) | v(d) |
|---|---|---|---|---|
| 11 | −485.371 | 2.209 | | |
| 12 | −248.972 | 2.000 | 1.58267 | 46.42 |
| 13 | 126.794 | d13 | | |
| 14 | −103.184 | 1.200 | 1.69680 | 55.46 |
| 15 | 23.318 | 3.290 | 1.85026 | 32.27 |
| 16 | 52.303 | d16 | | |
| 17 | ∞ | 1.000 | 1.51680 | 64.20 |
| 18 | ∞ | 0.900 | | |
| 19(Diaphragm) | ∞ | 2.500 | | |
| 20 | 46.542 | 4.834 | 1.59522 | 67.73 |
| 21 | −58.878 | 1.964 | | |
| 22 | 45.580 | 5.202 | 1.43875 | 94.94 |
| 23 | −35.837 | 1.800 | 1.80440 | 39.58 |
| 24 | 268.315 | 40.000 | | |
| 25 | 26.755 | 1.800 | 1.88300 | 40.76 |
| 26 | 15.507 | 4.982 | 1.48749 | 70.24 |
| 27 | 20.474 | 0.150 | | |
| 28 | 47.144 | 2.939 | 1.84666 | 23.78 |
| 29 | 146.953 | 5.000 | | |
| 30 | ∞ | 3.500 | 1.51680 | 64.20 |
| 31 | ∞ | — | | |
| fn: | −151.780 | | | |
| θgFn: | 0.5559 | | | |

TABLE 50

VARIOUS DATA WHEN FOCUSED ON OBJECT AT INFINITY
(Photographing Magnification = 0)
Zoom Ratio: 15.18

| | Short Focal Length Extremity | Intermediate Focal Length | Long Focal Length Extremity |
|---|---|---|---|
| FNO. | 4.00 | 4.00 | 4.75 |
| f | 25.034 | 100.000 | 380.000 |
| W | 13.1 | 3.1 | 0.8 |
| Y | 5.50 | 5.50 | 5.50 |
| fB | 16.500 | 16.500 | 16.500 |
| L | 328.705 | 328.705 | 328.705 |
| d7 | 4.500 | 114.035 | 154.368 |
| d13 | 117.197 | 16.314 | 26.113 |
| d16 | 61.701 | 53.049 | 2.916 |

TABLE 51

LENS GROUP DATA

| Lens Group | 1st Surf. | Focal Length |
|---|---|---|
| 1 | 1 | 243.658 |
| 2(Subsequent/n) | 8 | −99.211 |
| 3(Subsequent) | 14 | −60.684 |
| 4(Subsequent) | 17 | 44.157 |

TABLE 52

VARIOUS DATA WHEN FOCUSED ON OBJECT AT FINITE DISTANCE

| Object-to-Image Dist. | 9000.0 | 9000.0 | 9000.0 |
|---|---|---|---|
| Magnification | −0.003 | −0.012 | −0.045 |
| d7 | 11.551 | 121.086 | 161.419 |
| d13 | 117.197 | 16.314 | 26.113 |
| d16 | 61.701 | 53.049 | 2.916 |
| fB | 16.500 | 16.500 | 16.500 |
| Object-to-Image Dist. | 5000.0 | 5000.0 | 5000.0 |
| Magnification | −0.006 | −0.023 | −0.086 |
| d7 | 17.950 | 127.485 | 167.818 |
| d13 | 117.197 | 16.314 | 26.113 |
| d16 | 61.701 | 53.049 | 2.916 |
| fB | 16.500 | 16.500 | 16.500 |

TABLE 52-continued

VARIOUS DATA WHEN FOCUSED ON OBJECT AT FINITE DISTANCE

| d16 | 61.701 | 53.049 | 2.916 |
|---|---|---|---|
| fB | 16.500 | 16.500 | 16.500 |

[Embodiment 14]

Figure 66:
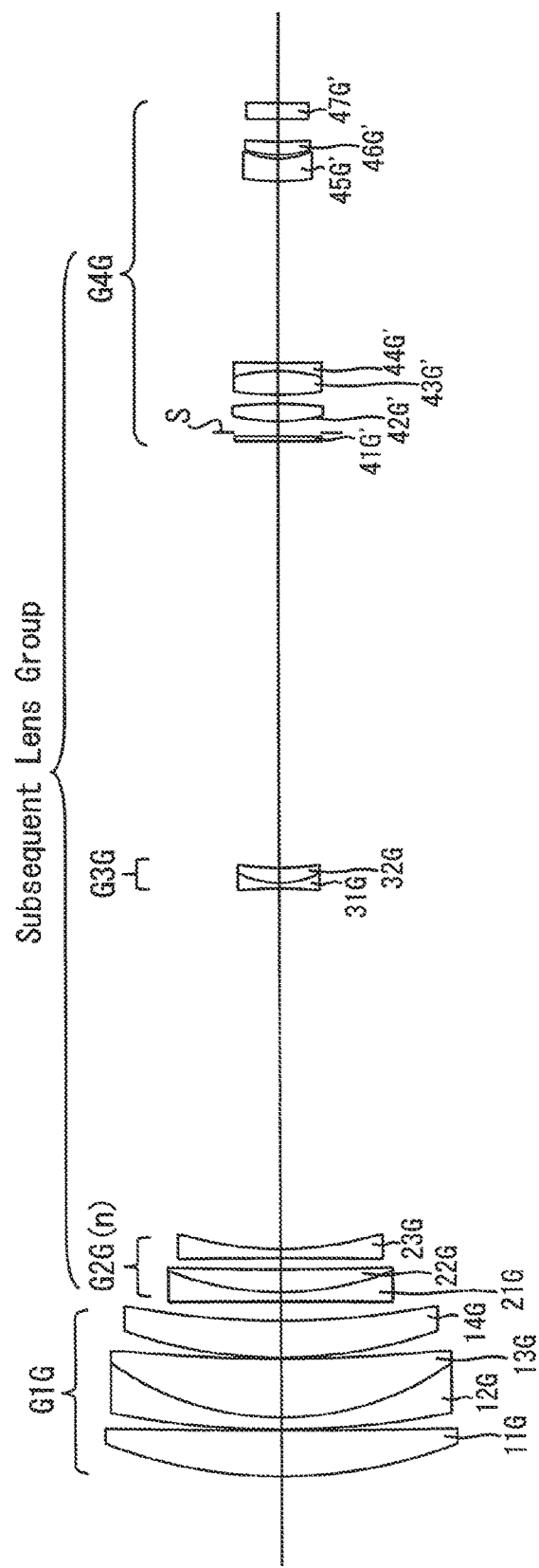
FIG. 66 shows a lens arrangement of a fourteenth numerical embodiment of a zoom lens system, according to the present invention, at the short focal length extremity when focused on an object at infinity.
Figure 71:
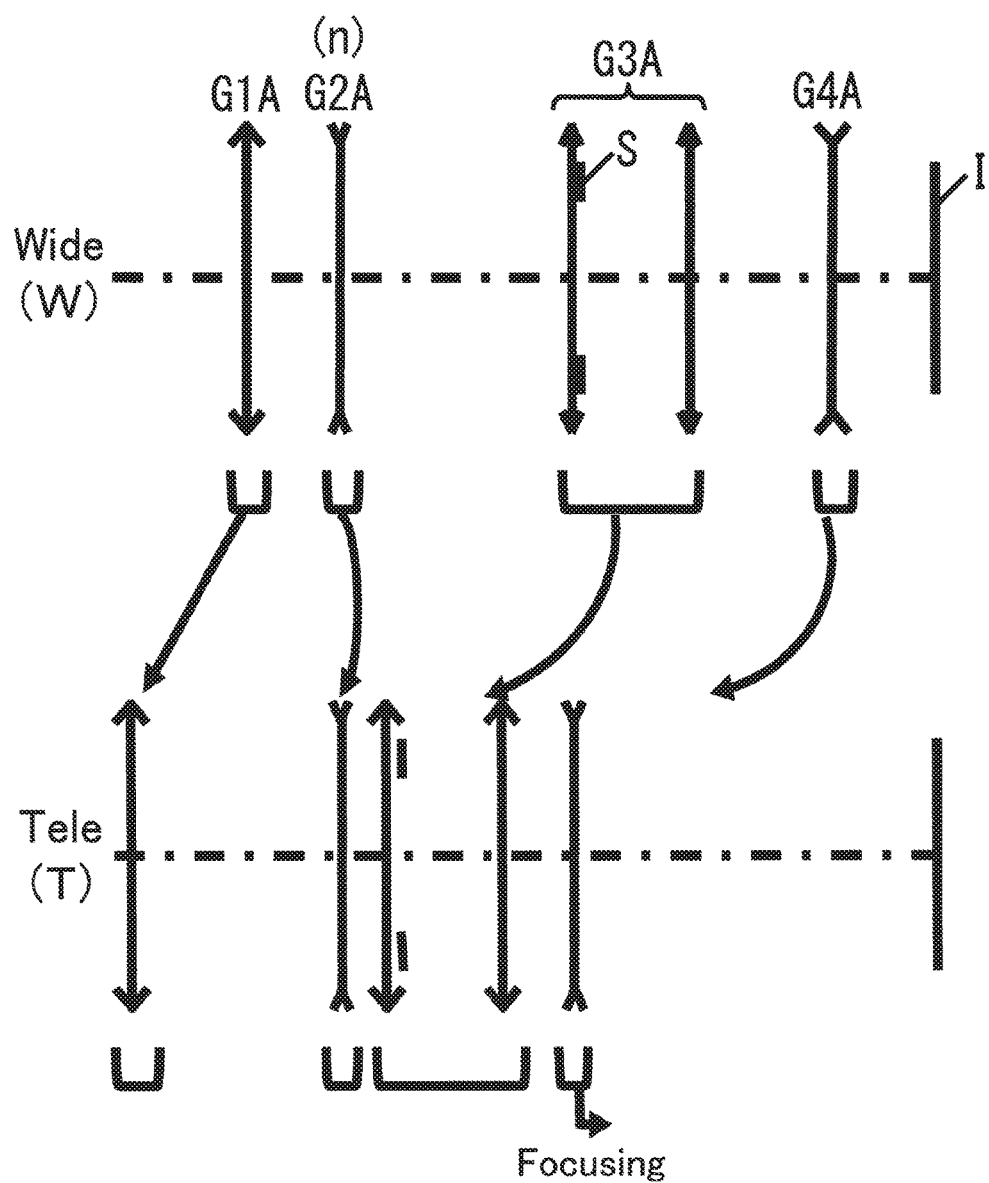
FIG. 71 shows a zoom path of the first numerical embodiment of the zoom lens system, according to the present invention.

FIGS. 66 through 70D and Tables 53 through 56 disclose a fourteenth numerical embodiment of the zoom lens system according to the present invention. FIG. 66 shows a lens arrangement of the zoom lens system at the short focal length extremity when focused on an object at infinity. FIGS. 67A, 67B, 67C and 67D show various aberrations that occurred in the zoom lens system of FIG. 66, at the short focal length extremity when focused on an object at infinity. FIGS. 68A, 68B, 68C and 68D show lateral aberrations that occurred in the zoom lens system of FIG. 66, at the short focal length extremity when focused on an object at infinity. FIGS. 69A, 69B, 69C and 69D show various aberrations that occurred in the zoom lens system of FIG. 66, at the long focal length extremity when focused on an object at infinity. FIGS. 70A, 70B, 70C and 70D show lateral aberrations that occurred in the zoom lens system of FIG. 66, at the long focal length extremity when focused on an object at infinity. Table 53 indicates the surface data. Table 54 indicates various lens system data when the zoom lens system is focused on an object at infinity (photographing magnification=0). Table 55 indicates lens-group data. Table 56 indicates various lens system data when the zoom lens system is focused on an object at a finite distance.

The lens arrangement of the fourteenth numerical embodiment is the same as that of the thirteenth numerical embodiment except for the following aspects:

(1) The positive lens element 22G of the second lens group G2G is a positive meniscus lens element having a convex surface on the object side. The biconcave negative lens element 21G and the positive meniscus lens element 22G are cemented to each other.

(2) The fourth lens group G4G is configured of an ND filter 41G', a diaphragm S, a biconvex positive lens element 42G', a biconvex positive lens element 43G', a biconcave lens element 44G', a negative meniscus lens element 45G' having a convex surface on the object side, a positive meniscus lens element 46G' having a convex surface on object side, and a parallel flat plate 47G', in that order from the object side. The biconvex positive lens element 43G' and the biconcave negative lens element 44G' are cemented to each other.

TABLE 53

SURFACE DATA

| Surf. No. | R | d | N(d) | v(d) |
|---|---|---|---|---|
| 1 | 108.673 | 10.386 | 1.59522 | 67.73 |
| 2 | 1875.591 | 0.200 | | |
| 3 | 201.048 | 2.650 | 1.80400 | 46.58 |
| 4 | 65.532 | 13.160 | 1.49700 | 81.55 |
| 5 | 392.524 | 0.200 | | |
| 6 | 107.913 | 8.105 | 1.43875 | 94.94 |
| 7 | 188.818 | d7 | | |
| 8 | −2687.000 | 2.000 | 1.85026 | 32.27 |
| 9 | 67.674 | 5.086 | 1.84666 | 23.78 |
| 10 | 719.029 | 2.538 | | |
| 11 | −1647.553 | 2.000 | 1.53775 | 74.70 |
| 12 | 77.127 | d12 | | |
| 13 | −96.690 | 1.200 | 1.77250 | 49.60 |

TABLE 53-continued

SURFACE DATA

| Surf. No. | R | d | N(d) | ν(d) |
|---|---|---|---|---|
| 14 | 20.418 | 3.290 | 1.85026 | 32.27 |
| 15 | 62.943 | d15 | | |
| 16 | ∞ | 1.000 | 1.51680 | 64.20 |
| 17 | ∞ | 0.900 | | |
| 18 (Diaphragm) | ∞ | 2.500 | | |
| 19 | 43.459 | 3.846 | 1.59522 | 67.73 |
| 20 | −81.665 | 1.964 | | |
| 21 | 70.139 | 5.202 | 1.43875 | 94.94 |
| 22 | −37.963 | 1.800 | 1.80440 | 39.58 |
| 23 | 537.025 | 40.000 | | |
| 24 | 56.904 | 4.982 | 1.59522 | 67.73 |
| 25 | 19.244 | 0.802 | | |
| 26 | 25.611 | 2.939 | 1.69680 | 55.53 |
| 27 | 123.227 | 5.000 | | |
| 28 | ∞ | 3.500 | 1.51680 | 64.20 |
| 29 | ∞ | — | | |
| fn: | −121.986 | | | |
| θgFn: | 0.5573 | | | |

TABLE 54

VARIOUS DATA WHEN FOCUSED ON OBJECT AT INFINITY
(Photographing Magnification = 0)
Zoom Ratio: 15.00

| | Short Focal Length Extremity | Intermediate Focal Length | Long Focal Length Extremity |
|---|---|---|---|
| FNO. | 4.50 | 4.49 | 5.73 |
| f | 30.005 | 200.000 | 450.000 |
| W | 10.5 | 1.6 | 0.7 |
| Y | 5.50 | 5.50 | 5.50 |
| fB | 26.814 | 26.814 | 26.814 |
| L | 329.593 | 329.593 | 329.593 |
| d7 | 4.160 | 95.464 | 95.319 |
| d12 | 79.558 | 32.075 | 79.129 |
| d15 | 93.811 | 49.991 | 3.082 |

TABLE 55

LENS GROUP DATA

| Lens Group | 1st Surf. | Focal Length |
|---|---|---|
| 1 | 1 | 196.166 |
| 2(Subsequent/n) | 8 | −112.321 |
| 3(Subsequent) | 13 | −56.049 |
| 4(Subsequent) | 16 | 55.913 |

TABLE 56

VARIOUS DATA WHEN FOCUSED ON OBJECT AT FINITE DISTANCE

| Object-to-Image Dist. | 9000.0 | 9000.0 | 9000.0 |
|---|---|---|---|
| Magnification | −0.004 | −0.024 | −0.053 |
| d7 | 8.705 | 100.009 | 99.864 |
| d12 | 79.558 | 32.075 | 79.129 |
| d15 | 93.811 | 49.991 | 3.082 |
| fB | 26.814 | 26.814 | 26.814 |
| Object-to-Image Dist. | 4000.0 | 4000.0 | 4000.0 |
| Magnification | −0.009 | −0.058 | −0.130 |
| d7 | 15.282 | 106.586 | 106.441 |
| d12 | 79.558 | 32.075 | 79.129 |
| d15 | 93.811 | 49.991 | 3.082 |
| fB | 26.814 | 26.814 | 26.814 |

The numerical values of each condition for each embodiment are shown in Table 57.

TABLE 57

| | Embod. 1 | Embod. 2 | Embod. 3 | Embod. 4 |
|---|---|---|---|---|
| Condition (1) | −2.009 | −2.398 | −1.711 | −1.510 |
| Condition (2) | 67.19 | 72.85 | 65.46 | 75.90 |
| Condition (3) | −4.914 | −4.443 | −4.743 | −1.102 |
| Condition (4) | 1.78590 | 1.77250 | 1.65412 | 1.79952 |
| Condition (5) | 2.514 | 3.050 | 2.694 | 2.586 |
| Condition (6) | 2.077 | 2.240 | 1.746 | 3.596 |
| Condition (7) | −1.649 | −1.446 | −1.738 | −3.528 |
| Condition (8) | 46.58 | 47.82 | 37.16 | 31.31 |
| Condition (9) | −0.0066 | −0.0086 | −0.0036 | −0.0058 |
| Condition (10) | 44.20 | 49.60 | 39.68 | 42.22 |
| Condition (11) | 3.972 | 5.092 | 3.609 | 4.447 |
| Condition (12) | 10.366 | 11.097 | 12.477 | 10.985 |
| Condition (13) | 2.946 | 3.311 | 3.444 | 1.467 |
| Condition (14) | 1.298 | 1.458 | 1.519 | 0.957 |

| | Embod. 5 | Embod. 6 | Embod. 7 | Embod. 8 |
|---|---|---|---|---|
| Condition (1) | −1.605 | −1.502 | −1.688 | −1.743 |
| Condition (2) | 77.78 | 72.85 | 67.19 | 67.19 |
| Condition (3) | −4.410 | −0.722 | −5.151 | −4.594 |
| Condition (4) | 1.79952 | 1.80440 | 1.79952 | 1.79952 |
| Condition (5) | 1.426 | 2.145 | 2.405 | 2.347 |
| Condition (6) | 3.002 | 2.497 | 2.541 | 2.350 |
| Condition (7) | −1.420 | −2.539 | −1.440 | −1.433 |
| Condition (8) | 37.16 | 29.52 | 49.60 | 55.53 |
| Condition (9) | −0.0058 | −0.0045 | −0.0058 | −0.0058 |
| Condition (10) | 42.22 | 39.58 | 42.22 | 42.22 |
| Condition (11) | 4.083 | 3.306 | 3.789 | 3.700 |
| Condition (12) | 6.702 | 6.971 | 10.538 | 9.059 |
| Condition (13) | 3.352 | 0.871 | 3.025 | 2.590 |
| Condition (14) | 1.477 | 0.615 | 1.315 | 1.136 |

| | Embod. 9 | Embod. 10 | Embod. 11 | Embod. 12 |
|---|---|---|---|---|
| Condition (1) | −1.727 | −1.510 | −3.204 | −1.536 |
| Condition (2) | 70.24 | 65.16 | 65.44 | 65.58 |
| Condition (3) | −5.179 | −5.261 | −5.436 | −3.967 |
| Condition (4) | 1.78590 | 1.83400 | 1.78800 | 1.72047 |
| Condition (5) | 2.351 | 2.157 | 2.688 | 1.725 |
| Condition (6) | 2.293 | 2.755 | 1.302 | 2.276 |
| Condition (7) | −1.417 | −1.465 | −1.440 | −1.536 |
| Condition (8) | 63.33 | 42.72 | 37.16 | 46.62 |
| Condition (9) | −0.0066 | −0.0039 | −0.0084 | −0.0022 |
| Condition (10) | 44.20 | 37.16 | 47.37 | 34.71 |
| Condition (11) | 3.655 | 3.450 | 4.693 | 3.531 |
| Condition (12) | 10.875 | 11.755 | 11.380 | 11.109 |
| Condition (13) | 3.107 | 3.066 | 3.744 | 2.661 |
| Condition (14) | 1.361 | 1.414 | 1.924 | 1.326 |

| | Embod. 13 | Embod. 14 |
|---|---|---|
| Condition (1) | −1.605 | −1.608 |
| Condition (2) | 81.41 | 81.41 |
| Condition (3) | −2.456 | −1.746 |
| Condition (4) | 1.78800 | 1.80400 |
| Condition (5) | 1.761 | 1.805 |
| Condition (6) | 1.648 | 1.967 |
| Condition (7) | −1.102 | −1.660 |
| Condition (8) | 46.42 | 74.70 |
| Condition (9) | −0.0084 | −0.0084 |
| Condition (10) | 47.37 | 46.58 |
| Condition (11) | 2.709 | 2.993 |
| Condition (12) | 7.022 | 5.653 |
| Condition (13) | 9.733 | 6.538 |
| Condition (14) | 2.498 | 1.688 |

As can be understood from Table 57, the first through fourteenth embodiments satisfy conditions (1) through (14). Furthermore, as can be understood from the aberration diagrams, the various aberrations and lateral aberrations are relatively well corrected.

The technical scope of the invention pertaining to the present invention would not be evaded even if a lens element or lens group which has, in effect, no optical power were to be added to a zoom lens system that is included in the technical scope of the invention pertaining to the present patent application.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, and a subsequent rear lens group provided subsequently behind said first lens group, in that order from an object side, wherein said first lens group includes at least one positive single lens element, a negative meniscus lens element having a convex surface on the object side, and at least one positive lens element, in that order from the object side, wherein a distance between said first lens group and said subsequent rear lens group increases upon zooming from a short focal length extremity to a long focal length extremity, and wherein the following conditions (1) and (2) are satisfied:

$$fG1/fn < -1.50 \qquad (1), \text{ and}$$

$$65 < vp_{ave} \qquad (2), \text{ wherein}$$

fG1 designates a focal length of the first lens group, fn designates a focal length of the negative meniscus lens element that is provided within the first lens group, and $vp_{ave}$ designates an average value of Abbe numbers with respect to a d-line of positive lens elements that are provided within the first lens group.

2. The zoom lens system according to claim 1, wherein said subsequent rear lens group comprises at least one negative lens group, and wherein a negative $n^{th}$ lens group that is provided closest to the object side within said subsequent rear lens group includes a negative lens element that is provided closest to the object side within said negative $n^{th}$ lens group.

3. The zoom lens system according to claim 1, wherein said subsequent rear lens group comprises at least one negative lens group, and wherein the following condition (3) is satisfied:

$$fG1/fGn < -0.70 \qquad (3), \text{ wherein}$$

fG1 designates the focal length of the first lens group, and fGn designates a focal length of said negative $n^{th}$ lens group that is provided closest to the object side within said subsequent rear lens group.

4. The zoom lens system according to claim 1, wherein the following condition (4) is satisfied:

$$1.650 < nn \qquad (4), \text{ wherein}$$

nn designates a refractive index with respect to the d-line of the negative meniscus lens element that is provided within the first lens group.

5. The zoom lens system according to claim 1, wherein the following condition (5) is satisfied:

$$1.40 < fG1/R1p < 3.30 \qquad (5), \text{ wherein}$$

fG1 designates the focal length of the first lens group, and

R1p designates a paraxial radius of curvature of the surface closest to the object side on the first lens group.

6. The zoom lens system according to claim 1, wherein the following condition (6) is satisfied:

$$1.30 < (R1n + R2n)/(R1n - R2n) \qquad (6), \text{ wherein}$$

R1n designates a paraxial radius of curvature of the surface on the object side of the negative meniscus lens element provided within the first lens group, and R2n designates a paraxial radius of curvature of the surface on an image side of the negative meniscus lens element provided within the first lens group.

7. The zoom lens system according to claim 1, wherein said subsequent rear lens group comprises at least one negative lens group, and wherein a negative $n^{th}$ lens group that is provided closest to the object side within said subsequent rear lens group includes a negative lens element that is provided closest to the object side within said negative $n^{th}$ lens group, and wherein the following condition (7) is satisfied:

$$fGn/R2Gn < -1.10 \qquad (7), \text{ wherein}$$

fGn designates a focal length of said negative $n^{th}$ lens group that is provided closest to the object side within said subsequent rear lens group, and R2Gn designates a paraxial radius of curvature of the surface on an image side of the negative lens element that is provided closest to the object side within said $n^{th}$ lens group.

8. The zoom lens system according to claim 1, wherein said subsequent rear lens group comprises at least one negative lens group, and wherein a negative $n^{th}$ lens group that is provided closest to the object side within said subsequent rear lens group includes a negative lens element and a positive lens element, in that order from the object side.

9. The zoom lens system according to claim 1, wherein said subsequent rear lens group comprises at least one negative lens group, and wherein a negative $n^{th}$ lens group that is provided closest to the object side within said subsequent rear lens group includes a negative lens element provided closest to an image side within said negative $n^{th}$ lens group.

10. The zoom lens system according to claim 9, wherein said negative lens element that is provided closest to the image side, within said negative $n^{th}$ lens group, includes a concave surface on the object side, wherein the following condition (8) is satisfied:

$$29 < vGn \qquad (8), \text{ wherein}$$

vGn designates an Abbe number with respect to a d-line of the negative lens element that is provided closest to the image side within the $n^{th}$ lens group.

11. The zoom lens system according to claim 1, wherein said subsequent rear lens group comprises at least one negative lens group, and wherein a negative $n^{th}$ lens group that is provided closest to the object side within said subsequent rear lens group comprises a negative second lens group provided immediately behind said first lens group on an image side thereof.

12. The zoom lens system according to claim 1, wherein the following condition (9) is satisfied:

$$\theta gFn - (0.6440 - 0.001682 \times vn) < 0 \qquad (9), \text{ wherein}$$

vn designates an Abbe number with respect to a d-line of the negative meniscus lens element provided within said first lens group, θgFn designates a partial dispersion ratio at a short wavelength side of the negative meniscus lens element provided within the first lens group, $$\theta gF = (ng - nF)/(nF - nC),$$

ng designates a refractive index at a g-line, nF designates the refractive index at a F-line, and nC designates the refractive index at a C-line.

13. The zoom lens system according to claim 1, wherein the following condition (10) is satisfied:

$$34 < vn \quad (10),\text{ wherein}$$

vn designates an Abbe number with respect to a d-line of the negative meniscus lens element provided within said first lens group.

14. The zoom lens system according to claim 1, wherein the following condition (11) is satisfied:

$$2.40 < fG1/R2n \quad (11),\text{ wherein}$$

fG1 designates the focal length of said first lens group, and

R2n designates a paraxial radius of curvature of the surface on an image side of the negative meniscus lens element provided within the first lens group.

15. The zoom lens system according to claim 1, wherein the following condition (12) is satisfied:

$$4.00 < fG1/1Gd < 13.00 \quad (12),\text{ wherein}$$

fG1 designates the focal length of the first lens group, and

1Gd designates a distance along an optical axis from a surface closest to the object side on the first lens group to the surface closest to an image side on the first lens group.

16. The zoom lens system according to claim 1, wherein the following condition (13) is satisfied:

$$0.80 < fG1/fw \quad (13),\text{ wherein}$$

fG1 designates the focal length of said first lens group, and fw designates a focal length of the entire said zoom lens system at the short focal length extremity.

17. The zoom lens system according to claim 1, wherein the following condition (14) is satisfied:

$$0.60 < fG1/(fw \times ft)^{1/2} \quad (14),\text{ wherein}$$

fG1 designates the focal length of said first lens group, fw designates a focal length of the entire said zoom lens system at the short focal length extremity, and ft designates a focal length of the entire said zoom lens system at the long focal length extremity.

18. The zoom lens system according to claim 1, wherein a positive meniscus lens element having a convex surface on the object side is provided immediately in front on the object side of the negative meniscus lens element that is provided within said first lens group.

19. The zoom lens system according to claim 1, wherein one or two positive lens elements are provided on an image side of the negative meniscus lens element that is provided within said first lens group.

20. The zoom lens system according to claim 1, wherein said first lens group is configured to move toward the object side upon zooming from the short focal length extremity to the long focal length extremity.

* * * * *